United States Patent
Sundarrajan et al.

(10) Patent No.: US 8,856,777 B2
(45) Date of Patent: Oct. 7, 2014

(54) SYSTEMS AND METHODS FOR AUTOMATIC INSTALLATION AND EXECUTION OF A CLIENT-SIDE ACCELERATION PROGRAM

(75) Inventors: Prabakar Sundarrajan, Saratoga, CA (US); Junxiao He, Cupertino, CA (US); Sergey Verzunov, San Jose, CA (US); Charu Venkatraman, Bangalore (IN); Anil Shetty, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 204 days.

(21) Appl. No.: 12/874,927

(22) Filed: Sep. 2, 2010

(65) Prior Publication Data

US 2010/0332594 A1    Dec. 30, 2010

Related U.S. Application Data

(63) Continuation of application No. 11/324,203, filed on Dec. 30, 2005, now Pat. No. 7,810,089.

(60) Provisional application No. 60/640,464, filed on Dec. 30, 2004.

(51) Int. Cl.
*G06F 9/445* (2006.01)

(52) U.S. Cl.
USPC ........... 717/174; 717/175; 717/176; 717/177; 717/178

(58) Field of Classification Search
None
See application file for complete search history.

(56) References Cited

U.S. PATENT DOCUMENTS

| 4,479,195 A | 10/1984 | Herr et al. |
| 4,701,844 A | 10/1987 | Thompson et al. |

(Continued)

FOREIGN PATENT DOCUMENTS

| CN | 1394042 | 1/2003 |
| CN | 1410905 A | 4/2003 |

(Continued)

OTHER PUBLICATIONS

U.S. Appl. No. 11/323,196 US Office Action Feb. 13, 2009.

(Continued)

*Primary Examiner* — Qamrun Nahar
(74) *Attorney, Agent, or Firm* — Foley & Lardner LLP; Christopher J. McKenna; Daniel E. Rose

(57) ABSTRACT

The present invention is directed towards systems and methods for dynamically deploying and executing acceleration functionality on a client to improve the performance and delivery of remotely accessed applications. The acceleration program of the present invention is automatically installed and executed on a client in a manner transparent to and seamless with the operation of the client. An appliance may intercept a request of the client to establish a communication session or connection with a server, and transmit the acceleration program to the client. In some cases, the appliance determines whether the application being accessed by the client can be accelerated and only provides the acceleration program if the application can be accelerated. Upon receipt of the acceleration program, the client automatically performs a silent installation of the acceleration program and executes the acceleration program upon completion of the installation.

20 Claims, 18 Drawing Sheets

(56) References Cited

U.S. PATENT DOCUMENTS

| | | |
|---|---|---|
| 4,885,680 A | 12/1989 | Anthony et al. |
| 4,935,870 A | 6/1990 | Burk et al. |
| 5,301,270 A | 4/1994 | Steinberg et al. |
| 5,307,413 A | 4/1994 | Denzer |
| 5,329,619 A | 7/1994 | Page et al. |
| 5,359,712 A | 10/1994 | Cohen et al. |
| 5,511,208 A | 4/1996 | Boyles et al. |
| 5,519,699 A | 5/1996 | Ohsawa |
| 5,521,940 A | 5/1996 | Lane et al. |
| 5,561,769 A | 10/1996 | Kumar et al. |
| 5,623,492 A | 4/1997 | Teraslinna |
| 5,625,793 A | 4/1997 | Mirza |
| 5,657,390 A | 8/1997 | Elgamal et al. |
| 5,671,226 A | 9/1997 | Murakami et al. |
| 5,708,656 A | 1/1998 | Noneman et al. |
| 5,742,829 A | 4/1998 | Davis et al. |
| 5,758,085 A | 5/1998 | Kouoheris et al. |
| 5,758,110 A | 5/1998 | Boss et al. |
| 5,761,431 A | 6/1998 | Gross et al. |
| 5,787,470 A | 7/1998 | DeSimone et al. |
| 5,812,668 A | 9/1998 | Weber |
| 5,815,462 A | 9/1998 | Konishi et al. |
| 5,819,020 A | 10/1998 | Beeler, Jr. |
| 5,822,524 A | 10/1998 | Chen et al. |
| 5,828,840 A | 10/1998 | Cowan et al. |
| 5,835,726 A | 11/1998 | Shwed et al. |
| 5,838,920 A | 11/1998 | Rosborough |
| 5,850,446 A | 12/1998 | Berger et al. |
| 5,852,717 A | 12/1998 | Bhide et al. |
| 5,864,837 A | 1/1999 | Maimone |
| 5,881,229 A | 3/1999 | Singh et al. |
| 5,889,863 A | 3/1999 | Weber |
| 5,893,150 A | 4/1999 | Hagersten et al. |
| 5,911,051 A | 6/1999 | Carson et al. |
| 5,918,244 A | 6/1999 | Percival |
| 5,925,100 A | 7/1999 | Drewry et al. |
| 5,931,917 A | 8/1999 | Nguyen et al. |
| 5,931,961 A | 8/1999 | Ranganathan et al. |
| 5,933,605 A | 8/1999 | Kawano et al. |
| 5,940,074 A | 8/1999 | Britt et al. |
| 5,940,516 A | 8/1999 | Mason et al. |
| 5,943,424 A | 8/1999 | Berger et al. |
| 5,956,483 A | 9/1999 | Grate et al. |
| 5,958,016 A | 9/1999 | Chang et al. |
| 5,978,840 A | 11/1999 | Nguyen et al. |
| 5,983,208 A | 11/1999 | Haller et al. |
| 5,987,132 A | 11/1999 | Rowney |
| 5,987,482 A | 11/1999 | Bates et al. |
| 5,987,611 A | 11/1999 | Freund |
| 5,995,999 A | 11/1999 | Bharadhwaj |
| 5,996,076 A | 11/1999 | Rowney et al. |
| 5,999,179 A | 12/1999 | Kekic et al. |
| 5,999,525 A | 12/1999 | Krishnaswamy et al. |
| 6,002,767 A | 12/1999 | Kramer |
| 6,021,470 A | 2/2000 | Frank et al. |
| 6,023,724 A | 2/2000 | Bhatia et al. |
| 6,026,379 A | 2/2000 | Haller et al. |
| 6,026,413 A | 2/2000 | Challenger et al. |
| 6,026,440 A | 2/2000 | Shrader et al. |
| 6,029,175 A | 2/2000 | Chow et al. |
| 6,058,250 A | 5/2000 | Harwood et al. |
| 6,061,715 A | 5/2000 | Hawes |
| 6,061,769 A | 5/2000 | Kapulka et al. |
| 6,061,796 A | 5/2000 | Chen et al. |
| 6,067,569 A | 5/2000 | Khaki et al. |
| 6,072,870 A | 6/2000 | Nguyen et al. |
| 6,092,155 A | 7/2000 | Olnowich |
| 6,101,543 A | 8/2000 | Alden et al. |
| 6,112,085 A | 8/2000 | Garner et al. |
| 6,119,105 A | 9/2000 | Williams |
| 6,119,151 A | 9/2000 | Cantrell et al. |
| 6,122,403 A | 9/2000 | Rhoads |
| 6,128,627 A | 10/2000 | Mattis et al. |
| 6,131,120 A | 10/2000 | Reid |
| 6,141,686 A | 10/2000 | Jackowski et al. |
| 6,144,775 A | 11/2000 | Williams et al. |
| 6,157,955 A | 12/2000 | Narad et al. |
| 6,161,123 A | 12/2000 | Renouard et al. |
| 6,163,772 A | 12/2000 | Kramer et al. |
| 6,170,017 B1 | 1/2001 | Dias et al. |
| 6,173,325 B1 | 1/2001 | Kukreja |
| 6,175,869 B1 | 1/2001 | Ahuja et al. |
| 6,178,409 B1 | 1/2001 | Weber et al. |
| 6,182,139 B1 | 1/2001 | Brendel |
| 6,192,408 B1 | 2/2001 | Vahalia et al. |
| 6,219,669 B1 | 4/2001 | Haff et al. |
| 6,233,249 B1 | 5/2001 | Katseff et al. |
| 6,233,606 B1 | 5/2001 | Dujari |
| 6,233,619 B1 | 5/2001 | Narisi et al. |
| 6,236,652 B1 | 5/2001 | Preston et al. |
| 6,252,851 B1 | 6/2001 | Siu et al. |
| 6,253,027 B1 | 6/2001 | Weber et al. |
| 6,253,188 B1 | 6/2001 | Witek et al. |
| 6,253,327 B1 | 6/2001 | Zhang et al. |
| 6,256,773 B1 | 7/2001 | Bowman-Amuah |
| 6,272,146 B1 | 8/2001 | Bowater et al. |
| 6,272,148 B1 | 8/2001 | Takagi et al. |
| 6,272,556 B1 | 8/2001 | Gish |
| 6,282,172 B1 | 8/2001 | Robles et al. |
| 6,289,382 B1 | 9/2001 | Bowman-Amuah |
| 6,289,450 B1 | 9/2001 | Pensak et al. |
| 6,301,249 B1 | 10/2001 | Mansfield et al. |
| 6,304,915 B1 | 10/2001 | Nguyen et al. |
| 6,308,273 B1 | 10/2001 | Goertzel et al. |
| 6,321,235 B1 | 11/2001 | Bird |
| 6,321,337 B1 | 11/2001 | Reshef et al. |
| 6,324,525 B1 | 11/2001 | Kramer et al. |
| 6,324,582 B1 | 11/2001 | Sridhar et al. |
| 6,324,647 B1 | 11/2001 | Bowman-Amuah |
| 6,324,648 B1 | 11/2001 | Grantges, Jr. |
| 6,327,242 B1 | 12/2001 | Amicangioli et al. |
| 6,332,163 B1 | 12/2001 | Bowman-Amuah |
| 6,333,931 B1 | 12/2001 | LaPier et al. |
| 6,334,664 B1 | 1/2002 | Silverbrook |
| 6,339,832 B1 | 1/2002 | Bowman-Amuah |
| 6,345,239 B1 | 2/2002 | Bowman-Amuah |
| 6,360,265 B1 | 3/2002 | Falck et al. |
| 6,363,363 B1 | 3/2002 | Haller et al. |
| 6,363,478 B1 | 3/2002 | Lambert et al. |
| 6,370,573 B1 | 4/2002 | Bowman-Amuah |
| 6,370,599 B1 | 4/2002 | Anand et al. |
| 6,373,950 B1 | 4/2002 | Rowney |
| 6,383,478 B1 | 5/2002 | Prokop et al. |
| 6,389,462 B1 | 5/2002 | Cohen et al. |
| 6,389,505 B1 | 5/2002 | Emma et al. |
| 6,398,359 B1 | 6/2002 | Silverbrook et al. |
| 6,405,364 B1 | 6/2002 | Bowman-Amuah |
| 6,412,000 B1 | 6/2002 | Riddle et al. |
| 6,415,329 B1 | 7/2002 | Gelman et al. |
| 6,427,132 B1 | 7/2002 | Bowman-Amuah |
| 6,427,187 B2 | 7/2002 | Malcolm |
| 6,431,777 B1 | 8/2002 | Silverbrook |
| 6,434,568 B1 | 8/2002 | Bowman-Amuah |
| 6,434,618 B1 | 8/2002 | Cohen et al. |
| 6,434,628 B1 | 8/2002 | Bowman-Amuah |
| 6,438,127 B1 | 8/2002 | Le Goff et al. |
| 6,438,594 B1 | 8/2002 | Bowman-Amuah |
| 6,442,571 B1 | 8/2002 | Haff et al. |
| 6,442,682 B1 | 8/2002 | Pothapragada et al. |
| 6,442,748 B1 | 8/2002 | Bowman-Amuah |
| 6,447,113 B1 | 9/2002 | Silverbrook et al. |
| 6,449,658 B1 | 9/2002 | Lafe et al. |
| 6,449,695 B1 | 9/2002 | Bereznyi et al. |
| 6,452,915 B1 | 9/2002 | Jorgensen |
| 6,452,923 B1 | 9/2002 | Gerszberg et al. |
| 6,457,103 B1 | 9/2002 | Challenger et al. |
| 6,473,794 B1 | 10/2002 | Guheen et al. |
| 6,473,802 B2 | 10/2002 | Masters |
| 6,477,580 B1 | 11/2002 | Bowman-Amuah |
| 6,477,665 B1 | 11/2002 | Bowman-Amuah |
| 6,484,143 B1 | 11/2002 | Swildens et al. |
| 6,484,206 B2 | 11/2002 | Crump et al. |
| 6,487,641 B1 | 11/2002 | Cusson et al. |
| 6,496,481 B1 | 12/2002 | Wu et al. |

(56) References Cited

U.S. PATENT DOCUMENTS

| | | |
|---|---|---|
| 6,496,776 B1 | 12/2002 | Blumberg et al. |
| 6,496,850 B1 | 12/2002 | Bowman-Amuah |
| 6,496,935 B1 | 12/2002 | Fink et al. |
| 6,502,102 B1 | 12/2002 | Haswell et al. |
| 6,502,192 B1 | 12/2002 | Nguyen |
| 6,502,213 B1 | 12/2002 | Bowman-Amuah |
| 6,507,891 B1 | 1/2003 | Challenger et al. |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,553,129 B1 | 4/2003 | Rhoads |
| 6,553,377 B1 | 4/2003 | Eschelbeck et al. |
| 6,553,409 B1 | 4/2003 | Zhang et al. |
| 6,567,806 B1 | 5/2003 | Tsuchida et al. |
| 6,571,282 B1 | 5/2003 | Bowman-Amuah |
| 6,574,668 B1 | 6/2003 | Gubbi et al. |
| 6,574,688 B1 | 6/2003 | Dale et al. |
| 6,578,068 B1 | 6/2003 | Bowman-Amuah |
| 6,578,073 B1 | 6/2003 | Starnes et al. |
| 6,584,569 B2 | 6/2003 | Reshef et al. |
| 6,587,806 B2 | 7/2003 | Mangiameli et al. |
| 6,590,588 B2 | 7/2003 | Lincke et al. |
| 6,591,266 B1 | 7/2003 | Li et al. |
| 6,594,690 B2 | 7/2003 | Cantwell |
| 6,598,075 B1 | 7/2003 | Ogdon et al. |
| 6,601,057 B1 | 7/2003 | Underwood et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,663 B1 | 8/2003 | Liao et al. |
| 6,606,744 B1 | 8/2003 | Mikurak |
| 6,609,128 B1 | 8/2003 | Underwood |
| 6,611,262 B1 | 8/2003 | Suzuki |
| 6,611,522 B1 | 8/2003 | Zheng et al. |
| 6,611,822 B1 | 8/2003 | Beams et al. |
| 6,611,867 B1 | 8/2003 | Bowman-Amuah |
| 6,614,800 B1 | 9/2003 | Genty et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,359 B1 | 9/2003 | Chen et al. |
| 6,629,081 B1 | 9/2003 | Cornelius et al. |
| 6,631,986 B2 | 10/2003 | Silverbrook |
| 6,633,574 B1 | 10/2003 | Koch et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,647,130 B2 | 11/2003 | Rhoads |
| 6,650,640 B1 | 11/2003 | Muller et al. |
| 6,652,089 B2 | 11/2003 | Silverbrook |
| 6,652,090 B2 | 11/2003 | Silverbrook |
| 6,662,221 B1 | 12/2003 | Gonda et al. |
| 6,662,357 B1 | 12/2003 | Bowman-Amuah |
| 6,664,978 B1 | 12/2003 | Kekic et al. |
| 6,671,818 B1 | 12/2003 | Mikurak |
| 6,678,734 B1 | 1/2004 | Haatainen et al. |
| 6,681,029 B1 | 1/2004 | Rhoads |
| 6,687,732 B1 | 2/2004 | Bector et al. |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,697,849 B1 | 2/2004 | Carlson |
| 6,700,902 B1 | 3/2004 | Meyer |
| 6,701,345 B1 | 3/2004 | Carley et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,728,787 B1 | 4/2004 | Leigh |
| 6,732,237 B1 | 5/2004 | Jacobs et al. |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,744,774 B2 | 6/2004 | Sharma |
| 6,754,699 B2 | 6/2004 | Swildens et al. |
| 6,760,748 B1 | 7/2004 | Hakim |
| 6,763,467 B1 | 7/2004 | Radatti et al. |
| 6,766,373 B1 | 7/2004 | Beadle et al. |
| 6,772,203 B1 | 8/2004 | Feiertag et al. |
| 6,775,392 B1 | 8/2004 | Rhoads |
| 6,785,719 B1 | 8/2004 | Jacobson et al. |
| 6,788,315 B1 | 9/2004 | Kekic et al. |
| 6,789,170 B1 | 9/2004 | Jacobs et al. |
| 6,792,615 B1 | 9/2004 | Rowe et al. |
| 6,801,927 B1 | 10/2004 | Smith et al. |
| 6,802,020 B1 | 10/2004 | Smith |
| 6,807,607 B1 | 10/2004 | Lamparter |
| 6,820,125 B1 | 11/2004 | Dias et al. |
| 6,820,133 B1 | 11/2004 | Grove et al. |
| 6,820,974 B2 | 11/2004 | Silverbrook |
| 6,823,374 B2 | 11/2004 | Kausik et al. |
| 6,826,626 B1 | 11/2004 | McManus |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,883,068 B2 | 4/2005 | Tsirigotis et al. |
| 6,888,927 B1 | 5/2005 | Cruickshank et al. |
| 6,894,981 B1 | 5/2005 | Coile et al. |
| 6,899,420 B2 | 5/2005 | Silverbrook |
| 6,901,072 B1 | 5/2005 | Wong |
| 6,904,449 B1 | 6/2005 | Quinones |
| 6,904,519 B2 | 6/2005 | Anand et al. |
| 6,907,546 B1 | 6/2005 | Haswell et al. |
| 6,910,074 B1 | 6/2005 | Amin et al. |
| 6,912,522 B2 | 6/2005 | Edgar |
| 6,918,113 B2 | 7/2005 | Patel et al. |
| 6,918,665 B2 | 7/2005 | Silverbrook |
| 6,920,502 B2 | 7/2005 | Araujo et al. |
| 6,925,495 B2 | 8/2005 | Hegde et al. |
| 6,934,288 B2 | 8/2005 | Dempo |
| 6,935,736 B2 | 8/2005 | Silverbrook |
| 6,944,279 B2 | 9/2005 | Elsey et al. |
| 6,950,848 B1 | 9/2005 | Yousefi'zadeh |
| 6,954,736 B2 | 10/2005 | Menninger et al. |
| 6,954,877 B2 | 10/2005 | Earl et al. |
| 6,957,186 B1 | 10/2005 | Guheen et al. |
| 6,957,249 B2 | 10/2005 | Salo et al. |
| 6,959,320 B2 | 10/2005 | Shah et al. |
| 6,974,928 B2 | 12/2005 | Bloom |
| 6,976,090 B2 | 12/2005 | Ben-Shaul et al. |
| 6,980,962 B1 | 12/2005 | Arganbright et al. |
| 6,990,070 B1 | 1/2006 | Aweya et al. |
| 6,990,480 B1 | 1/2006 | Burt |
| 6,993,016 B1 | 1/2006 | Liva et al. |
| 6,996,628 B2 | 2/2006 | Keane et al. |
| 6,996,631 B1 | 2/2006 | Aiken et al. |
| 7,000,012 B2 | 2/2006 | Moore et al. |
| 7,007,092 B2 | 2/2006 | Peiffer |
| 7,007,103 B2 | 2/2006 | Pinkerton et al. |
| 7,010,300 B1 | 3/2006 | Jones et al. |
| 7,013,290 B2 | 3/2006 | Ananian |
| 7,016,055 B2 | 3/2006 | Dodge et al. |
| 7,020,719 B1 | 3/2006 | Grove et al. |
| 7,023,979 B1 | 4/2006 | Wu et al. |
| 7,024,452 B1 | 4/2006 | O'Connell et al. |

(56) References Cited

U.S. PATENT DOCUMENTS

| | | | |
|---|---|---|---|
| 7,026,954 | B2 | 4/2006 | Slemmer et al. |
| 7,027,055 | B2 | 4/2006 | Anderson et al. |
| 7,028,083 | B2 | 4/2006 | Levine et al. |
| 7,028,333 | B2 | 4/2006 | Tuomenoksa et al. |
| 7,028,334 | B2 | 4/2006 | Tuomenoksa |
| 7,031,314 | B2 | 4/2006 | Craig et al. |
| 7,034,691 | B1 | 4/2006 | Rapaport et al. |
| 7,035,427 | B2 | 4/2006 | Rhoads |
| 7,036,142 | B1 | 4/2006 | Zhang et al. |
| 7,039,606 | B2 | 5/2006 | Hoffman et al. |
| 7,039,708 | B1 | 5/2006 | Knobl et al. |
| 7,042,879 | B2 | 5/2006 | Eschbach et al. |
| 7,043,529 | B1 | 5/2006 | Simonoff |
| 7,047,279 | B1 | 5/2006 | Beams et al. |
| 7,047,424 | B2 | 5/2006 | Bendinelli et al. |
| 7,051,161 | B2 | 5/2006 | Dixit et al. |
| 7,051,316 | B2 | 5/2006 | Charisius et al. |
| 7,054,837 | B2 | 5/2006 | Hoffman et al. |
| 7,054,944 | B2 | 5/2006 | Tang et al. |
| 7,055,028 | B2 | 5/2006 | Peiffer et al. |
| 7,055,169 | B2 | 5/2006 | Delpuch et al. |
| 7,055,947 | B2 | 6/2006 | Silverbrook |
| 7,057,759 | B2 | 6/2006 | Lapstun et al. |
| 7,069,234 | B1 | 6/2006 | Cornelius et al. |
| 7,070,110 | B2 | 7/2006 | Lapstun et al. |
| 7,072,665 | B1 | 7/2006 | Blumberg et al. |
| 7,072,843 | B2 | 7/2006 | Menninger et al. |
| 7,072,965 | B2 | 7/2006 | Ryuutou et al. |
| 7,080,041 | B2 | 7/2006 | Nagel |
| 7,082,409 | B1 | 7/2006 | Cherry |
| 7,085,683 | B2 | 8/2006 | Anderson et al. |
| 7,085,834 | B2 | 8/2006 | Delany et al. |
| 7,085,854 | B2 | 8/2006 | Keane et al. |
| 7,086,728 | B2 | 8/2006 | Silverbrook |
| 7,092,370 | B2 | 8/2006 | Jiang et al. |
| 7,096,009 | B2 | 8/2006 | Mousseau et al. |
| 7,096,418 | B1 | 8/2006 | Singhal et al. |
| 7,096,495 | B1 | 8/2006 | Warrier et al. |
| 7,097,106 | B2 | 8/2006 | Silverbrook et al. |
| 7,100,195 | B1 | 8/2006 | Underwood |
| 7,103,068 | B1 | 9/2006 | Gardner et al. |
| 7,107,285 | B2 | 9/2006 | Von Kaenel et al. |
| 7,113,779 | B1 | 9/2006 | Fujisaki |
| 7,113,962 | B1 | 9/2006 | Kee et al. |
| 7,114,180 | B1 | 9/2006 | DeCaprio |
| 7,117,504 | B2 | 10/2006 | Smith et al. |
| 7,117,530 | B1 | 10/2006 | Lin |
| 7,120,596 | B2 | 10/2006 | Hoffman et al. |
| 7,120,666 | B2 * | 10/2006 | McCanne et al. ............. 709/203 |
| 7,120,690 | B1 | 10/2006 | Krishnan et al. |
| 7,120,852 | B2 | 10/2006 | Terry et al. |
| 7,124,101 | B1 | 10/2006 | Mikurak |
| 7,124,442 | B2 | 10/2006 | Nash-Putnam |
| 7,126,955 | B2 | 10/2006 | Nabhan et al. |
| 7,128,265 | B2 | 10/2006 | Silverbrook et al. |
| 7,128,270 | B2 | 10/2006 | Silverbrook et al. |
| 7,130,792 | B2 | 10/2006 | Tokieda et al. |
| 7,130,807 | B1 | 10/2006 | Mikurak |
| 7,131,596 | B2 | 11/2006 | Lapstun et al. |
| 7,134,131 | B1 | 11/2006 | Hendricks et al. |
| 7,135,991 | B2 | 11/2006 | Slemmer et al. |
| 7,136,645 | B2 | 11/2006 | Hanson et al. |
| 7,137,566 | B2 | 11/2006 | Silverbrook et al. |
| 7,139,999 | B2 | 11/2006 | Bowman-Amuah |
| 7,140,044 | B2 | 11/2006 | Redlich et al. |
| 7,143,153 | B1 | 11/2006 | Black et al. |
| 7,144,095 | B2 | 12/2006 | Silverbrook |
| 7,146,384 | B2 | 12/2006 | Sawafta |
| 7,146,644 | B2 | 12/2006 | Redlich et al. |
| 7,149,698 | B2 | 12/2006 | Guheen et al. |
| 7,149,897 | B2 | 12/2006 | Chincheck et al. |
| 7,149,959 | B1 | 12/2006 | Jones et al. |
| 7,150,398 | B2 | 12/2006 | Silverbrook et al. |
| 7,152,047 | B1 | 12/2006 | Nagel |
| 7,152,092 | B2 | 12/2006 | Beams et al. |
| 7,152,207 | B1 | 12/2006 | Underwood et al. |
| 7,155,518 | B2 | 12/2006 | Forslow |
| 7,155,676 | B2 | 12/2006 | Land et al. |
| 7,159,014 | B2 | 1/2007 | Kausik et al. |
| 7,159,777 | B2 | 1/2007 | Silverbrook et al. |
| 7,162,540 | B2 * | 1/2007 | Jasen et al. .................... 709/242 |
| 7,164,680 | B2 | 1/2007 | Loguinov |
| 7,165,041 | B1 | 1/2007 | Guheen et al. |
| 7,167,844 | B1 | 1/2007 | Leong et al. |
| 7,171,379 | B2 | 1/2007 | Menninger et al. |
| 7,175,089 | B2 | 2/2007 | Silverbrook et al. |
| 7,178,106 | B2 | 2/2007 | Lamkin et al. |
| 7,178,719 | B2 | 2/2007 | Silverbrook et al. |
| 7,181,766 | B2 | 2/2007 | Bendinelli et al. |
| 7,184,445 | B2 | 2/2007 | Gupta et al. |
| 7,187,470 | B2 | 3/2007 | Lapstun et al. |
| 7,188,273 | B2 | 3/2007 | Allen et al. |
| 7,188,769 | B2 | 3/2007 | Silverbrook et al. |
| 7,191,252 | B2 | 3/2007 | Redlich et al. |
| 7,194,761 | B1 | 3/2007 | Champagne |
| 7,197,374 | B2 | 3/2007 | Silverbrook et al. |
| 7,197,502 | B2 | 3/2007 | Feinsmith |
| 7,197,570 | B2 | 3/2007 | Eylon et al. |
| 7,197,751 | B2 | 3/2007 | Fedotov et al. |
| 7,199,885 | B2 | 4/2007 | Dodge |
| 7,200,804 | B1 | 4/2007 | Khavari et al. |
| 7,206,811 | B2 | 4/2007 | Skurikhin et al. |
| 7,207,483 | B2 | 4/2007 | Silverbrook et al. |
| 7,207,485 | B2 | 4/2007 | Silverbrook et al. |
| 7,212,296 | B2 | 5/2007 | Dodge et al. |
| 7,216,173 | B2 | 5/2007 | Clayton et al. |
| 7,219,127 | B2 | 5/2007 | Huck et al. |
| 7,221,660 | B1 | 5/2007 | Simonson et al. |
| 7,222,152 | B1 | 5/2007 | Thompson et al. |
| 7,222,305 | B2 | 5/2007 | Teplov et al. |
| 7,225,040 | B2 | 5/2007 | Eller et al. |
| 7,225,244 | B2 | 5/2007 | Reynolds et al. |
| 7,225,382 | B2 | 5/2007 | Ramech et al. |
| 7,228,459 | B2 | 6/2007 | Jiang et al. |
| 7,246,233 | B2 | 7/2007 | Brabson et al. |
| 7,249,351 | B1 | 7/2007 | Songer et al. |
| 7,260,617 | B2 | 8/2007 | Bazinet et al. |
| 7,260,840 | B2 | 8/2007 | Swander et al. |
| 7,263,071 | B2 | 8/2007 | Yim |
| 7,272,853 | B2 | 9/2007 | Goodman et al. |
| 7,284,044 | B2 * | 10/2007 | Teraoka et al. ............... 717/178 |
| 7,318,100 | B2 | 1/2008 | Demmer et al. |
| 7,321,906 | B2 | 1/2008 | Green |
| 7,328,267 | B1 | 2/2008 | Bashyam et al. |
| 7,340,772 | B2 | 3/2008 | Panasyuk et al. |
| 7,353,533 | B2 | 4/2008 | Wright et al. |
| 7,363,347 | B2 | 4/2008 | Thomas |
| 7,363,378 | B2 | 4/2008 | Holmes et al. |
| 7,370,353 | B2 | 5/2008 | Yang |
| 7,386,631 | B1 | 6/2008 | Sibal et al. |
| 7,389,462 | B1 | 6/2008 | Wang et al. |
| 7,392,348 | B2 | 6/2008 | Dumont |
| 7,398,320 | B1 | 7/2008 | Minakuchi et al. |
| 7,398,552 | B2 | 7/2008 | Pardee et al. |
| 7,401,116 | B1 | 7/2008 | Chalfin et al. |
| 7,404,003 | B1 | 7/2008 | Noble |
| 7,406,533 | B2 | 7/2008 | Li et al. |
| 7,409,708 | B2 | 8/2008 | Goodman et al. |
| 7,415,723 | B2 | 8/2008 | Pandya |
| 7,420,992 | B1 | 9/2008 | Fang et al. |
| 7,433,314 | B2 | 10/2008 | Sharma et al. |
| 7,441,119 | B2 | 10/2008 | Brabson et al. |
| 7,458,095 | B2 | 11/2008 | Forsberg |
| 7,464,264 | B2 | 12/2008 | Goodman et al. |
| 7,480,312 | B2 | 1/2009 | Ossman |
| 7,496,659 | B1 | 2/2009 | Coverdill et al. |
| 7,505,455 | B1 | 3/2009 | Goodwin et al. |
| 7,512,702 | B1 | 3/2009 | Srivastava et al. |
| 7,522,581 | B2 | 4/2009 | Acharya et al. |
| 7,533,409 | B2 | 5/2009 | Keane et al. |
| 7,536,715 | B2 | 5/2009 | Markham |
| 7,577,144 | B2 | 8/2009 | Chang et al. |
| 7,606,902 | B2 | 10/2009 | Rao et al. |
| 7,609,721 | B2 | 10/2009 | Rao et al. |

(56) References Cited

U.S. PATENT DOCUMENTS

| | | |
|---|---|---|
| 7,644,188 B2 | 1/2010 | Vlodavsky et al. |
| 7,673,048 B1 | 3/2010 | O'Toole et al. |
| 7,757,074 B2 | 7/2010 | Sundarrajan et al. |
| 7,774,499 B1 | 8/2010 | Popek et al. |
| 7,775,074 B1 | 8/2010 | Tobias et al. |
| 7,882,247 B2 | 2/2011 | Sturniolo et al. |
| 7,921,184 B2 | 4/2011 | Sundarrajan et al. |
| 7,945,678 B1 | 5/2011 | Skene |
| 7,979,528 B2 | 7/2011 | Eisenberg et al. |
| 7,979,694 B2 | 7/2011 | Touitou et al. |
| 8,005,981 B2 | 8/2011 | Tuck et al. |
| 8,205,000 B2 | 6/2012 | Chang et al. |
| 8,223,647 B2 | 7/2012 | Kakani et al. |
| 8,250,214 B2 | 8/2012 | Susai et al. |
| 8,261,057 B2 | 9/2012 | Sundarrajan et al. |
| 8,351,327 B1 | 1/2013 | Binns |
| 2001/0030970 A1 | 10/2001 | Wiryaman et al. |
| 2001/0037387 A1 | 11/2001 | Gilde et al. |
| 2001/0043600 A1 | 11/2001 | Chatterjee et al. |
| 2001/0046212 A1 | 11/2001 | Nakajima |
| 2001/0047406 A1 | 11/2001 | Araujo et al. |
| 2001/0049717 A1 | 12/2001 | Freeman |
| 2001/0049741 A1 | 12/2001 | Skene et al. |
| 2001/0052016 A1 | 12/2001 | Skene et al. |
| 2001/0052065 A1 | 12/2001 | Alexander, III et al. |
| 2002/0004834 A1 | 1/2002 | Guenther et al. |
| 2002/0004902 A1 | 1/2002 | Toh et al. |
| 2002/0007402 A1 | 1/2002 | Thomas Huston et al. |
| 2002/0007404 A1 | 1/2002 | Vange et al. |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0037079 A1 | 3/2002 | Duval |
| 2002/0038339 A1 | 3/2002 | Xu |
| 2002/0042875 A1 | 4/2002 | Shukla |
| 2002/0049608 A1 | 4/2002 | Hartsell et al. |
| 2002/0049841 A1 | 4/2002 | Johnson et al. |
| 2002/0055966 A1 | 5/2002 | Border et al. |
| 2002/0057717 A1 | 5/2002 | Mallory |
| 2002/0059274 A1 | 5/2002 | Hartsell et al. |
| 2002/0059429 A1 | 5/2002 | Carpenter et al. |
| 2002/0059435 A1 | 5/2002 | Border et al. |
| 2002/0065864 A1 | 5/2002 | Hartsell et al. |
| 2002/0065919 A1 | 5/2002 | Taylor et al. |
| 2002/0069278 A1 | 6/2002 | Forslow |
| 2002/0071438 A1 | 6/2002 | Singh |
| 2002/0073061 A1 | 6/2002 | Collins |
| 2002/0073298 A1 | 6/2002 | Geiger et al. |
| 2002/0081971 A1 | 6/2002 | Travostino |
| 2002/0083175 A1 | 6/2002 | Afek et al. |
| 2002/0083183 A1 | 6/2002 | Pujare et al. |
| 2002/0087729 A1 | 7/2002 | Edgar |
| 2002/0091788 A1 | 7/2002 | Chlan et al. |
| 2002/0095400 A1 | 7/2002 | Johnson et al. |
| 2002/0095498 A1 | 7/2002 | Chanda et al. |
| 2002/0098840 A1 | 7/2002 | Hanson et al. |
| 2002/0099940 A1 | 7/2002 | Wang |
| 2002/0101848 A1 | 8/2002 | Lee et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0116582 A1 | 8/2002 | Copeland et al. |
| 2002/0120710 A1 | 8/2002 | Chintalapati et al. |
| 2002/0120743 A1 | 8/2002 | Shabtay et al. |
| 2002/0126675 A1 | 9/2002 | Yoshimura et al. |
| 2002/0133593 A1 | 9/2002 | Johnson et al. |
| 2002/0138511 A1 | 9/2002 | Psounis et al. |
| 2002/0138572 A1 | 9/2002 | Delany et al. |
| 2002/0138618 A1 | 9/2002 | Szabo |
| 2002/0138640 A1 | 9/2002 | Raz et al. |
| 2002/0147795 A1 | 10/2002 | Cantwell |
| 2002/0147822 A1 | 10/2002 | Susai et al. |
| 2002/0150064 A1 | 10/2002 | Lucidarme |
| 2002/0152373 A1 | 10/2002 | Sun et al. |
| 2002/0152423 A1 | 10/2002 | McCabe |
| 2002/0156927 A1 | 10/2002 | Boucher et al. |
| 2002/0161908 A1 | 10/2002 | Benitez et al. |
| 2002/0163882 A1 | 11/2002 | Bornstein et al. |
| 2002/0174227 A1 | 11/2002 | Hartsell et al. |
| 2002/0174255 A1 | 11/2002 | Hayter et al. |
| 2002/0176532 A1 | 11/2002 | McClelland et al. |
| 2002/0184224 A1 | 12/2002 | Haff et al. |
| 2002/0194382 A1 | 12/2002 | Kausik et al. |
| 2002/0196279 A1 | 12/2002 | Bloomfield et al. |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0014624 A1 | 1/2003 | Maturana et al. |
| 2003/0014625 A1 | 1/2003 | Freed et al. |
| 2003/0014628 A1 | 1/2003 | Freed et al. |
| 2003/0014650 A1 | 1/2003 | Freed et al. |
| 2003/0018891 A1 | 1/2003 | Hall et al. |
| 2003/0023767 A1 | 1/2003 | Brabson et al. |
| 2003/0026241 A1 | 2/2003 | Ono et al. |
| 2003/0033520 A1 | 2/2003 | Peiffer et al. |
| 2003/0037108 A1 | 2/2003 | Peiffer et al. |
| 2003/0039354 A1 | 2/2003 | Kimble et al. |
| 2003/0046586 A1 | 3/2003 | Bheemarasetti et al. |
| 2003/0046587 A1 | 3/2003 | Bheemarasetti et al. |
| 2003/0051100 A1 | 3/2003 | Patel |
| 2003/0051102 A1 | 3/2003 | Jacobs et al. |
| 2003/0055883 A1 | 3/2003 | Wiles, Jr. |
| 2003/0055962 A1 | 3/2003 | Freund et al. |
| 2003/0061505 A1 | 3/2003 | Sperry et al. |
| 2003/0065646 A1 | 4/2003 | Joseph et al. |
| 2003/0065763 A1 | 4/2003 | Swildens et al. |
| 2003/0067874 A1 | 4/2003 | See et al. |
| 2003/0069941 A1 | 4/2003 | Peiffer |
| 2003/0079031 A1 | 4/2003 | Nagano |
| 2003/0084162 A1 | 5/2003 | Johnson et al. |
| 2003/0084165 A1 | 5/2003 | Kjellberg et al. |
| 2003/0088698 A1 | 5/2003 | Singh et al. |
| 2003/0088788 A1 | 5/2003 | Yang |
| 2003/0093488 A1 | 5/2003 | Yoshida et al. |
| 2003/0093566 A1 | 5/2003 | Jardin |
| 2003/0105604 A1 | 6/2003 | Ash et al. |
| 2003/0105977 A1 | 6/2003 | Brabson et al. |
| 2003/0110296 A1 | 6/2003 | Kirsch et al. |
| 2003/0110379 A1 | 6/2003 | Ylonen et al. |
| 2003/0112809 A1 | 6/2003 | Bharali et al. |
| 2003/0112823 A1 | 6/2003 | Collins et al. |
| 2003/0115421 A1 | 6/2003 | McHenry et al. |
| 2003/0123394 A1 | 7/2003 | Neale et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0135505 A1 | 7/2003 | Hind et al. |
| 2003/0140121 A1 | 7/2003 | Adams |
| 2003/0149899 A1 | 8/2003 | Boden et al. |
| 2003/0152028 A1 | 8/2003 | Raisanen et al. |
| 2003/0154110 A1 | 8/2003 | Walter et al. |
| 2003/0154239 A1 | 8/2003 | Davis et al. |
| 2003/0165138 A1 | 9/2003 | Swonk et al. |
| 2003/0167403 A1 | 9/2003 | McCurley et al. |
| 2003/0174718 A1 | 9/2003 | Sampath et al. |
| 2003/0177389 A1 | 9/2003 | Albert et al. |
| 2003/0177395 A1 | 9/2003 | Pardee et al. |
| 2003/0182423 A1 | 9/2003 | Shafir et al. |
| 2003/0182431 A1 | 9/2003 | Sturniolo et al. |
| 2003/0182437 A1 | 9/2003 | Kobayashi et al. |
| 2003/0188001 A1 | 10/2003 | Eisenberg et al. |
| 2003/0191799 A1 | 10/2003 | Araujo et al. |

(56) References Cited

U.S. PATENT DOCUMENTS

| | | |
|---|---|---|
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0200353 A1 | 10/2003 | Dogra et al. |
| 2003/0208602 A1 | 11/2003 | Bhalla et al. |
| 2003/0212760 A1 | 11/2003 | Chen et al. |
| 2003/0212776 A1 | 11/2003 | Roberts et al. |
| 2003/0217105 A1 | 11/2003 | Zircher et al. |
| 2003/0217126 A1 | 11/2003 | Polcha et al. |
| 2003/0217149 A1 | 11/2003 | Crichton et al. |
| 2003/0223361 A1 | 12/2003 | Hussain et al. |
| 2003/0223418 A1 | 12/2003 | Desai et al. |
| 2003/0223433 A1 | 12/2003 | Lee et al. |
| 2003/0226018 A1 | 12/2003 | Tardo et al. |
| 2003/0229718 A1 | 12/2003 | Tock et al. |
| 2003/0229761 A1 | 12/2003 | Basu et al. |
| 2003/0231659 A1 | 12/2003 | DiMambro et al. |
| 2003/0233423 A1 | 12/2003 | Dilley et al. |
| 2003/0236831 A1 | 12/2003 | Ortiz et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0003101 A1 | 1/2004 | Roth et al. |
| 2004/0003137 A1 | 1/2004 | Callender et al. |
| 2004/0006708 A1 | 1/2004 | Mukherjee et al. |
| 2004/0008693 A1 | 1/2004 | Grove et al. |
| 2004/0010601 A1 | 1/2004 | Afergan et al. |
| 2004/0010604 A1 | 1/2004 | Tanaka et al. |
| 2004/0010621 A1 | 1/2004 | Afergan et al. |
| 2004/0031058 A1 | 2/2004 | Reisman |
| 2004/0034744 A1 | 2/2004 | Karlsson et al. |
| 2004/0034794 A1 | 2/2004 | Mayer et al. |
| 2004/0039827 A1 | 2/2004 | Thomas et al. |
| 2004/0042487 A1 | 3/2004 | Ossman |
| 2004/0044521 A1 | 3/2004 | Chen et al. |
| 2004/0044731 A1 | 3/2004 | Chen et al. |
| 2004/0049515 A1 | 3/2004 | Haff et al. |
| 2004/0073716 A1 | 4/2004 | Boom et al. |
| 2004/0078621 A1 | 4/2004 | Talaugon et al. |
| 2004/0078772 A1 | 4/2004 | Balay et al. |
| 2004/0087304 A1 | 5/2004 | Buddhikot et al. |
| 2004/0098486 A1 | 5/2004 | Gu et al. |
| 2004/0100976 A1 | 5/2004 | Chang et al. |
| 2004/0103150 A1 | 5/2004 | Ogdon et al. |
| 2004/0103225 A1 | 5/2004 | McAlpine et al. |
| 2004/0103438 A1 | 5/2004 | Yan et al. |
| 2004/0107360 A1 | 6/2004 | Herrmann et al. |
| 2004/0111519 A1 | 6/2004 | Fu et al. |
| 2004/0128252 A1 | 7/2004 | Shirai et al. |
| 2004/0128346 A1 | 7/2004 | Melamed et al. |
| 2004/0141525 A1 | 7/2004 | Bhushan et al. |
| 2004/0143655 A1 | 7/2004 | Narad et al. |
| 2004/0143734 A1 | 7/2004 | Buer et al. |
| 2004/0146053 A1 | 7/2004 | Nabhan et al. |
| 2004/0158705 A1 | 8/2004 | Burdett et al. |
| 2004/0162876 A1 | 8/2004 | Kohavi |
| 2004/0177158 A1 | 9/2004 | Bauch et al. |
| 2004/0177359 A1 | 9/2004 | Bauch et al. |
| 2004/0190092 A1 | 9/2004 | Silverbrook et al. |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0210320 A1 | 10/2004 | Pandya |
| 2004/0213248 A1 | 10/2004 | Okuda et al. |
| 2004/0215665 A1 | 10/2004 | Edgar et al. |
| 2004/0215746 A1 | 10/2004 | McCanne et al. |
| 2004/0221031 A1 | 11/2004 | Desai |
| 2004/0225898 A1 | 11/2004 | Frost et al. |
| 2004/0225911 A1 | 11/2004 | Smith |
| 2004/0230840 A1 | 11/2004 | Radatti |
| 2004/0246971 A1 | 12/2004 | Banerjee et al. |
| 2004/0249975 A1 | 12/2004 | Tuck et al. |
| 2004/0258003 A1 | 12/2004 | Kokot et al. |
| 2004/0260922 A1 | 12/2004 | Goodman et al. |
| 2004/0268175 A1 | 12/2004 | Koch et al. |
| 2004/0268357 A1 | 12/2004 | Joy et al. |
| 2004/0268358 A1 | 12/2004 | Darling et al. |
| 2005/0005014 A1 | 1/2005 | Holmes et al. |
| 2005/0005107 A1 | 1/2005 | Touboul |
| 2005/0013280 A1 | 1/2005 | Buddhikot et al. |
| 2005/0021511 A1 | 1/2005 | Zarom |
| 2005/0021762 A1 | 1/2005 | Gbadegesin |
| 2005/0022011 A1 | 1/2005 | Swander et al. |
| 2005/0022012 A1 | 1/2005 | Bluestone et al. |
| 2005/0022031 A1 | 1/2005 | Goodman et al. |
| 2005/0025150 A1 | 2/2005 | Helmy et al. |
| 2005/0027788 A1 | 2/2005 | Koopmans et al. |
| 2005/0031058 A1 | 2/2005 | Soong et al. |
| 2005/0033858 A1 | 2/2005 | Swildens et al. |
| 2005/0033926 A1 | 2/2005 | Dumont |
| 2005/0044350 A1 | 2/2005 | White et al. |
| 2005/0050317 A1 | 3/2005 | Kramer et al. |
| 2005/0055690 A1 | 3/2005 | Cornillon et al. |
| 2005/0058112 A1 | 3/2005 | Lahey et al. |
| 2005/0080850 A1 | 4/2005 | Salesky et al. |
| 2005/0080907 A1 | 4/2005 | Panasyuk et al. |
| 2005/0086386 A1 | 4/2005 | Shen et al. |
| 2005/0094582 A1 | 5/2005 | Forissier et al. |
| 2005/0102529 A1 | 5/2005 | Buddhikot et al. |
| 2005/0108412 A1 | 5/2005 | Sjollema et al. |
| 2005/0108517 A1 | 5/2005 | Dillon et al. |
| 2005/0122980 A1 | 6/2005 | Anand et al. |
| 2005/0125663 A1 | 6/2005 | Funk |
| 2005/0132030 A1 | 6/2005 | Hopen et al. |
| 2005/0132060 A1 | 6/2005 | Mo et al. |
| 2005/0135250 A1 | 6/2005 | Singh et al. |
| 2005/0144186 A1 | 6/2005 | Hesselink et al. |
| 2005/0144481 A1 | 6/2005 | Hopen et al. |
| 2005/0144614 A1 | 6/2005 | Moslander et al. |
| 2005/0147126 A1 | 7/2005 | Qiu et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0177866 A1 | 8/2005 | Kirsch |
| 2005/0185647 A1 | 8/2005 | Rao et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0198532 A1 | 9/2005 | Comlekoglu et al. |
| 2005/0210150 A1 | 9/2005 | Bahl |
| 2005/0223412 A1 | 10/2005 | Nadalin et al. |
| 2005/0232161 A1 | 10/2005 | Maufer et al. |
| 2005/0232298 A1 | 10/2005 | Beverly et al. |
| 2005/0246346 A1 | 11/2005 | Gerdes et al. |
| 2005/0246445 A1 | 11/2005 | Panasyuk et al. |
| 2005/0256923 A1 | 11/2005 | Adachi |
| 2005/0259634 A1 | 11/2005 | Ross |
| 2005/0262357 A1 | 11/2005 | Araujo et al. |
| 2005/0265315 A1 | 12/2005 | Edgar |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0015570 A1 | 1/2006 | Khemani et al. |
| 2006/0018332 A1 | 1/2006 | Kakani et al. |
| 2006/0031547 A1 | 2/2006 | Tsui et al. |
| 2006/0034283 A1 | 2/2006 | Ko et al. |
| 2006/0041635 A1 | 2/2006 | Alexander et al. |
| 2006/0053164 A1 | 3/2006 | Ewing et al. |
| 2006/0053253 A1 | 3/2006 | Roth et al. |
| 2006/0059370 A1 | 3/2006 | Asnis et al. |
| 2006/0064500 A1 | 3/2006 | Roth et al. |
| 2006/0069719 A1 | 3/2006 | McCanne et al. |
| 2006/0080441 A1 | 4/2006 | Chen et al. |
| 2006/0089996 A1 | 4/2006 | Peiffer |
| 2006/0095758 A1 | 5/2006 | Kim et al. |
| 2006/0112185 A1 | 5/2006 | Van Bemmel |
| 2006/0123477 A1 | 6/2006 | Raghavan et al. |
| 2006/0129528 A1 | 6/2006 | Miyamoto et al. |
| 2006/0129689 A1 | 6/2006 | Ho et al. |
| 2006/0133405 A1 | 6/2006 | Fee |
| 2006/0142878 A1 | 6/2006 | Banik et al. |
| 2006/0146877 A1 | 7/2006 | Srivastava |
| 2006/0156023 A1 | 7/2006 | Luo et al. |

(56) References Cited

U.S. PATENT DOCUMENTS

| | | |
|---|---|---|
| 2006/0167883 A1 | 7/2006 | Boukobza |
| 2006/0167975 A1 | 7/2006 | Chan et al. |
| 2006/0185010 A1 | 8/2006 | Sultan |
| 2006/0195840 A1 | 8/2006 | Sundarrajan et al. |
| 2006/0225130 A1 | 10/2006 | Chen et al. |
| 2006/0245414 A1 | 11/2006 | Susai et al. |
| 2006/0271652 A1 | 11/2006 | Stavrakos et al. |
| 2006/0274761 A1 | 12/2006 | Error et al. |
| 2006/0274828 A1 | 12/2006 | Siemens et al. |
| 2007/0008883 A1 | 1/2007 | Kobayashi |
| 2007/0061067 A1 | 3/2007 | Zeinstra et al. |
| 2007/0067366 A1 | 3/2007 | Landis |
| 2007/0073703 A1 | 3/2007 | Quin |
| 2007/0110046 A1 | 5/2007 | Farrell et al. |
| 2007/0130324 A1 | 6/2007 | Wang |
| 2007/0130334 A1 | 6/2007 | Carley |
| 2007/0156852 A1 | 7/2007 | Sundarrajan et al. |
| 2007/0156876 A1 | 7/2007 | Sundarrajan et al. |
| 2007/0169179 A1 | 7/2007 | Narad |
| 2007/0179955 A1 | 8/2007 | Croft et al. |
| 2007/0192827 A1 | 8/2007 | Maxted et al. |
| 2007/0198684 A1 | 8/2007 | Mizushima |
| 2007/0203910 A1 | 8/2007 | Ferguson et al. |
| 2007/0206621 A1 | 9/2007 | Plamondon et al. |
| 2007/0233910 A1 | 10/2007 | Paley et al. |
| 2007/0245409 A1 | 10/2007 | Harris et al. |
| 2007/0271570 A1 | 11/2007 | Brown et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0071915 A1 | 3/2008 | Gbadegesin |
| 2008/0104089 A1 | 5/2008 | Pragada et al. |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320007 A1 | 12/2008 | Hind et al. |
| 2008/0320151 A1 | 12/2008 | McCanne et al. |
| 2009/0034537 A1 | 2/2009 | Colrain et al. |
| 2009/0133015 A1 | 5/2009 | Nagashima |
| 2009/0234957 A1 | 9/2009 | Li et al. |
| 2009/0271385 A1 | 10/2009 | Krishnamoorthy et al. |
| 2010/0241846 A1 | 9/2010 | Sundarrajan et al. |

FOREIGN PATENT DOCUMENTS

| | | |
|---|---|---|
| EP | 0 436 365 | 7/1991 |
| EP | 0 618 708 A2 | 10/1994 |
| EP | 0 838 930 A2 | 4/1998 |
| EP | 1 045 553 | 10/2000 |
| EP | 1 134 942 | 9/2001 |
| EP | 1 427 133 | 6/2004 |
| EP | 1 432 209 | 6/2004 |
| JP | 07-302237 A | 11/1995 |
| JP | 08-006910 A | 1/1996 |
| JP | 10-178450 | 6/1998 |
| JP | 2002-532784 | 2/2002 |
| JP | 2002-084289 | 3/2002 |
| JP | 2004-078783 | 3/2004 |
| WO | WO-99/04343 | 1/1999 |
| WO | WO-00/34885 | 6/2000 |
| WO | WO-01/47185 A2 | 6/2001 |
| WO | WO-02/13037 | 2/2002 |
| WO | WO-02/23362 A1 | 3/2002 |
| WO | WO-02/39301 A2 | 5/2002 |
| WO | WO-02/069604 A2 | 9/2002 |
| WO | WO-03/019876 | 3/2003 |
| WO | WO-03/026244 | 3/2003 |
| WO | WO-03/048936 A1 | 6/2003 |
| WO | WO-03/083692 | 10/2003 |
| WO | WO-2004/088933 | 10/2004 |
| WO | WO-2004/114529 A2 | 12/2004 |
| WO | WO-2005/013534 | 2/2005 |
| WO | WO-2005/024567 A2 | 3/2005 |
| WO | WO-2005/048106 | 5/2005 |
| WO | WO-2005/088476 | 9/2005 |
| WO | WO-2006/005078 | 1/2006 |
| WO | WO-2006/005078 A2 | 1/2006 |
| WO | WO-2006/012612 | 2/2006 |
| WO | WO-2006/020823 | 2/2006 |
| WO | WO-2006/074072 A3 | 7/2006 |
| WO | WO-2006/075219 A2 | 7/2006 |
| WO | WO-2008/112691 A2 | 9/2008 |
| WO | WO-2008/112698 A2 | 9/2008 |

OTHER PUBLICATIONS

U.S. Appl. No. 11/323,196 US Office Action Aug. 3, 2009.
U.S. Appl. No. 11/324,141 US Office Action Feb. 27, 2009.
U.S. Appl. No. 11/324,141 US Office Action Mar. 3, 2010.
Advisory Action for U.S. Appl. No. 11/039,946 dated Mar. 24, 2009.
Biagioni et al., Signature for a network Protocol Stack: A System Application of Standard ML, Jul. 1994.
Chinese Office Action on 200580028535.9 dated Dec. 13, 2011.
Chinese Office Action on 201110075213.7 dated Jan. 30, 2012.
Chinese Office Action on 201110076025.6 dated Oct. 26, 2011.
Dictionary service [online], [retrieved on Jul. 23, 2009]. Retrieved from the Internet <URL: http://dictionary.reference.com/browse/discard>.
Doug Allen, Layer-7 Load Balancers Pack New Punch, CMP Media LLC Network Magazine, Sep. 2003.
European Communication on 05763688.8 dated Dec. 1, 2011.
European Communication on 05855922.0 dated Nov. 24, 2011.
European Examination Report on 05855924.6 dated Nov. 24, 2011.
Hasegawa et al., "A Mechanism for TCP Performance Enhancement over Assymetrical Environment," Proceedings 8th IEEE ISCC'03, 1530-1346/03, 2003.
International Search Report for PCT/US2005/022884, mailed on Jul. 8, 2008. (2 pages).
International Search Report for PCT/US2005/047433. mailing date Sep. 8, 2006. 5 pages.
J. C. Mogul, "The Case for Persistent-Connection HTTP," 8282 Computer Communication Review Oct. 25, 1995.
Japanese Office Action for JP appl. 2007-519353 dated Jul. 16, 2010.
Japanese Office Action on 2007-549641 dated Jan. 17, 2012.
Japanese Office Action on 2007-552147 dated Apr. 16, 2012.
Japanese Office Action on 2007-552147 dated Jun. 30, 2011.
Kong, et al; "Pseudo-serving: a user-responsible paradigm for internet access"; Apr. 7-11, 1997; SO Computer Networks and ISDN Systems; vol. 29; pp. 1053-1064.
Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.
Lazenka, M. "The Evolution of Software Distribution: Where Did We Come From and Where Are We Heading?", Nov. 6-9, 2005, ACM, p. 179-183.
Ipswitch Inc., WSFTP User's Guide, Chapter 8: Security, Jun. 25, 2003, 8 pages.
Non Final Office Action dated Jun. 23, 2008 pertaining to U.S. Appl. No. 11/039,946. (14 pages).
Non Final Office Action dated Nov. 21, 2007 for U.S. Appl. No. 11/323,196. 14 pages.
Non Final Office Action, U.S. Appl. No. 11/323,196. dated May 14, 2008.
Notice of Allowance for U.S. Appl. No. 11/039,946 dated Mar. 5, 2010.
Notice of Allowance for U.S. Appl. No. 11/323,353 dated Nov. 15, 2010.
Notice of Allowance on U.S. Appl. No. 11/324,141 dated Apr. 25, 2012.
Notice of Allowance on U.S. Appl. No. 12/794,446 dated May 7, 2012.
Notice of Allowance on U.S. Appl. No. 11/323,196 mailed on Apr. 19, 2010.
Notice of Reasons for Rejection, Japanese Application No. 2007-549641, mailed May 17, 2011.
Office Action U.S. Appl. No. 11/323,353 mailed on Jun. 25, 2010.
Office Action for CN App. No. 200580048867.3 dated Sep. 26, 2010.

(56) References Cited

OTHER PUBLICATIONS

Office Action for CN App. No. 200580048867.3 dated Jan. 26, 2011.
Office Action for CN appln 200580028535 dated Jan. 15, 2010.
Office Action for CN Appln 200580048867.3 mailed Mar. 11, 2011.
Office Action for U.S. Appl. No. 11/039,946 mailed on Jun. 23, 2008, 11 pages.
Office Action for U.S. Appl. No. 11/324,131 dated Oct. 3, 2008.
Office Action for U.S. Appl. No. 11/324,131 dated Oct. 6, 2009.
Office Action for U.S. Appl. No. 11/324,131 dated Mar. 7, 2011.
Office Action for U.S. Appl. No. 11/324,131 dated Apr. 2, 2009.
Office Action for U.S. Appl. No. 11/324,131 dated May 27, 2010.
Office Action for U.S. Appl. No. 11/324,203 dated Sep. 1, 2009.
Office Action for U.S. Appl. No. 11/323,353 dated Jun. 3, 2009.
Office Action for U.S. Appl. No. 11/324,141 dated Aug. 21, 2009.
Office Action for U.S. Appl. No. 11/323,352 mailed Mar. 9, 2009.
Office Action for U.S. Appl. No. 11/323,354 mailed Feb. 4, 2009.
Office Action for U.S. Appl. No. 11/323,354 mailed Aug. 4, 2009.
Office Action for U.S. Appl. No. 11/324,138 mailed Aug. 18, 2009.
Office Action for U.S. Appl. No. 11/324,138, mailed Feb. 11, 2009.
Office Action for U.S. Appl. No. 11/324,140 mailed Feb. 4, 2009.
Office Action for U.S. Appl. No. 11/324,140 mailed Aug. 4, 2009.
Office Action from Sep. 25, 2008 for U.S. Appl. No. 11/323,196, 19 pages.
Office Action from Dec. 30, 2008 for U.S. Appl. No. 11/323,353, pp. 22.
Office Action on 099011-0536 dated Nov. 19, 2010.
Office Action on U.S. Appl. No. 11/323,352 dated Nov. 8, 2011.
Office Action on U.S. Appl. No. 11/323,352 dated Feb. 2, 2011.
Office Action on U.S. Appl. No. 11/323,352 dated May 9, 2012.
Office Action on U.S. Appl. No. 11/323,354 dated Mar. 7, 2011.
Office Action on U.S. Appl. No. 11/323,354 dated Sep. 6, 2011.
Office Action on U.S. Appl. No. 11/323,829 dated Mar. 30, 2011.
Office Action on U.S. Appl. No. 11/323,829 dated Apr. 11, 2012.
Office Action on U.S. Appl. No. 11/323,829 dated Sep. 15, 2011.
Office Action on U.S. Appl. No. 11/323,829 dated Sep. 27, 2010.
Office Action on U.S. Appl. No. 11/324,131 dated Jan. 4, 2012.
Office Action on U.S. Appl. No. 11/324,131 dated Aug. 11, 2011.
Office Action on U.S. Appl. No. 11/324,138 dated Dec. 22, 2010.
Office Action on U.S. Appl. No. 11/324,138 dated Jul. 11, 2011.
Office Action on U.S. Appl. No. 11/324,141 dated Nov. 10, 2010.
Office Action on U.S. Appl. No. 11/324,141 dated Dec. 15, 2011.
Office Action on U.S. Appl. No. 11/324,141 dated Apr. 26, 2011.
Office Action on U.S. Appl. No. 12/794,446 dated Nov. 23, 2011.
Office Action on U.S. Appl. No. 12/874,927 dated Apr. 24, 2012.
Office Action on U.S. Appl. No. 13/031,919 dated Jun. 6, 2012.
Office Action on U.S. Appl. No. 11/323,353 mailed on Dec. 10, 2009.
Office Action, Chinese Appln 200580048867.3, mailed Sep. 26, 2010.
Office Action, Chinese Appln No. 200580048867.3, mailed Jan. 26, 2011.
Official Notification from Israeli Patent Office, for Appl No. 184750 mailed Apr. 7, 2011.
Official Notification, Israeli Appln 184308, mailed Feb. 7, 2011.
Pedro Hernandez, "Tacit Adds to Softricity's Spark", Nov. 18, 2005. Available online at: www.enterpriseitplant.com/networking/news/article.php/3565401.
R. Briscoe, "The Implications of Pervasive Computing on Network Design," BT Technology Journal, pp. 170-190, Jul. 2004.
Ranzau et al., "Softricity/Tacit, an Innovative Approach to Virtual Computing," http://www.daboc.com/downloadnow.aspx?file=211&is=617, Oct. 20, 2005.
Teruhara Serada, "SSL VPN", N+1 Network LAN, vol. 21, No. 3, Mar. 1, 2003, pp. 25-40. (English Abstract).
Written Opinion for PCT/US2005/047433 dated Jun. 30, 2007.
Written Opinion for PCT/US2005/047435 dated Aug. 8, 2006.
Written Opinion of the ISA for PCT/US2005/022884, mailed on Jul. 8, 2008 (6 pages).
Yoshikazu Kobayashi, VPN service introduction, Computer & Network LAN, vol. 21, No. 3, Mar. 1, 2003, pp. 25-40. (19 pages) (English Abstract).

Chinese Office Action on 200580028489.2 dated Mar. 5, 2012.
Examination Report on 3929/KOLNP/2006 dated Nov. 30, 2012.
Japanese Office Action on 2011-178635 dated Oct. 18, 2012.
Notice of Allowance on U.S. Appl. No. 11/324,131 dated Sep. 26, 2012.
Office Action on U.S. Appl. No. 11/323,829 dated Sep. 11, 2012.
Office Action on U.S. Appl. No. 13/031,919 dated Sep. 26, 2012.
Second Chinese Office Action on 201110075213.7 dated Nov. 1, 2012.
Dutta D. et al., An Active Proxy Based Architecture for TCP in Heterogeneous Variable Bandwidth Networks, Proceedings of IEEE Globecom 2001, vol. 4, p. 2316-2320, Nov. 2001.
In Examination Report for Application No. 3929/KOLNP/2006 dated Nov. 30, 2012.
Expand Networks Accelerators, a Technical Overview. Whitepaper, Expand Networks, Apr. 2004.
International Search Report for PCT/US2005/047433, dated Sep. 14, 2006, 6 pages.
International Search Report for PCT/US2005/047435 dated Sep. 8, 2006.
JP Office Action for Application No. 2011-178635 dated Oct. 18, 2012.
JP Office Action for Application No. 2011-178635 dated Mar. 13, 2013.
Noriaki Kobayashi, "Internet VPN", N+1 Network Guide, vol. 3, No. 9, Oct. 1, 2003, pp. 44-49. (9 pages) (English Abstract).
US Notice of Allowance for U.S. Appl. No. 11/324,131 dated Sep. 26, 2012.
JP Office Action for Application No. 2007-519353 dated Jul. 12, 2010 (6 pages) (English Abstract).
US Office Action for U.S. Appl. No. 11/039,946 dated Jun. 23, 2009.
US Office Action for U.S. Appl. No. 11/039,946 dated Jan. 23, 2009.
US Office Action for U.S. Appl. No. 11/323,829 dated Jun. 18, 2009.
US Office Action for U.S. Appl. No. 11/323,829 dated Apr. 24, 2013.
US Office Action for U.S. Appl. No. 11/323,829 dated Sep. 11, 2012.
US Office Action for U.S. Appl. No. 11/323,829 dated Mar. 30, 2011.
US Office Action for U.S. Appl. No. 11/324,138 dated Jul. 11, 2011.
CN Office Action for Application No. 201110075213.7 dated Nov. 1, 2012.
US Notice of Allowance for U.S. Appl. No. 11/323,354 dated Sep. 3, 2013.
US Notice of Allowance for U.S. Appl. No. 13/031,919 dated Mar. 29, 2013.
US Notice of Allowance for U.S. Appl. No. 11/323,354 dated Feb. 28, 2013.
US Notice of Allowance for U.S. Appl. No. 11/323,354 dated May 31, 2013.
US Office Action for U.S. Appl. No. 11/323,352 dated May 14, 2013.
US Office Action for U.S. Appl. No. 13/590,630 dated Oct. 17, 2013.
US Office Action for U.S. Appl. No. 13/744,614 dated May 17, 2013.
Wang et al., Shield: Vulnerability-Driven Network Filters for Preventing Known Vulnerability Exploits, Feb. 2004, Microsoft Research, MSR-TR-2003-81.
Written Opinion of the International Searching Authority for PCT/US2007/066433 dated Oct. 31, 2007.
Decision on Rejection issued Jun. 3, 2013 in Chinese Patent Application No. 201110075213.7.
US Office Action for U.S. Appl. No. 13/031,919 dated Sep. 26, 2012.
US Office Action for U.S. Appl. No. 13/590,630 dated Apr. 30, 2013.
US Office Action for U.S. Appl. No. 11/324,203 dated Sep. 1, 2009.
In Examination Report for Application No. 2626/KOLNP/2007 dated Jul. 29, 2013.
Hu, et al., Adaptive Fast Path Architecture, IBM J. Res & Dev, vol. 45, Mar. 1, 2001, pp. 191-206. Retrieved from: http://gec.di.uminho.pt/discip/minf/ac0203/ICCA03IBM_WebCachArch.pdf.
EP Examination Report for Application No. 05855922.0 dated Jun. 17, 2014, p. 1-5.
Chinese Office Action issued May 4, 2014 in Chinese Patent Application No. 201110267244.2, p. 1-9.
EP Search Report for Application No. 13195700.3 dated May 6, 2014, p. 1-7.

\* cited by examiner

SYSTEMS AND METHODS FOR AUTOMATIC INSTALLATION AND EXECUTION OF A CLIENT-SIDE ACCELERATION PROGRAM

RELATED APPLICATIONS

This present application claims the benefit of and priority to U.S. Provisional Patent Application No. 60/640,464 entitled "SYSTEM AND METHOD FOR DYNAMIC ACCELERATION OF REMOTELY-ACCESSED APPLICATIONS," filed Dec. 30, 2004, which is incorporated by reference in its entirety. This application is also a continuation of co-pending U.S. application Ser. No. 11/324,203, entitled "SYSTEMS AND METHODS FOR AUTOMATIC INSTALLATION AND EXECUTION OF A CLIENT-SIDE ACCELERATION PROGRAM," filed Dec. 30, 2005, which is incorporated herein by reference.

FIELD OF THE INVENTION

The present invention generally relates to data communication networks. In particular, the present invention relates to systems and methods for automatically deploying, installing and executing a client-side acceleration program.

BACKGROUND OF THE INVENTION

Enterprises are increasingly being asked to provide access to applications to employees, partners and service provides located outside the perimeter of the enterprise network. However, congested wide area network (WAN) links, heavily loaded servers, and low-bandwidth remote connections can impede access to and slow performance of remotely-accessed applications. These factors can substantially impact and reduce employee productivity and the return on investment in enterprise application software and infrastructure. Furthermore, these factors can also frustrate and alienate users from using remotely-accessed application. To obtain a satisfactory return on investment from these applications, enterprises need to ensure that all users, regardless of location, can use the applications quickly and effectively.

One approach for improving the performance of remotely-accessed applications is to install an appliance within the enterprise network that performs certain functions to accelerate application performance. The appliance is typically installed as a gateway between the WAN on a pubic network and the enterprise servers on a private data network and processes data passing between the two. When such an appliance is dedicated to performing acceleration functions, it is often referred to as an "accelerator." Because the accelerator is deployed within the enterprise network, it is more effective at reducing latency on the enterprise network itself and in reducing the load on the enterprise servers. However, it is less effective at addressing delays due to problems arising outside the enterprise network, such as congested WAN links and low-bandwidth remote connections.

In another approach, some companies offer application acceleration solutions for the client side of the WAN, or the client-side LAN. These solutions typically fall into two main categories: (1) network appliances that can be installed as a gateway between the client and the WAN and that perform application acceleration functions; and (2) application acceleration servers residing on a client-side LAN. However, installing and maintaining accelerator servers or appliances on the client-side LAN consumes time, expense and resources. In many cases, an enterprise network can be accessed from many different remote sites, such as from many different branch offices. To deploy client-side acceleration for all remote clients, the enterprise would have to install and maintain an appliance-based or server-based accelerator at each remote site. Additionally, if the need to access applications from a remote site is sporadic, the time, expense and resources of installing and maintaining such an accelerator on the client-side LAN at the site may exceed the benefit.

Furthermore, a solution of an appliance or server-based accelerator on the client-side LAN can be a confining one because it limits acceleration of client-side LANs to locations having server-based or appliance-based accelerators. With users having access to multiple computing devices at different remote locations coupled with the ubiquity of mobile computing devices and the increasing availability of wireless network access, a user may access a network from a wide range of remote access points at any point in time. For example, during the course of a user roaming between access points, a user may be able to access the enterprise network from an office desktop computer, a smartphone or personal digital assistant, a laptop computer, a home office computer, or a computer at a remote office location, such as at a customer or client office. As such, the user may desire to access remote applications via the enterprise network at any remote location and on any one of multiple computers available to the user. Each of the remote access point and/or multiple computing devices available to the user may have a different client-side LAN connection to the enterprise network. The enterprise may not have the time, expense and resources to deploy a client-side LAN solution at all the possible remote access points or for all the possible computing devices, or to continually install and maintain such solutions with the increasing number of remote access points and computing devices of the user. Additionally, the user may access the enterprise network from a public network, private network, or a client-side LAN not accessible to or under the control or management of the enterprise. As such, an enterprise may not be able to deploy a client-side LAN accelerator to all these access points.

What is desired, then, are systems and methods that provide client-side acceleration capabilities for improving the performance of remotely-accessed applications. The desired systems and methods should not require the installation and maintenance of a network appliance or a server running acceleration software between the client and the WAN. To further improve the performance of remotely-accessed applications, it would also be desired if accelerator functions could be implemented both on the client side and the enterprise network side of the WAN.

BRIEF SUMMARY OF THE INVENTION

The present invention is directed towards systems and methods for dynamically deploying and executing acceleration functionality on a client to improve the performance and delivery of remotely accessed applications. The client-side acceleration functionality is provided by an acceleration program that performs a plurality of the following acceleration techniques in an integrated and efficient manner: 1) multi-protocol compression 2) transport control protocol pooling, 3) transport control protocol multiplexing 4) transport control protocol buffering, and 5) caching. In one aspect, the acceleration program of the present invention is automatically installed and executed on a client in a manner transparent to and seamless with the operation of the client. An appliance may intercept a request of the client to establish a communication session or connection with a server, and transmit the acceleration program to the client. In some cases, the appliance determines whether the application being accessed by the client can be accelerated and only provides the acceleration program if the application can be accelerated. Upon receipt of the acceleration program, the client automatically performs a silent installation of the acceleration program and executes the acceleration program upon completion of the installation.

In one aspect, the present invention is related to a method for dynamically providing an acceleration program to a client to automatically install and execute. The acceleration program accelerates access by the client to a remotely accessed application. The method includes the steps of receiving, by an appliance, a request by a client to establish a communication session with a server, and transmitting, by the appliance, to the client an acceleration program comprising a network driver for performing, on the client, acceleration of a client's access to an application provided via the server. Upon receipt of the acceleration program, the client automatically performs a silent installation of the network driver to storage of the client. Upon installation of the network driver, the client automatically executes the network driver in memory allocated to the network stack of the client.

In one embodiment of the present invention, the method includes transmitting, by the appliance, the acceleration program to the client upon establishment of the communication session with the server. In another embodiment, the method includes establishing, by the acceleration program, the communication session with the server. In some embodiments, the acceleration program is installed on the client without a reboot of the client or an interaction by a user of the client. In other embodiments, the installation and execution of the acceleration program is performed on the client transparently to a user of the client, an application of the client, or the server. In some embodiments, the network driver of the present invention comprises a filter device driver interfaced to a transport layer of the network stack. In one embodiment, the acceleration program provides client-side accelerated access to an application on the server transparently to a network layer, a session layer, or application layer of the network stack.

In another embodiment, the method of the present invention includes transmitting, by the appliance, a first program to the client. The first program includes the acceleration program. Upon receipt of the first program, the client automatically executes the first program to install and execute the acceleration program. In some embodiments, the first program includes executable instructions provided to and executed on a browser.

In some embodiments of the present invention, the method includes receiving, by the appliance, a request from the client to access an application on the server, and transmitting, by the appliance, a message to the client communicating to the acceleration program to perform at least one acceleration technique on communications between the client and the server. In a further embodiment, the appliance determines whether the application is capable of being accelerated, and transmits the message to the client if the application is capable of being accelerated.

In some embodiments, the acceleration program executes on the client one of the following acceleration techniques: 1) compression, 2) decompression, 3) Transmission Control Protocol connection pooling, 4) Transmission Control Protocol connection multiplexing, 5) Transmission Control Protocol buffering, and 6) caching. In another embodiment, the acceleration program performs encryption or decryption of communications between the client and the server. In one embodiment, the network driver establishes a virtual private network connection with the appliance or the server. The appliance may include a cache, a gateway, a server, a firewall, a proxy, a router, a switch, or a bridge.

In another aspect, the present invention is related to a method for dynamically providing an acceleration program to a client for accelerating access by the client to a remotely accessed application. The method includes receiving, by an appliance, a request from a client to access an application via a server, and determining, by the appliance, the application is capable of being accelerated. The method further includes transmitting, by the appliance, an acceleration program to the client for automatic installation and execution on the client. In one embodiment, the method of the present invention includes automatically executing and installing, by the client, the acceleration program receipt of the acceleration program from the appliance. In some embodiments, the client receives, installs, and/or executes the acceleration program transparently to an application on the client, a user on the client, or the server.

In another embodiment, the appliance determines the application is not capable of being accelerated, and forwards the request to the server. In some embodiments, the appliance determines the application is capable of being accelerated by one of the following acceleration techniques: compression: 1) compression, 2) decompression, 3) Transmission Control Protocol connection pooling, 4) Transmission Control Protocol connection multiplexing, 5) Transmission Control Protocol buffering, and 6) caching. The appliance may transmit an acceleration program configured to provide the acceleration technique determined, by the appliance, to be capable of accelerating the application. The acceleration program may perform or execute one of these acceleration techniques. In some embodiments, the acceleration program provides a virtual private network to the appliance or the server. The appliance may include a cache, a gateway, a server, a firewall, a proxy, a router, a switch, or a bridge.

In some aspects, the present invention is related to an appliance for dynamically providing an acceleration program to a client for accelerating access by the client to a remotely accessed application. The appliance may includes a means for receiving a request from a client to access an application via a server, determining the application is capable of being accelerated, and transmitting an acceleration program to the client. The acceleration program may be configured for automatic installation and execution on the client.

In some embodiments, the appliance may also include a means for determining, by the appliance, the application is not capable of being accelerated, and forwarding the request to the server. In other embodiments, the appliance includes a means for determining, by the application, the application is capable of being accelerated by one of the following acceleration techniques: 1) compression, 2) decompression, 3) Transmission Control Protocol connection pooling, 4) Transmission Control Protocol connection multiplexing, 5) Transmission Control Protocol buffering, and 6) caching. In one embodiment, the appliance has a means for transmitting, by the appliance, the acceleration program configured to provide the acceleration technique determined, by the appliance, to be capable of accelerating the application. The appliance may also establish a virtual private network with the acceleration program. The appliance may include a cache, a gateway, a server, a firewall, a proxy, a router, a switch, or a bridge.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
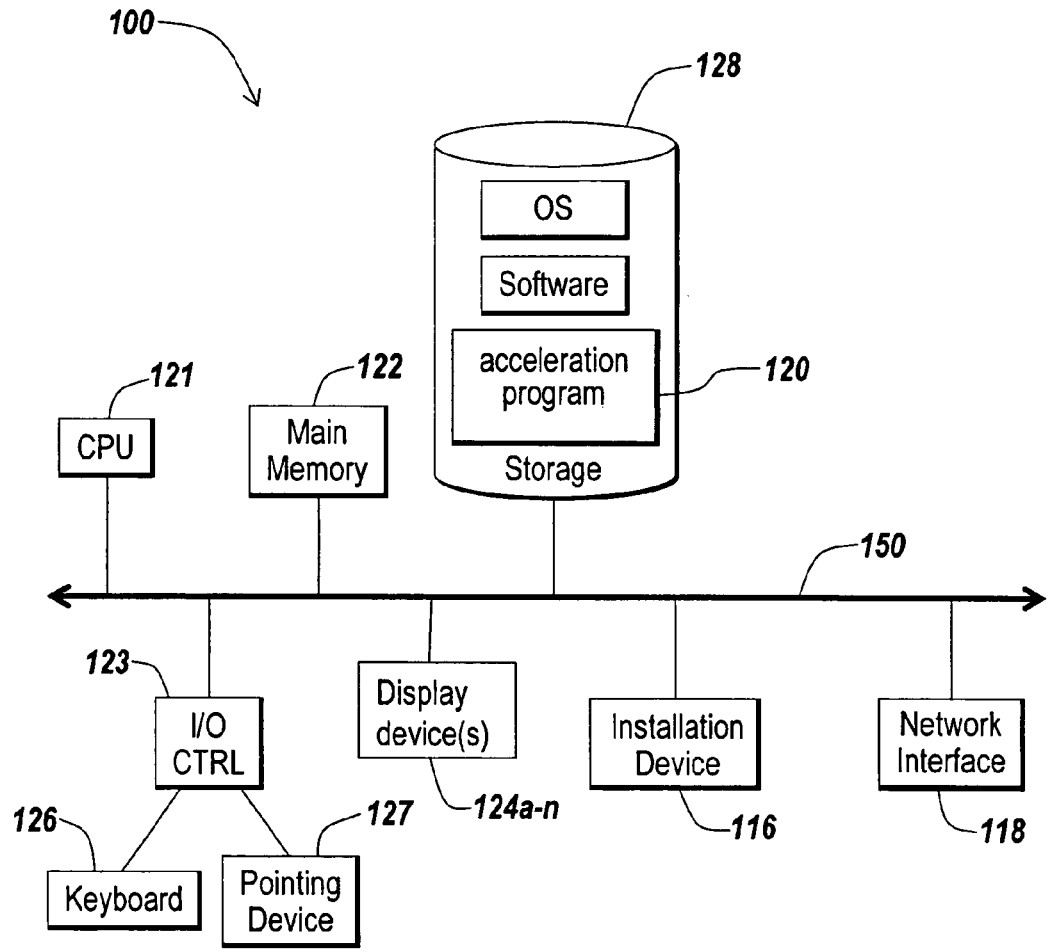
FIGS. 1A and 1B are block diagrams of embodiments of a computing device for practicing an illustrative embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

The illustrative embodiments of the present invention are directed towards the deployment and execution of client-side acceleration techniques in a network environment to improve the performance of communications between a client and a server, such as for a remotely-accessed application. In one illustrative embodiment, the present invention is directed towards the automatic installation and execution of a client-side acceleration program on a client in a manner transparent to and seamless with the operation of the client. In another illustrative embodiment, the present invention is directed towards dynamically providing by an appliance device the client-side acceleration program to the client upon determination of the device that the client's access to a server or remote application can be accelerated. In another illustrative embodiment, the present invention is directed towards an acceleration program performing one or more of the following acceleration techniques on the client: 1) multi-protocol compression 2) transport control protocol pooling, 3) transport control protocol multiplexing 4) transport control protocol buffering and 5) caching. In one illustrative embodiment, the present invention performs these acceleration techniques in an integrated and efficient manner at the transport layer using a kernel-level data structure. In yet another illustrative embodiment, the client-side acceleration program performs proxy redirection techniques to automatically bypass any intermediary devices to continuously provided access by the client to the server or a remotely accessed application.

Figure 1B:
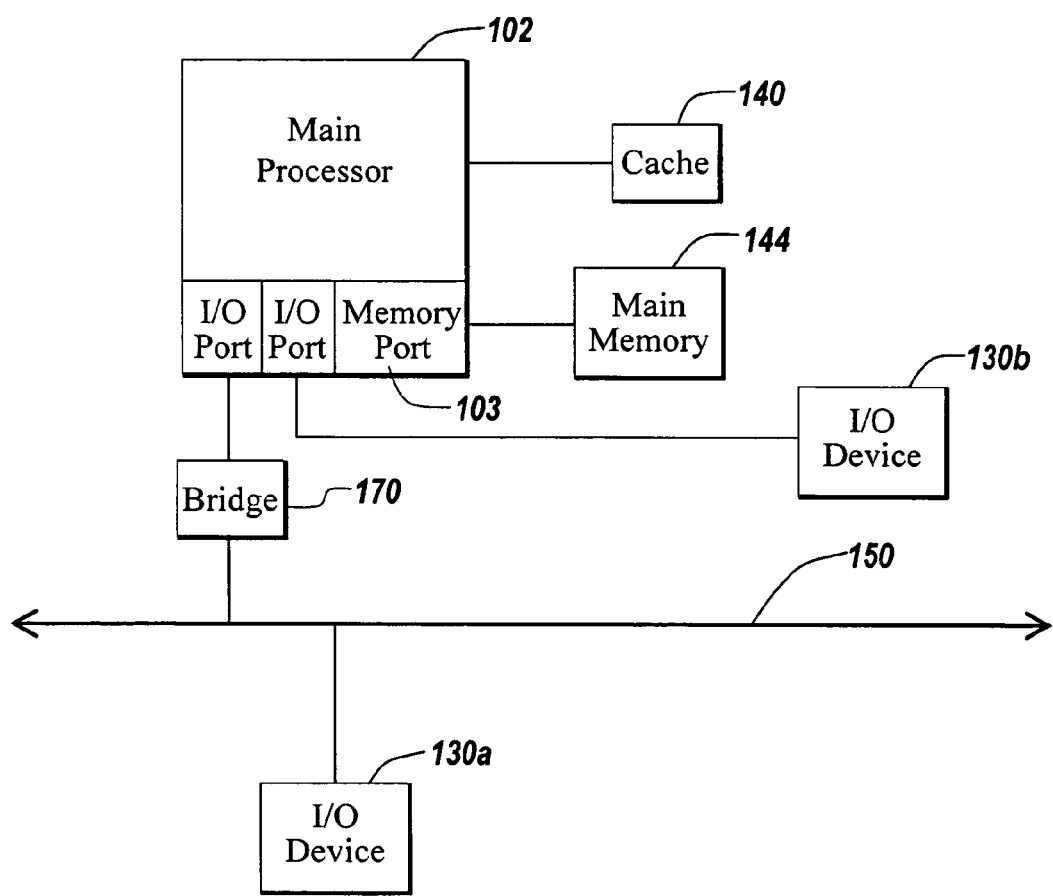

The client-side acceleration program and functionality of the present invention may be deployed and executed on any type and form of computing device, such as a computer, network device or appliance capable of communicating on any type and form of network and performing the operations of the present invention described herein. FIGS. 1A and 1B depict block diagrams of a computing device 100 useful for practicing an embodiment of the present invention. As shown in FIGS. 1A and 1B, each computing device 100 includes a central processing unit 102, and a main memory unit 122. As shown in FIG. 1A, a typical computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 102, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 102 communicates with main memory 204 via a system bus 150 (described in more detail below). FIG. 1A depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 122 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any acceleration software 120, or portion thereof, related to the present invention.

The computing device 100 may further comprise a storage device 128, such as one or more hard disk drives or redundant arrays of independent disks, for storing an operating system and other related software, and for storing application software programs such as any program related to the acceleration program 120 of the present invention. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 300, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2A:
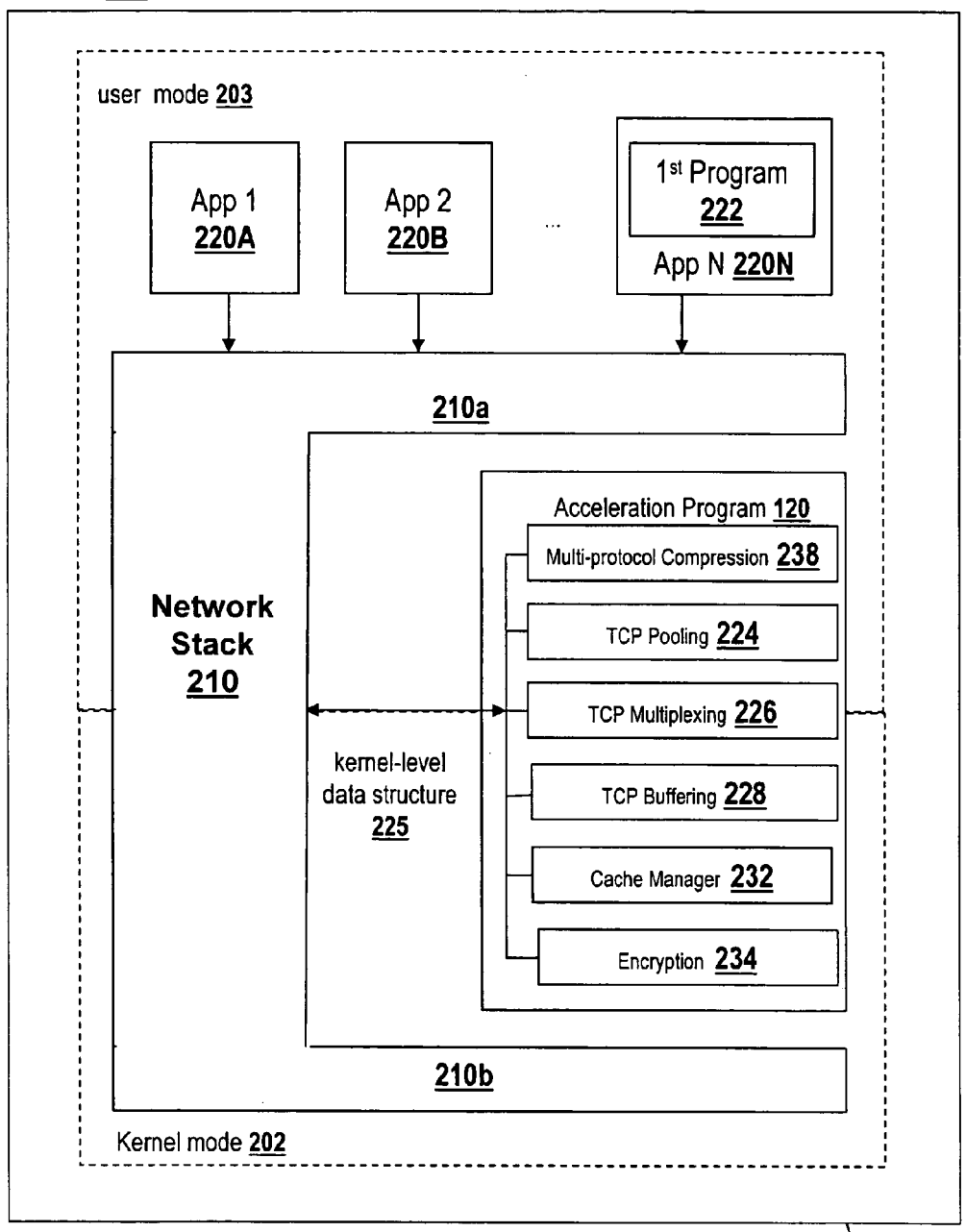
FIG. 2A is a block diagram of an embodiment of a client-side acceleration program of the present invention.

In one aspect, the present invention is related to a client-side acceleration program for performing one or more acceleration techniques to accelerate, enhance or otherwise improve a client's communications with and/or access to a server, such as accessing an application provided by a server. Referring now to FIG. 2A, a client 205 having the acceleration program 120 of the present invention is depicted. In brief overview, the client 205 operates on computing device 100 having an operating system with a kernel mode 202 and a user mode 202, and a network stack 210 with one or more layers 210a-210b. The client 205 may have installed and/or execute one or more applications 220a-220n. In some embodiments, one or more applications 220a-220n may communicate via the network stack 210 to a network. One of the applications 220N may also include a first program 222, for example, a program which may be used in some embodiments to install and/or execute the acceleration program 120.

The network stack 210 of the client 205 may comprise any type and form of software, or hardware, or any combinations thereof, for providing connectivity to and communications with a network. In one embodiment, the network stack 210 comprises a software implementation for a network protocol suite. The network stack 210 may comprise one or more network layers, such as any networks layers of the Open Systems Interconnection (OSI) communications model as those skilled in the art recognize and appreciate. As such, the network stack 210 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 210 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 210 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 210, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 210 may be customized, modified or adapted to provide a custom or modified portion of the network stack 210 in support of any of the techniques of the present invention described herein. In other embodiments, the acceleration program 120 is designed and constructed to operate with or work in conjunction with the network stack 210 installed or otherwise provided by the operating system of the client 205.

The network stack 210 comprises any type and form of interfaces for receiving, obtaining, providing or otherwise accessing any information and data related to network communications of the client 205. In one embodiment, an interface to the network stack 210 comprises an application programming interface (API). The interface may also comprise any function call, hooking or filtering mechanism, event or call back mechanism, or any type of interfacing technique. The network stack 210 via the interface may receive or provide any type and form of data structure, such as an object, related to functionality or operation of the network stack 210. For example, the data structure may comprise information and data related to a network packet or one or more network packets. In some embodiments, the data structure comprises a portion of the network packet processed at a protocol layer of the network stack 210, such as a network packet of the transport layer. In some embodiments, the data structure 225 comprises a kernel-level data structure, while in other embodiments, the data structure 225 comprises a user-mode data structure. A kernel-level data structure may comprise a data structure obtained or related to a portion of the network stack 210 operating in kernel-mode 202, or a network driver or other software running in kernel-mode 202, or any data structure obtained or received by a service, process, task, thread or other executable instructions running or operating in kernel-mode of the operating system.

Additionally, some portions of the network stack 210 may execute or operate in kernel-mode 202, for example, the data link or network layer, while other portions execute or operate in user-mode 203, such as an application layer of the network stack 210. For example, a first portion 210a of the network stack may provide user-mode access to the network stack 210 to an application 220a-220n while a second portion 210a of the network stack 210 provides access to a network. In some embodiments, a first portion 210a of the network stack may comprise one or more upper layers of the network stack 210, such as any of layers 5-7. In other embodiments, a second portion 210b of the network stack 210 comprises one or more lower layers, such as any of layers 1-4. Each of the first portion 210a and second portion 210b of the network stack 210 may comprise any portion of the network stack 210, at any one or more network layers, in user-mode 203, kernel-mode, 202, or combinations thereof, or at any portion of a network layer or interface point to a network layer or any portion of or interface point to the user-mode 203 and kernel-mode 203.

The acceleration program 120 of the present may comprise software, hardware, or any combination of software and hardware. In some embodiments, the acceleration program 120 comprises any type and form of executable instructions constructed and designed to execute or provide the functionality and operations of the present invention as described herein. In some embodiments, the acceleration program 120 comprises any type and form of application, service, process, task or thread. In one embodiment, the acceleration program 120 comprises a driver, such as a network driver constructed and designed to interface and work with the network stack 210. The logic, functions, and/or operations of the executable instructions of the acceleration program 120 may perform one or more of the following acceleration techniques of the present invention: 1) multi-protocol compression 238, 2) transport control protocol pooling 224, 3) transport control protocol multiplexing 226, 4) transport control protocol buffering 228, and 5) caching via a cache manager 232, which will be described in further detail below. Additionally, the acceleration program 120 may perform encryption 234 and/or decryption of any communications received and/or transmitted by the client 205. In some embodiments, the acceleration program 120 also performs tunneling between the client 205 and another computing device 100, such as a server. In other embodiments, the acceleration program 120 provides a virtual private network connection to a server.

In some embodiments, the acceleration program 120 operates at one or more layers of the network stack 210, such as at the transport layer. In one embodiment, the acceleration program 120 comprises a filter driver, hooking mechanism, or any form and type of suitable network driver interface that interfaces to the transport layer of the network stack, such as via the transport driver interface (TDI). In some embodiments, the acceleration program 120 interfaces to a first protocol layer, such as the transport layer and another protocol layer, such as any layer above the transport protocol layer, for example, an application protocol layer. In one embodiment, the acceleration program 120 may comprise a driver complying with the Network Driver Interface Specification (NDIS), or a NDIS driver. In another embodiment, the acceleration program 120 may comprise a min-filter or a mini-port driver. In one embodiment, the acceleration program 120, or portion thereof, operates in kernel-mode 202. In another embodiment, the acceleration program 120, or portion thereof, operates in user-mode 203. In some embodiments, a portion of the acceleration program 120 operates in kernel-mode 202 while another portion of the acceleration program 120 operates in user-mode 203. In other embodiments, the acceleration program 120 operates in user-mode 203 but interfaces to a kernel-mode driver, process, service, task or portion of the operating system, such as to obtain a kernel-level data structure 225. In further embodiments, the acceleration program 120 is a user-mode application or program, such as application 220a-220n.

The acceleration program 120 may operate at or interface with a protocol layer in a manner transparent to any other protocol layer of the network stack 210. For example, in one embodiment, the acceleration program 120 operates or interfaces with the transport layer of the network stack 210 transparently to any protocol layer below the transport layer, such as the network layer, and any protocol layer above the transport layer, such as the session, presentation or application layer protocols. This allows the other protocol layers of the network stack 210 to operate as desired and without modification for using the acceleration program 120 of the present invention. As such, the acceleration program 120 can interface with the transport layer to accelerate any communications provided via any protocol carried by the transport layer, such as any application layer protocol over TCP/IP.

Furthermore, the acceleration program 120 may operate at or interface with the network stack 210 in a manner transparent to any application 220a-220n, a user of the client 205, and any other computing device, such as a server, in communications with the client 205. The acceleration program 120 may be installed and/or executed on the client 205 in a manner such as the acceleration program 120 may accelerate any communications of an application 220a-220n without modification of the application 220a-220n. In some embodiments, the user of the client 205 or a computing device in communications with the client 205 are not aware of the existence, execution or operation of the acceleration program 120. As such, in some embodiments, the acceleration program 120 is installed, executed, and/or operated transparently to an application 220a-220n, user of the client 205, another computing device, such as a server, or any of the protocol layers above and/or below the protocol layer interfaced to by the acceleration program 120.

In some embodiments, the acceleration program 120 performs one or more of the acceleration techniques 224, 226, 228, 232 in an integrated manner or fashion. In one embodiment, the acceleration program 128 comprises any type and form of mechanism to intercept, hook, filter, or receive communications at the transport protocol layer of the network stack 210. By intercepting a network packet of the client 205 at the transport layer and interfacing to the network stack 210 at the transport layer via a data structure, such as a kernel-level data structure 225, the acceleration program 120 can perform transport layer related acceleration techniques on the network packet, such as transport control protocol (TCP) buffering, TCP pooling and TCP multiplexing. Additionally, the acceleration program 120 can perform compression 225 on any of the protocols, or multiple-protocols, carried as payload of network packet of the transport layer protocol In one embodiment, the acceleration program 120 uses a kernel-level data structure 225 providing access to any portion of one or more network packets, for example, a network packet comprising a request from a client 205 or a response from a server. In one embodiment, the kernel-level data structure may be used by the acceleration program 120 to perform the desired acceleration technique. In one embodiment, the acceleration program 120 is running in kernel mode 202 when using the kernel-level data structure 225, while in another embodiment, the acceleration program 120 is running in user-mode 203 when using the kernel-level data structure 225. In some embodiments, the kernel-level data structure may be copied or passed to a second kernel-level data structure, or any desired user-level data structure. Although the acceleration program 120 is generally depicted in FIG. 2A as having a first portion operating in user-mode 203 and a second portion operating in kernel-mode 202, in some embodiments, any portion of the acceleration program 120 may run in user-mode 203 or kernel-mode 202. In some embodiments, the acceleration program 120 may operate only in user-mode 203, while in other embodiments, the acceleration program 120 may operate only in kernel-mode 202.

Furthermore, by intercepting at the transport layer of the network stack 210 or obtaining access to the network packet via a kernel-level data structure 225, the acceleration program 120 can perform or apply the plurality of acceleration techniques of the present invention at a single interface point or at a single point of execution or time of executing any executable instructions of the acceleration program 120. For example, in one embodiment, in a function or set of instructions of the acceleration program 120, a plurality of the acceleration techniques may be executed, such as by calling a set of executable instructions constructed and designed to perform the acceleration technique. In some embodiments, the acceleration program 120 at one interface point, place of execution, or in a set of instructions call one or more application programming interfaces (APIs) to any program, service, process, task, thread, or executable instructions designed and constructed to provide 1) multi-protocol compression 238, 2) transport control protocol pooling 224, 3) transport control protocol multiplexing 226, 4) transport control protocol buffering 228, and 5) caching via a cache manager 232 and in some embodiments, encryption 234.

By executing the plurality of acceleration techniques at one place or location in executable instructions of the acceleration program 120 or at one protocol layer of the network stack 210, such as the transport layer, the integration of these acceleration techniques is performed more efficiently and effectively. In one aspect, the number of context switches between processes may be reduced as well as reducing the number of data structures used or copies of data structures in memory needed or otherwise used. Additionally, synchronization of and communications between any of the acceleration techniques can be performed more efficiently, such as in a tightly-coupled manner, in a set of executable instructions of the acceleration program 120. As such, any logic, rules, functionality or operations regarding the order of acceleration techniques, which techniques to perform, and data and information to be shared or passed between techniques can be performed more efficiently. The acceleration program 120 can intercept a TCP packet at the transport layer, obtain the payload of the TCP packet via a kernel-level data structure 225, and then perform desired acceleration techniques in a desired order. For example, the network packet may be first compressed and then cached. In another example, the compressed cached data may be communicated via a buffered, pooled, and/or multiplexed TCP connection to a server.

In some embodiments and still referring to FIG. 2A, a first program 222 may be used to install and/or execute the acceleration program 120, automatically, silently, transparently, or otherwise. In one embodiment, the first program 222 comprises a plugin component, such an ActiveX control or Java control or script that is loaded into and executed by an application 220a-220n. For example, the first program comprises an ActiveX control loaded and run by a web browser application 220, such as in the memory space or context of the application 220. In another embodiment, the first program 222 comprises a set of executable instructions loaded into and run by the application 220a-220n, such as a browser. In one embodiment, the first program 222 comprises a designed and constructed program to install the acceleration program 120.

In some embodiments, the first program 222 obtains, downloads, or receives the acceleration program 120 via the network from another computing device. In another embodiment, the first program 222 is an installer program or a plug and play manager for installing programs, such as network drivers, on the operating system of the client 205.

In other embodiments, the first program 222 may comprise a portion of the functionality, operations and logic of the acceleration program 120 to facilitate or perform any of the functionality, operations and logic of the acceleration program 120 described herein, such as any of the acceleration techniques. In some embodiments, the first program 222 is used to establish a connection, such as a transport layer connection, or a communication session with an appliance or a server, such as a Secure Socket Layer (SSL) communication session. In one embodiment, the first program 222 is used to establish or facilitate the establishment of a virtual private network connection and communication session.

The cache manager 232 of the acceleration program 120 or the client 205 as depicted in FIG. 2A may comprise software, hardware or any combination of software and hardware to provide cache access, control and management of any type and form of content, such as objects or dynamically generated objects served by the servers 206a-206n. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory of the client 205. In other embodiments, the cache memory element may comprise memory having a faster access time than memory otherwise used by the client 205. In another embodiment, the cache memory element may comprise any type and form of storage element of the client 205, such as a portion of a hard disk. In yet another embodiment, the cache manager 232 may use any portion and combination of memory, storage, or the processing unit for caching data, objects, and other content.

Furthermore, the cache manager 232 of the present invention includes any logic, functions, rules, or operations to perform any embodiments of the techniques of the present invention described herein. For example, the cache manager 232 includes logic or functionality to invalidate objects based on the expiration of an invalidation time period or upon receipt of an invalidation command from a client 205a-205n or server 206a-206n. In some embodiments, the cache manager 232 may operate as a program, service, process or task executing in the kernel space 202, and in other embodiments, in the user space 203. In one embodiment, a first portion of the cache manager 232 executes in the user space 203 while a second portion executes in the kernel space 202. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The encryption engine 234 of the acceleration program 120 or the client 205 comprises any logic, business rules, functions or operations for handling the processing of any security related protocol, such as SSL or TLS, or any function related thereto. For example, the encryption engine 234 encrypts and decrypts network packets, or any portion thereof, communicated by the client 205. The encryption engine 234 may also setup or establish SSL or TLS connections on behalf of the client 205a-205n. As such, the encryption engine 234 provides offloading and acceleration of SSL processing. In one embodiment, the encryption engine 234 uses a tunneling protocol to provide a virtual private network between a client 205a-205n and another computing device, such as a server Still referring to FIG. 2A, the multi-protocol compression engine 238 of the acceleration program 120 or the client 205 comprises any logic, business rules, function or operations for compressing one or more protocols of a network packet, such as any of the protocols used by the network stack 210 of the client 205. For example, multi-protocol compression 238 may include compression and decompression utilities comprising GZip compression and decompression, differential compression and UnCompression, or any other proprietary or publicly-available utility for compressing and decompressing data to be transmitted over a network. In one embodiment, multi-protocol compression engine 238 compresses bi-directionally between the client 205 and another computing device, such as a servers, any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). As such, the multi-protocol compression engine 238 of the present invention accelerates performance for users accessing applications via desktop clients, e.g., Microsoft Outlook and non-Web thin clients, such as any client launched by enterprise applications like Oracle, SAP and Siebel, and even mobile clients, such as the Pocket PC.

The acceleration program 120 of the present invention also performs transport protocol layer acceleration techniques of buffering, pooling and multiplexing as will be described in further detail below. As such, the acceleration program 120 comprises any type and form of executable instructions having logic, rules, functions and operations to perform any of these techniques as described herein. The acceleration program 120 intercepts, controls, and manages at the transport layer of the network stack 210 any transport layer application programming interface (API) calls made by an applications 220a-220n via the network stack 210. The acceleration program 120 responds to any requests of the client 205 in a transparent manner such that the client 205 receives a response as expected from the transport protocol layer of the network stack 210. For example, in one embodiment, the acceleration program 120 intercepts in the network stack 210 of the client 205 a request to establish a transport layer connection with another computing device, such as a server, and may use a pool of one or more transport layer connections established by the acceleration program 120 to respond to the request. In another embodiment, the acceleration program 120 multiplexes a request from a first application 220a via an established transport layer connection used by a second application 220b.

In some embodiments, the acceleration program 120 comprises a mechanism for buffering or holding communications of the client 205 at the client 205 before transmitting on a network. For example, the rate of consumption by the client 205 of received communications from a network, such as from a server, may be less than the rate of production of communications transmitted by the client 205 on the network. As such, the client 205 may be sending more requests to a server 206a-206n at a rate greater than by which the client 205 can consume and process responses from such requests. The acceleration program 120 can intercept a communication, and determine if a rate of consumption and/or rate of production of the client 205 is below a predetermined threshold, such as a threshold configured by a user, the client 205 or another computing device. If the determined rate is below the desired threshold, the acceleration program 120 stores the intercepted communication to a memory element of the client until the performance of the client 205 increases the rate of consumption and/or production to a rate equal to or higher than the predetermined or desired threshold. At that point, the acceleration program 120 communicates the client's communications on the network. As such, the present invention provides a client-side mechanism to throttle communications of the client 205 based on performance of consumption and/or production of communications by the client 205.

The application 220a-220n depicted in FIG. 2A can be any type and/or form of application such as any type and/or form of web browser, web-based client, client-server application, a thin-client computing client, an ActiveX control, or a Java applet, or any other type and/or form of executable instructions capable of executing on client 205 or communicating via a network 204. The application 220a-220n can use any type of protocol and it can be, for example, an HTTP client, an FTP client, an Oscar client, or a Telnet client. In some embodiments, the application 220a-220n uses a remote display or presentation level protocol. In one embodiment, the application 220a-220n is an ICA client, developed by Citrix Systems, Inc. of Fort Lauderdale, Fla. In other embodiments, the application 220a-220n includes a Remote Desktop (RDP) client, developed by Microsoft Corporation of Redmond, Wash. In other embodiments, the application 220a-220n comprises any type of software related to VoIP communications, such as a soft IP telephone. In further embodiments, the application 220a-220n comprises any application related to real-time data communications, such as applications for streaming video and/or audio.

Figure 2B:
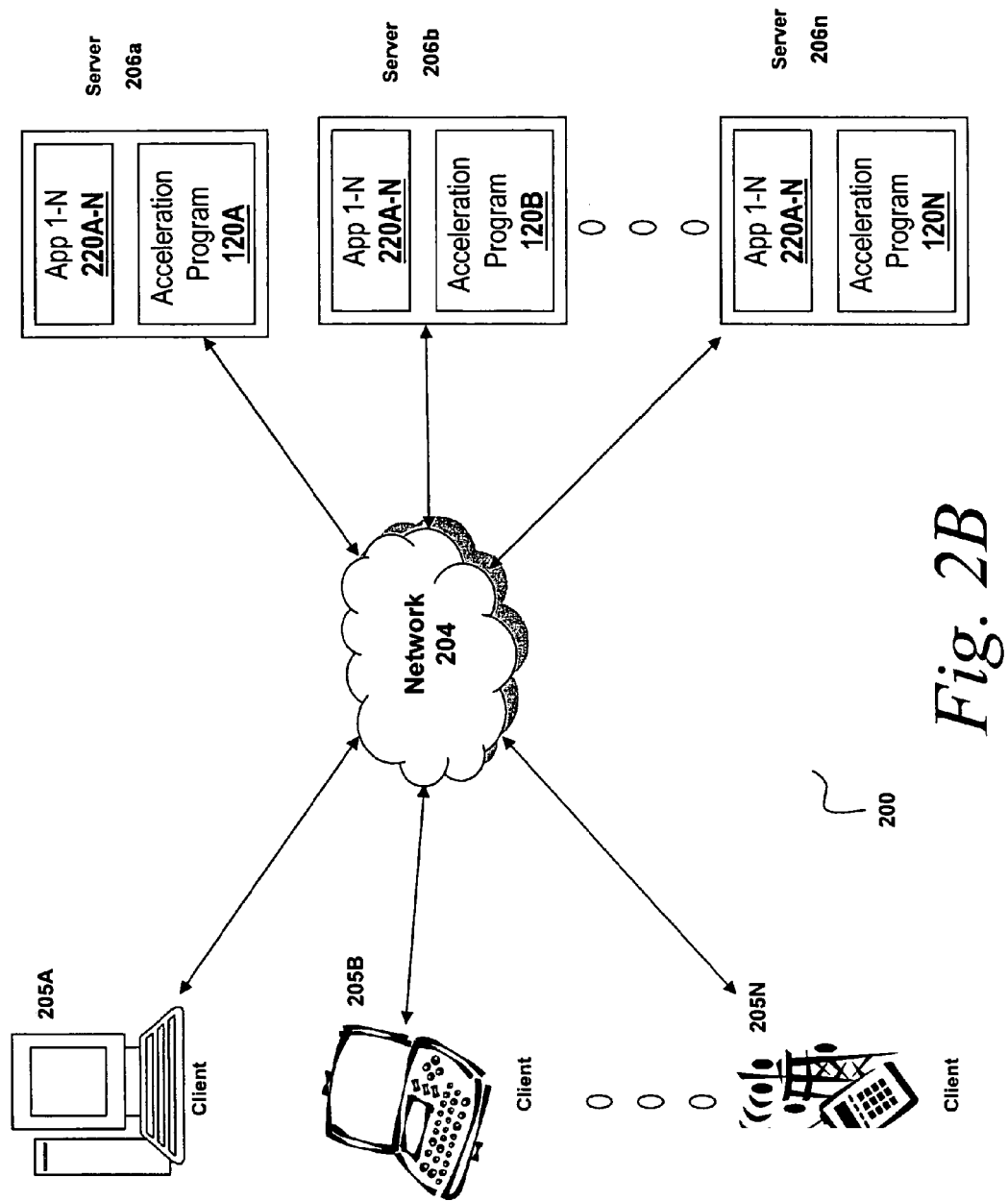
FIG. 2B is a block diagram of an embodiment of a network environment for operating the client-side acceleration program with a server.

Referring now to FIG. 2B, a network environment 200 for practicing the acceleration program 120 of the present invention is depicted. In brief overview, the environment 200 comprises clients 205a-20n in communication with one or more servers 206a-206n via a network 204. The servers 206a-206n may provide or execute one or more applications 220sa-220n for use by the clients 205a-205n. The servers 206a-206n may also include the acceleration program 120a-120n to provide to a client 205a-205n for installation and execution. For example, in one embodiment, the server 206a-206n in response to receipt of a request from the client 205sa-205n to access the server, such as upon a request to establish a connection or communication session with the server 206a-206n, transmits the acceleration program 120a-120n to the client 205a-205n.

The network 204 can be any type and form of network. The network 204 can be a local-area network (LAN), such as a company Intranet, a metropolitan area network (MAN), or a wide area network (WAN), such as the Internet or the World Wide Web. The topology of the network 204 may be a bus, star, or ring network topology. The network 204 and network topology may be of any such network or network topology capable of supporting the operations of the present invention described herein. The clients 205a-205n and servers 206a-

206n can connect to one or more networks 204 through a variety of connections including standard telephone lines, LAN or WAN links (e.g., T1, T3, 56 kb, X.25, SNA, DEC-NET), broadband connections (ISDN, Frame Relay, ATM, Gigabit Ethernet, Ethernet-over-SONET), and wireless connections or any combination thereof. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

In some embodiments, the server 206a-206n may run an application 220a-220n, which for example, may be an application server providing email services such as Microsoft Exchange manufactured by the Microsoft Corporation of Redmond, Wash., a web or Internet server, or a desktop sharing server, or a collaboration server. In some embodiments, any of the application 220a-220n may comprise any type of hosted service, such as GoToMeeting.com provided by Citrix Systems, Inc. of Ft. Lauderdale, Fla., WebEx.com provided by WebEx, Inc. of Santa Clara, Calif., or LiveMeeting.com provided by Microsoft Corporation of Redmond, Wash.

In another embodiment, any of the clients 205a-205n may communicate via the network 204 to a server farm 206a-206n or server network, which is a logical group of one or more servers that are administered as a single entity. The server farm 206a-206n may be running one or more applications 220a-220n, such as an application 33f providing a thin-client computing or remote display presentation application. In one embodiment, the server 206a or server farm 206a-206n executes as an application 220a-220n, any portion of the Citrix Access Suite™ by Citrix Systems, Inc., such as the MetaFrame or Citrix Presentation Server™, and/or any of the Microsoft Windows Terminal Services manufactured by the Microsoft Corporation. In some embodiments, any one of the servers 206a-206n comprises a gateway, firewall, router, switch or bridge for connecting the clients 205a-205n to any server 206a-205n. In one embodiment, a server 206a-206n comprises a proxy. In another embodiment, the server 206a-206n comprises a load-balancer. In some embodiments, the clients 205a-205n may communicate to the server 206a-206n via an appliance.

Figure 2C:
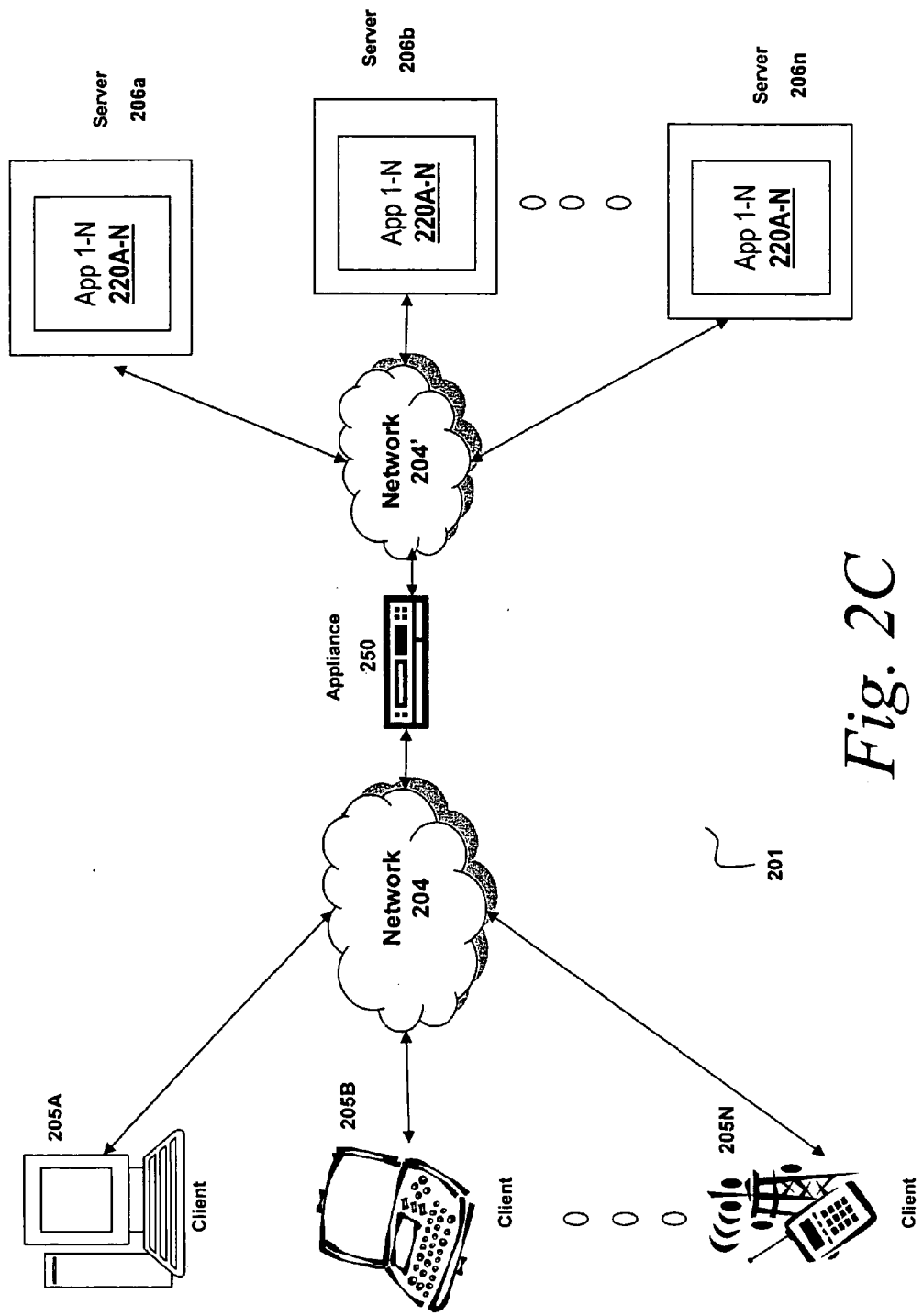
FIG. 2C is a block diagram of another embodiment of a network environment for operating the client-side acceleration program in conjunction with an appliance in communications with the server.

FIG. 2C depicts another embodiment of a network environment 201 in which an appliance 250 is used for connections and communications between the clients 205a-205n and a server 220a-220n. In brief overview, the appliance 250 comprises a computing or networking device for providing communications between the clients 205a-205n on a network 204 and the servers 206a-206n on a network 204'. In some embodiments, the clients 205a-205n and servers 206a-206n may be on the same network 204 or on different networks. In other embodiments, the clients 205a-205n may be on a public network, such as the Internet, and the servers 206a-206n may be on a private network, such as a corporate or enterprise network.

The appliance 250 comprises any type of computing or networking device. In some embodiments, the appliance 250 comprises a gateway, a proxy, a SSL VPN device, a bridge, a router or a switch. In one embodiment, the appliance 250 provides a virtual private connection from a client 205a-205n on network 204 to a server 206a-206n on network 204'. In some embodiments, the appliance 250 may establish a first transport layer connection with a client 205a-205n on network 204 and a second transport layer connection with a server 206a-206n on network 204'. In some embodiments, the appliance 250 provides for the acceleration of communications and remotely-accessed applications, such as applications 220a-220n between the clients 205a-205n and the servers 206a-206n. As with the client-side acceleration program 120, the logic, functions, and/or operations of the executable instructions of the appliance 250 may perform one or more of the following acceleration techniques of the present invention: 1) multi-protocol compression, 2) transport control protocol pooling, 3) transport control protocol multiplexing, 4) transport control protocol buffering, and 5) caching via a cache manager. Additionally, the appliance 250 may perform encryption and/or decryption of any communications received and/or transmitted by the client 205. In some embodiments, the appliance 250 also performs tunneling between to the server 206a-206n, such for a client 205a-205n.

Figure 2D:
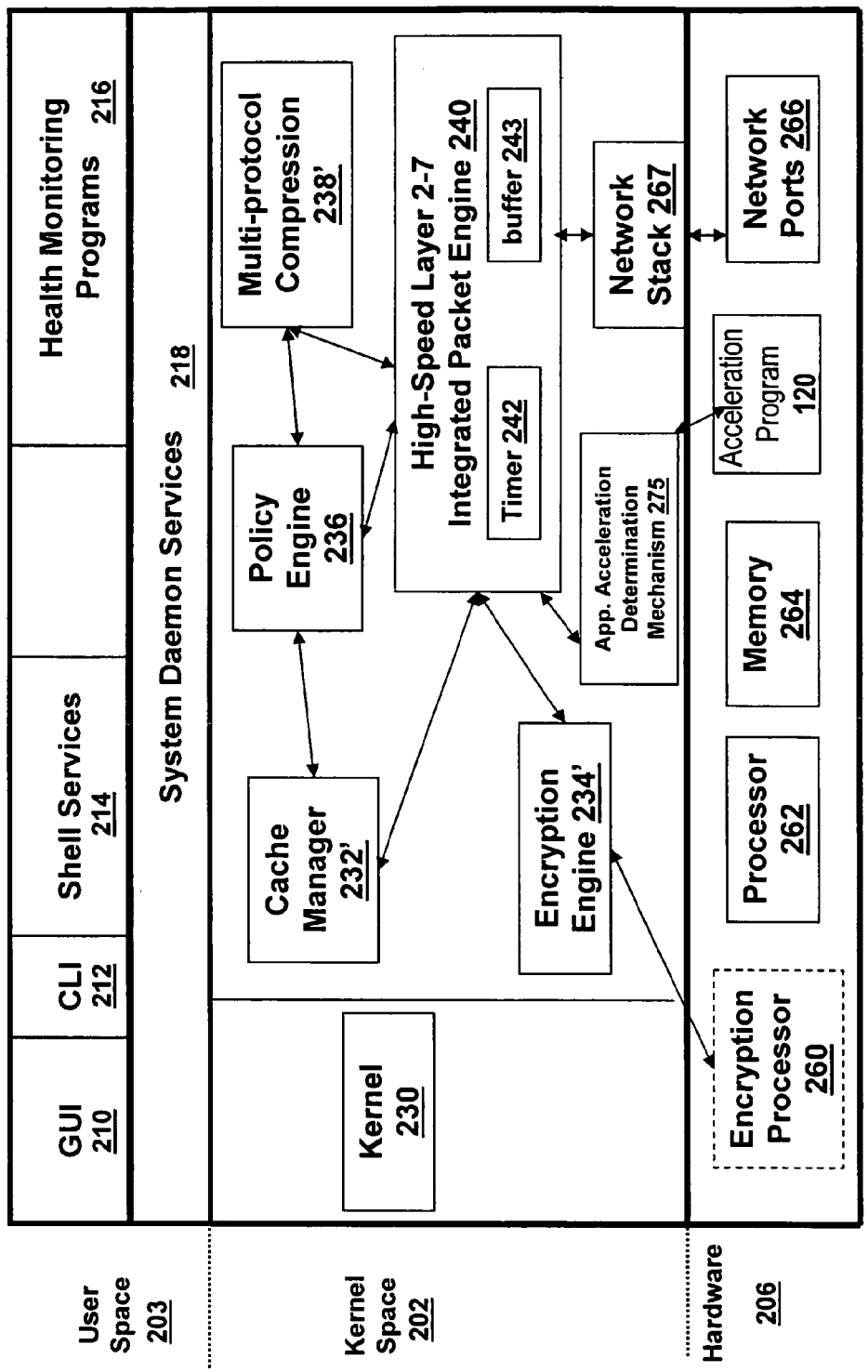
FIG. 2D is a block diagram of an embodiment of the appliance of the present invention.

FIG. 2D illustrates an example architecture of an appliance 250. In brief overview, the appliance 250 comprises a hardware layer 206 and a software layer divided into a user space 203 and a kernel space 202. Hardware layer 206 provides the hardware elements upon which programs and services within kernel space 202 and user space 203 are executed. Hardware layer 206 also provides the structures and elements which allow programs and services within kernel space 202 and user space 203 to communicate data both internally and externally with respect to appliance 250. The software layer comprises programs, services, processes, tasks, threads and other executable instructions to provide the logic, functions, and operations of the appliance 250.

The appliance 250 comprises an application acceleration determination mechanism 275 and a client-side acceleration program 120. The application acceleration determination mechanism 275 comprises software, hardware, or any combination of hardware and software. In some embodiments, the application acceleration determination mechanism 275 comprises any type and form of executable instructions, such as a program, services, process, task or thread having logic, function, rules, or operations for determining whether an application 220a-220n executing on a client 205a-205n and/or server 206a-206n can be accelerated or whether access or communications between a client 205a-205n and a server 206a-206n can be accelerated. In one embodiment, a database is used by the application acceleration determination mechanism 275 to determine whether an application 220a-220n can be accelerated. For example, the database may associate an application 220a-220n with one or more acceleration techniques capable of accelerating the application 220a-220n, and may be further based on user, type, form, location, processing capability and other characteristics of the client 205a-205n and/or server 206a-206n. In some embodiments, the application acceleration determination mechanism 275 uses a look-up table, file, data structure or object in memory comprising information identifying if an application 220a-220n by name, type or category can be accelerated by an acceleration technique. In other embodiments, the appliance 250 and/or application acceleration determination mechanism 275 includes a configuration mechanism, such as a user interface, graphical, command line or otherwise, to receive user input to identify, specify or configure whether an application 220a-220n or access to a server 206a-206n can be accelerated.

In some embodiments, the application acceleration determination mechanism 275 requests from the server 206a-206n information identifying whether an application 220a-220n may be accelerated and in further embodiments, by what acceleration technique(s) and for what type and form of clients 205a-205n. In yet another embodiment, the application acceleration determination mechanism 275 comprises a database of historical information regarding the performance of an application 220a-220n between a client 205a-205n and a server 206a-206n, with and without one or more client-side acceleration techniques, to provide a database of comparative and heuristic information about where the application 220a-220n is accelerated, or capable of being accelerated, using any client-side acceleration techniques of the present invention. For example, the appliance 250 may capture network related performance information related to the performance of the application 220a-220n from the client 205a-205n. As such, the determination of whether an application 220a-220n is capable of being accelerated may be adapted to, based on or influenced by changing operational and performance characteristics of the network 204.

In one aspect, an application 220a-220n may either not be capable of being accelerated or may be capable of being accelerated but the acceleration would not be effective, or would otherwise be minimal. In one embodiment, the type and form of application 220a-220n may not use a protocol or may not communicate in a manner suitable for use with an acceleration technique. In another embodiment, the protocol or manner in which the application 220a-220n communicates may allow for performing an acceleration technique but based on any of the operational or performance characteristics of the client 205a-205n, appliance 250 or server 206a-206n, the acceleration technique would not be effective or otherwise would provide minimal acceleration. As such, the application acceleration determination mechanism 275 may determine the application 220a-220n is not desired to be accelerated based on whether the application 220a-220n is able to be accelerated or whether the acceleration would meet a desired pre-determined threshold of performance improvement.

In another aspect, the appliance 250 stores a client-side acceleration program 120 in a storage or memory element of the appliance 250, such as storage or memory provided by the hardware layer 206 of the appliance. In one embodiment, the appliance 250 dynamically determines via the application acceleration determination mechanism 275 an application 220a-220n to be used or being used by the client 205a-205n can be accelerated by the acceleration program 120 executing on the client 205a-205n and transmits or otherwise communicates the acceleration program 120 from storage or memory of the appliance 250 to the client 205a-205n. In another embodiment, the appliance 250 determines communications between the client 205a-205n and a server 206a-206n can be accelerated by the acceleration program 120 executing on the client 205 and communicates the acceleration program 120 to the client 205. In some embodiments, the appliance 250 receives, downloads or obtains the acceleration program 120 from another computing device 100, such as a server 206a-206n.

As shown in FIG. 2D, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. Although the hardware layer 206 of appliance 250 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 250 is illustrated with certain elements in FIG. 2D, the hardware portions or components of appliance 250 may comprise any type and form of elements, hardware or software, of a computing device, such as the computing device 100 illustrated and discussed in conjunction with FIGS. 1A and 1B. In some embodiments, the appliance 250 may comprise a cache, a server, gateway, router, switch, bridge or other type and form of computing or network device, and have any hardware and/or software elements associated therewith.

The operating system of appliance 250 allocates, manages, or otherwise segregates the available system memory into kernel space 202 and user space 204. In example software architecture 200, the operating system may be any type and/or form of UNIX operating system although the invention is not so limited. As such, the appliance 250 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 250 and performing the operations described herein.

The kernel space 202 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the present invention, the kernel space 202 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the appliance 250.

In one embodiment, the appliance 250 comprises one network stack 267, such as a TCP/IP based stack, for communicating with the client 102a-102b and/or the server 206a-206n. In one embodiment, the network stack 267 is used to communicate with a first network, such as network 204, and a second network 204'. In some embodiments, the appliance 250 terminates a first transport layer connection, such as a TCP connection of a client 205a-205n, and establishes a second transport layer connection to a server 206a-206n for use by the client 205a-205n, e.g., the second transport layer connection is terminated at the appliance 250 and the server 206a-206n. The first and second transport layer connections may be established via a single network stack 267. In other embodiments, the appliance 250 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 250.

As shown in FIG. 2D the kernel space 202 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 202 or kernel mode instead of the user space 203 improves the performance of each of these components, alone and in combination. Kernel operation means that these components or processes 232, 240, 234, 236 and 238 run in the core address space of the operating system of the appliance 250. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 202.

In some embodiments, any portion of the components 232, 240, 234, 236 and 238 may run or operate in the kernel space 202, while other portions of these components 232, 240, 234, 236 and 238 may run or operate in user space 203. In one embodiment, the present invention uses a kernel-level data structure providing access to any portion of one or more network packets, for example, a network packet comprising a request from a client 205a-205n or a response from a server 206a-206n. In some embodiments, the kernel-level data structure may be obtained by the packet engine 240 via a transport layer driver interface or filter to the network stack 267. The kernel-level data structure may comprise any interface and/or data accessible via the kernel space 202 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 202 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

As with the client-side acceleration program 120, the appliance may also perform caching for any communications between the client 205a-205n and the servers 206a-206n. In some embodiments, the cache memory 232 element may comprise a data object in memory 264 of appliance 250. In other embodiments, the cache memory element may comprise memory having a faster access time than memory 264. In another embodiment, the cache memory element may comprise any type and form of storage element of the appliance 250, such as a portion of a hard disk. In some embodiments, the processing unit 262 may provide cache memory for use by the cache manager 232 of the present invention. In yet further embodiments, the cache manager 232 may use any portion and combination of memory, storage, or the processing unit of the appliance 250 for caching data, objects, and other content. Furthermore, the cache manager 232 of the present invention includes any logic, functions, rules, or operations to perform any embodiments of the techniques of the present invention described herein. For example, the cache manager 232 includes logic or functionality to invalidate objects based on the expiration of an invalidation time period or upon receipt of an invalidation command from a client 205a-205n or server 206a-206n. In some embodiments, the cache manager 232 may operate as a program, service, process or task executing in the kernel space 202, and in other embodiments, in the user space 203. In one embodiment, a first portion of the cache manager 232 executes in the user space 203 while a second portion executes in the kernel space 202. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 as depicted in FIG. 2D may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 250 in addition to access, control and management of security, network traffic, network access, compression or any other function or operation performed by the appliance 250. In some embodiments, the acceleration program 120 receives, downloads or obtains policy information from the policy engine 236 of the appliance 250. In other embodiments, the acceleration program 120 executes and operates a policy engine 236, either independently of or in conjunction with the policy engine 236 of the appliance 250.

In a similar manner as the client-side acceleration program 120 and still referring to FIG. 2D, the appliance includes an encryption engine 234, which comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 250. The encryption engine 234 may also setup or establish SSL or TLS connections on behalf of the client 205a-205n, server 206a-206n, or appliance 250. As such, the encryption engine 234 provides offloading and acceleration of SSL processing. In one embodiment, the encryption engine 234 uses a tunneling protocol to provide a virtual private network between a client 205a-205n and a server 206a-206n. In some embodiments, the encryption engine 234 is in communication with the encryption processor 260. In other embodiments, the encryption engine 234 comprises executable instructions running on the Encryption processor 260.

Also, as with the client-side acceleration program 120, the appliance 250 may include a multi-protocol compression engine 238', which comprises any logic, business rules, function or operations for compressing one or more protocols of a network packet, such as any of the protocols used by the network stack 267 of the appliance 250. In one embodiment, multi-protocol compression engine 238 compresses bi-directionally between clients 102a-102n and servers 206a-206n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 250 to appliance 250 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 of the present invention accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 202 and integrating with packet processing engine 240 accessing the network stack 267 is able to compress any of the protocols carried by the TCP/IP protocol, such as any application layer protocol.

High speed layer 2-7 integrated packet engine 240 depicted in FIG. 2D, also generally referred to as a packet processing engine or packet engine, is responsible for managing the kernel-level processing of packets received and transmitted by appliance 250 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, at a 1 and/or 2 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In other embodiments, the packet engine 240, or portion thereof, may be operated on the client 205a-205n, such as part of the acceleration program 120. As such, the acceleration program 120 may operate on the client 205a-205n in accordance with the packet processing timer 242 as described above. In one aspect, the acceleration program 120 may perform integrated acceleration techniques in one point in execution and responsive to the granular time intervals provided by the pack processing timer 242.

In contrast to kernel space 202, user space 203 is the memory area or portion of the operating system used by user mode applications or programs otherwise running in user mode. A user mode application may not access kernel space 202 directly and uses service calls in order to access kernel services. As shown in FIG. 2D, user space 203 of appliance 250 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 250, such as via the operating system of the appliance 250 and either is user space 203 or kernel space 202. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 250 or operating system by a user via the GUI 210 and/or CLI 212.

Still referring to FIG. 2D, health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 250. In some embodiments, the health monitoring program 216 intercepts and inspects any network traffic passed via the appliance 250. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 250. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 250.

In a similar fashion, and in other embodiments, the health monitoring program 216 may check and determine the status, error or history of any client-side acceleration program 120 on any client 205a-205n in communication with the appliance 250 or to which the appliance 250 transmitted the acceleration program 120. In some embodiments, the health monitoring program 216, or a portion thereof, executes on the client 205a-205n.

Daemon services 218 are programs that run continuously or in the background and handle periodic service requests received by appliance 250. In some embodiments, a daemon service may forward the requests to other programs or processes, such as another daemon service 218 as appropriate. A daemon service 218 may run unattended to perform continuous or periodic system wide functions, such as network control, or to perform any desired task. In some embodiments, one or more daemon services 218 run in the user space 203, while in other embodiments, one or more daemon services 218 run in the kernel space 202.

Figure 3A:
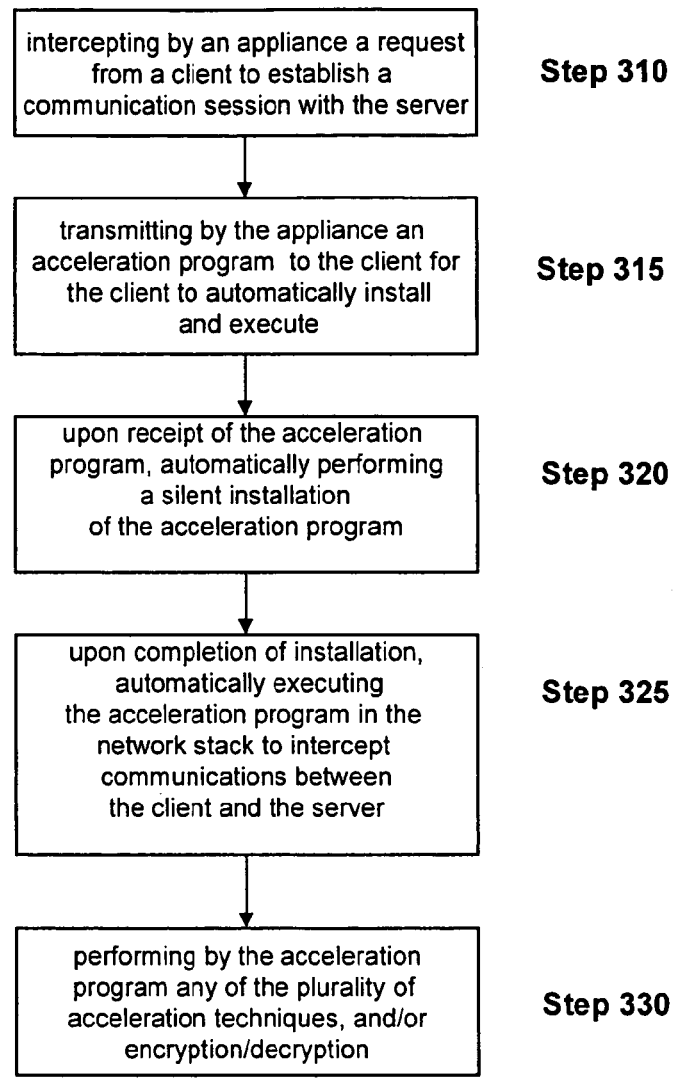
FIG. 3A is a step diagram of an embodiment of a method of the present invention for dynamically providing and automatically installing and executing the client-side acceleration program of the present invention.

Referring now to FIG. 3A, an embodiment of a method 300 of the present invention for dynamically providing by the appliance 250 an acceleration program 120, and automatically installing and executing the acceleration program 120 by the client 205 is depicted. In brief overview, at step 310, the appliance 250 intercepts a request from a client 205 to establish a communication session with the server. At step 315, the appliance 250 transmits the acceleration program 120 to the client 205 for the client 205 to automatically install and execute. At step 320, upon receipt of the acceleration program 120, the client 205 automatically executes or performs a silent installation of the acceleration program 120. At step 325, upon completion of installation of the acceleration program 120, the client 205 automatically executes the acceleration program 120 in the network stack 210 to intercept communications between the client 205 and the server 206. At step 330, the acceleration program 120 performs any of the plurality of acceleration techniques and may encrypt and/or decrypt communications.

In further detail, at step 310, the appliance 250 may intercept or otherwise receive by any suitable means and mechanisms a request from the client 205 to establish a communication session with the server 206. In one embodiment, the packet engine 240 of the appliance 250 intercepts communications from the client 205. In other embodiments, the appliance 250 establishes a first transport layer connection with the client 205, for example, with the acceleration program 120, and a second transport layer connection with the server 205 on behalf of the client 205. As such, the appliance 250 may receive, intercept or otherwise obtain any of the client's communications transmitted to the server 206. In some embodiments, the appliance 250 intercepts a request for the client 205 to establish a transport layer connection with the server 206. In other embodiments, the appliance 205 intercepts a request to establish a communication session via any protocol layer above the transport layer connection, such as an application layer protocol of HTTP. This embodiment of the method of the present invention may be practiced with a request to establish a communication session at any protocol layer of the network stack 210 of the client 205.

At step 315, the appliance 250 transmits the acceleration program 120 to the client 205. The appliance 250 may transmit the acceleration program 120 at any point before, during, or after establishing the communication session requested by the client 205. In one embodiment, the appliance 250 transmits the acceleration program 120 to the client 205 in response to intercepting the client request. In another embodiment, the appliance 250 forwards the request to the server 206 and transmits the acceleration program 120 to the client 205. In some embodiments, the appliance 250 establishes the communication session with the server 206, and upon establishment of the communication session, the appliance 250 transmits the acceleration program 120. In yet another embodiment, the appliance 250 performs authentication and/or authorization of the client 205, or the user of the client 205, and if the authenticated user or client 205 is so authorized, the appliance 250 transmits the acceleration program 120 to the client 205. In one embodiment, the appliance 250 forwards the client's request to the server 206 for authentication and/or authorization, and if the server 206 authenticates and/or authorizes the client's request, the appliance 250 transmits the acceleration program 120 to the client 205.

In some embodiments, the appliance 250 transmits the acceleration program 120 from storage or memory of the appliance 250. In other embodiments, the appliance 250 requests the acceleration program 120 from the server 206 and forwards the received acceleration program 120 to the client 205. In another embodiment, the server 206 transmits the acceleration program 120 to the client 205. In one embodiment, the appliance 250 transmits a Uniform Resource Locator (URL) to the client 205 for the client 205 to obtain, download or receive the acceleration program. In some embodiments, the URL identifies a location of the acceleration program 120 in storage or memory of the appliance 250, while in other embodiments, the URL identifies the acceleration program 120 on a server 206, such as a web server providing the acceleration program 120 for download. In one embodiment, the acceleration program 120 is stored on the client 205, and the appliance 250 transmits a key, such as an encryption or license key, to the client 205 for the client 205 to install and make use of the acceleration program 120 stored on the client 205. In some embodiments, the appliance 250 transmits to the client 205 any files, configuration, data or other information to be used to install and execute the acceleration program 120 on the client 205.

In one embodiment, the acceleration program 120 is designed and constructed to be automatically installed and executed by the client 205. The acceleration program 120 may include any files, entries, configuration, data, or instructions to cause the acceleration program 120 to be registered or recognized by the operating system of the client 205 in accordance with the type and form of operating system. In one embodiment, another computing device, such as a server or an appliance, transmits the acceleration program to the client 205 and the client 205 automatically installs and executes the acceleration program 120. In one embodiment, the acceleration program 120 is designed and constructed to be a plug-and-play (PnP) device to be added to a running computing device 100. In some embodiments, the acceleration program 120 is a self-installed executable, such as an executable including an installer program and the acceleration program 120. In other embodiments, the acceleration program 120 may include a plurality of files, for example an installation package or installation download, such as files necessary to register and install the acceleration program 120 in the operating system of the client 205. For example, the acceleration program 120 may comprise an .inf file and a .sys file. An .inf file provides Windows Setup in Microsoft Windows family of operating systems with the information required to set up a device, such as a list of valid logical configurations for the device and the names of driver files associated with the device. In some embodiments, the .inf file may comprise an autorun .inf file, which is a configuration file that tells or informs the operating system which executable to start, and any configuration information related to starting the executable. In one embodiment, the .sys file is the driver file comprising the acceleration program 120, or a portion thereof.

At step 320, the client 205 automatically installs the acceleration program 120. The acceleration program 120 may be installed in any suitable manner in accordance with the operating system of the client 205. In one embodiment, the client 205 installs the acceleration program 120 upon receipt of the acceleration program 120. In some embodiments, the client 205 automatically performs or executes a silent installation of the acceleration program 120. In one embodiment, the silent installation is performed transparently to a user or application of the client 205. In other embodiments, the silent installation of the acceleration program 120 does not require a reboot or restart of the client 205. In another embodiment, the silent installation does not require interaction by the user to start and/or complete the installation. In other embodiments, the silent installation of the acceleration program 120 occurs while the client 205 is running and transparently to a network layer, session layer, and/or application layer of the network stack 210. In some embodiments, the acceleration program 120 is a self-installed executable that is executed by the client 205. In other embodiments, the client 205 uses a plug and play manager to install the acceleration program 120. In one embodiment, the client 205 comprises an installation manager which receives and installs the acceleration program 120. In another embodiment, the acceleration program 120 transmitted by the appliance 250 also includes an installation program that installs the acceleration program 120.

In another embodiment, the acceleration program 120 is automatically installed via a silent installation. In one embodiment, a silent installation comprises an installation unattended by a user. In another embodiment, a silent installation comprises an installation not requiring or having interaction by the user to start and/or complete the installation. In some embodiments, the installation is silent in that the installation process does not display information regarding a status or progress of the installation. In one embodiment, the installation is silent in that it is transparent to the user. In other embodiments, the installation is silent because the installation of the acceleration program 120 does not require a reboot or restart of the client 205. In another embodiment, the installation is silent in that the installation occurs seamlessly during operation of the client 205 without interruption or disruption to the client's operation. As such, the acceleration program 120 can be installed in a manner that is transparent to the user or an application of the client 205 by not requiring a reboot and not displaying any information to the user related to the installation.

In order to prevent or avoid a reboot or restart of the client 205, in some embodiments, the client 205, such as the operating system of the client 205, has a plug and play manager to install and configure drivers, such as a network driver in one embodiment of the acceleration program 120, for Plug and Play devices while the operating system is running. In one embodiment, the plug and play manager is not instructed to reboot or restart the client 205 based on the configuration of the installation package of the acceleration program 120. In another embodiment, the .inf file does not comprise an instruction to reboot or restart the computer. In one embodiment, the acceleration program 120 can be implemented as a side-by-side component instead of replacing shared, in-use, dynamic-link libraries (DLLs). In other specific embodiments, for a network driver of the acceleration program 120, the acceleration program 120 uses the INetCfgPnpReconfigCallback network driver API, so that a user will not be required to reboot the operating system to cause configuration changes to take effect in the driver. Additionally, the acceleration program 120 may have a notify object that calls the SendPnpReconfig API within its implementation of the ApplyPnpChanges method of the INetCfgComponentControl to send configuration information to the driver of the network component that owns the object. The SendPnpReconfig API provides the notify object with a mechanism to send data to the driver and in some embodiments, is used to avoid requiring a user to reboot the operating system before configuration changes take effect.

At step 325, upon completion of installation of the acceleration program 120 automatically, silently, transparently, or otherwise, the acceleration program 120 is automatically executed on the client 205. In some embodiments, the installation program that installs the acceleration program 120 starts or executes the acceleration program 120. In some embodiments, the installer program for the acceleration program 120 makes a system call to load or execute the acceleration program 120 in memory of the client 205. In one embodiment, the installation of the acceleration program 120 comprises an instruction, command or directive to start the acceleration program 120. In one embodiment, the acceleration program 120 includes an automatic run configuration, such as an autorun.inf file, that notifies the client 205 to automatically run the acceleration program 120. In other embodiments, a plug and play manager or the operating system of the client 205 automatically executes the acceleration program 120 upon installation. In one embodiment, the acceleration program 120 comprises a service, process, thread or task that is started by the client 205. In some embodiments, the acceleration program 120 is a service of the operating system that is configured to automatically start. In one embodiment, the acceleration program 120 comprises a network driver loaded in the memory of the network stack of the operating system of the client In another embodiment, the acceleration program 120 comprises a network driver that is loaded into memory of the client 205. In some embodiments, the acceleration program 120 is loaded into memory allocated to the network stack 210. In some cases, the acceleration program 120 is loaded and executed in a memory area or space that allows the acceleration program 120 to access a protocol layer of the network stack, such as the transport layer. In other cases, the acceleration program is loaded and executed in a memory that allows the acceleration program 120 to access a kernel-level data structure 225. In other embodiments, the acceleration program 120 is loaded into memory of an application 220a-220n. In another embodiment, the acceleration program 120 executes independently in its own memory space or context. In one embodiment, the acceleration program 120 runs in the memory space or context of an application 220a-220n. In some embodiments, the acceleration program 120 is loaded into user-mode memory or memory allocated to the user-mode 203, while in other embodiments, the acceleration program 120 is loaded into kernel-mode memory or memory allocated to the kernel-mode 202

In some embodiments, the acceleration program 120 is loaded into memory and/or executed on the client 205 transparently to a user of the client, an application of the client 205, the appliance 250 or the server 206. In other embodiments, the acceleration program 120 executes to interface with the transport layer of the network stack 210, and executes transparently to any protocol layer above the transport layer, such as a session or application layer, and any protocol layer below the transport layer, such as the network layer. In one embodiment, the acceleration program 120 executes transparently to any transport layer connection of the client 205, or the transport layer itself.

At step 330, the loaded, started or otherwise executing acceleration program 120 performs any of the plurality of acceleration techniques of the acceleration program 120, such as any techniques provided by 1) multi-protocol compression 238, 2) transport control protocol pooling 224, 3) transport control protocol multiplexing 226, 4) transport control protocol buffering 228, and 5) caching via a cache manager 232. The acceleration program 120 may also perform any encryption and/or decryption of communications between the client 205 and the server 206. In one embodiment, the acceleration program 120 performs multi-protocol compression. In another embodiment, the acceleration program 120 performs transport control protocol pooling, and in a further embodiment, the acceleration program 120 performs multiplexing via the pooled transport layer connection. In one embodiment, the acceleration program 120 performs transport control protocol buffering. In some embodiments, the acceleration program 120 performs caching. In other embodiments, the acceleration program 120 performs caching and compression. In one embodiment, the acceleration program 120 performs caching with transport layer pooling and multiplexing. In another embodiment, the acceleration program 120 performs multi-protocol compression with transport layer pooling and multiplexing. In another embodiment, the acceleration program 120 performs caching and/or compression with TCP buffering, and in a further embodiment, with TCP pooling and multiplexing.

As such, the client-side acceleration program 120 of the present invention is dynamically provided by the appliance 250 and automatically installed and executed on the client 205 in a silent manner or transparent to the user or application of the client 205 to perform one or more client-side acceleration techniques to communications between the client 205 and a server 206. The acceleration program 120 may perform these acceleration techniques transparently to any protocol layer of the network stack and transparently to a user of the client, application of the client, appliance, or server.

Figure 3B:
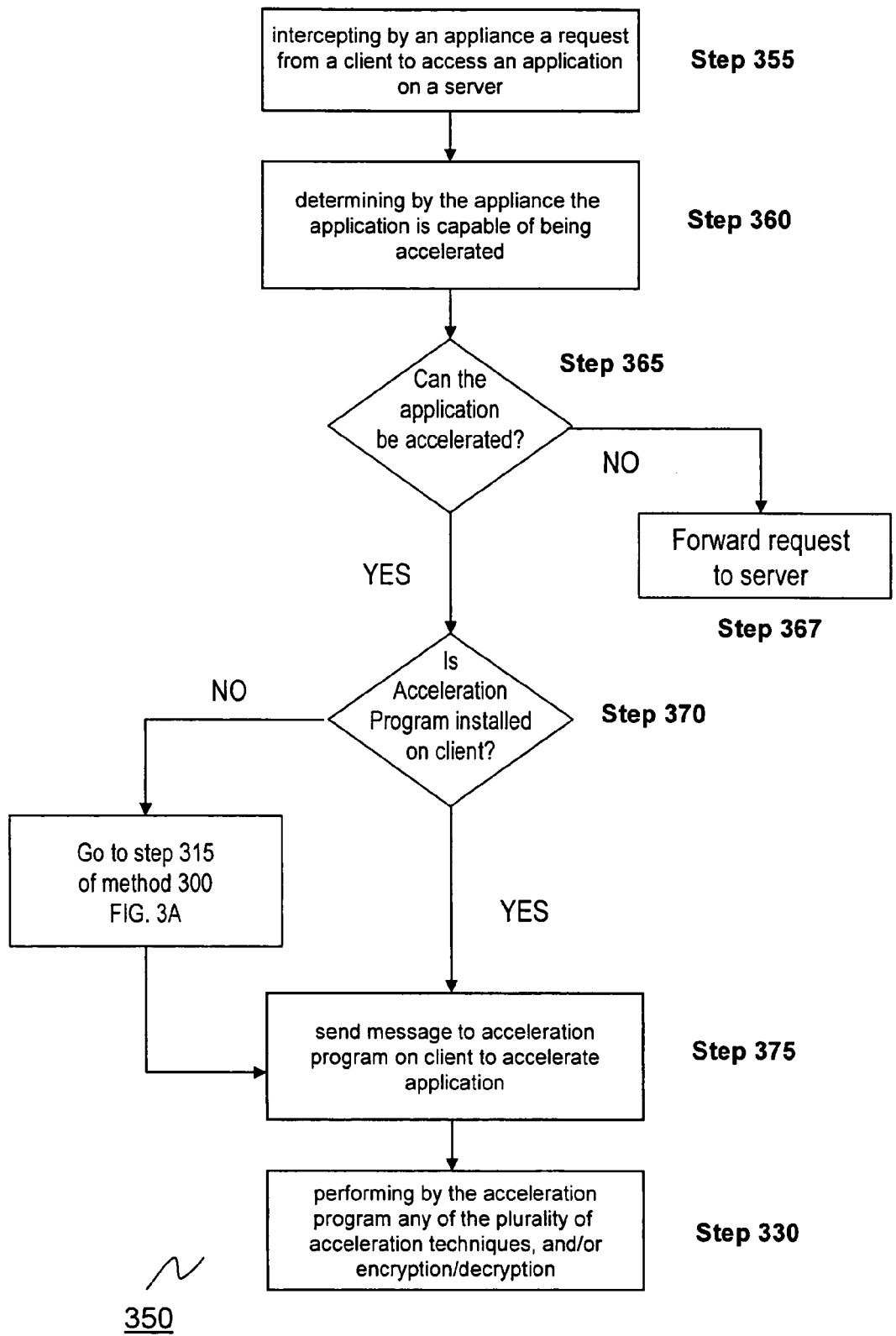
FIG. 3B is a step diagram of an embodiment of a method of the present invention for determining an application can be accelerated.
Figure 3C:
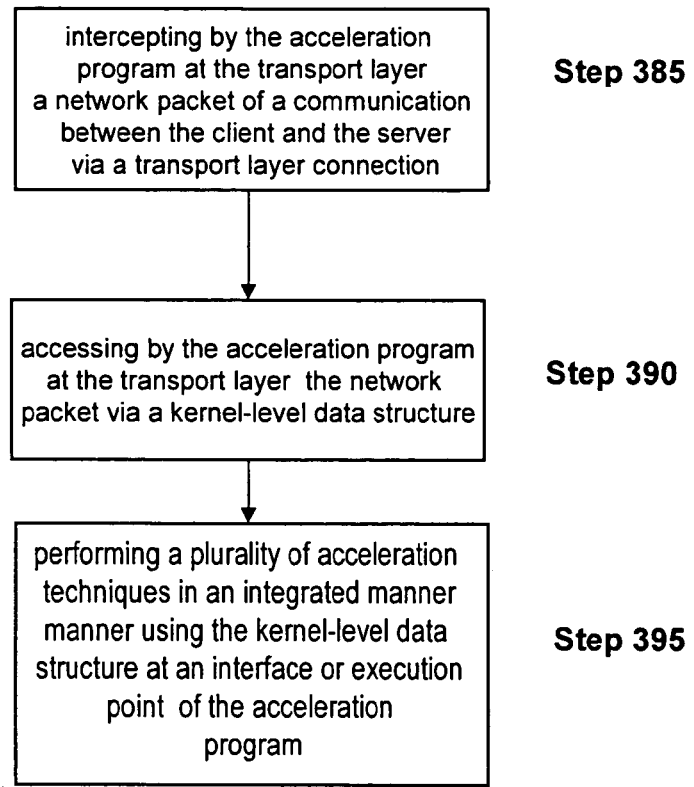
FIG. 3C is a step diagram of another embodiment of a method of the present invention of performing a plurality of acceleration techniques by the acceleration program for intercepting at the transport layer and using a kernel-level data structure.

In another aspect, the present invention is related to the appliance 250 determining if an application requested to be accessed by the client 205 can be accelerated, and providing the acceleration program 120 to the client 205 if the application can be accelerated. Referring now to FIG. 3B, another embodiment of a method of the present invention is depicted. The present invention may be practiced upon requests to establish a connection or communication session as well as requests to access an application on a server. In brief overview of method 350, at step 355, the appliance 250 intercepts a request from a client 205 requesting access to an application 220a-220n on a server 206. At step 260, the appliance 250 determines if the application 220 is capable of being accelerated. At step 365, if the application 220 cannot be accelerated, then the application forwards the request to the server at step 267. At step 365, if the application 220 can be accelerated, then the appliance 250 determines if the acceleration program 120 is installed on the client 205 or has been previously transmitted to the client 205. If the acceleration program 120 has not yet been provided to the client 205, then the method 350 continues at step 315 of the method 300 described above to transmit, install and execute the acceleration program. If the acceleration program 120 has been installed and is executing on the client 205, then the appliance 250, at step 375, sends a message to the acceleration program 120 on the client 205 to accelerate the application 220. At step 330 of method 350, the acceleration program 120 performs a plurality of acceleration techniques on the communications for the application 220, and may encrypt and/or decrypt such communications.

In further detail, at step 355, the appliance 250 may intercept by any suitable means and mechanisms a request from the client 205 to access an application provided by the server 206. In one embodiment, the packet engine 240 of the appliance 250 intercepts communications from the client 205. In other embodiments, the appliance 250 establishes a first transport layer connection with the client 205, for example, with the acceleration program 120, and a second transport layer connection with the server 205 on behalf of the client 205. As such, the appliance 250 may receive, intercept or otherwise obtain any of the client's communications transmitted to the server 206. In some embodiments, the appliance 250 intercepts a request for the client 205 to access an application 220 via an established transport layer connection with the server 206. In other embodiments, the appliance 205 intercepts a request to establish a communication session via any protocol layer above the transport layer connection, such as an application layer protocol of HTTP. In one embodiment, the appliance 205 intercepts a request from the client 205 to display and provide an application 220 from the server 206 via a remote display protocol, such as ICA or RDP.

At step 360, the appliance 250 determines whether the application 220 requested by the client 205 can be accelerated. In some embodiments, the appliance 250 identifies, extracts or otherwise processes an application identifier from the intercepted client request that identifies the application by name, type or category. In one embodiment, the application acceleration determination mechanism 275 is used by the appliance 250 to determine if or whether the application 220 can be accelerated. In some embodiments, the application acceleration determination mechanism 275 performs a query or lookup in a database, lookup table, or other structured source of data in memory or storage, such as a data structure or object, to determine if the application 220 can be accelerated. In another embodiment, the appliance 250 sends a communication such as request to a server 206 to determine whether the application 220 can be accelerated.

In other embodiments, the appliance 250 has a performance log or history to determine if the application 220 has been accelerated before and whether the acceleration had improvement on the performance and operation of the application 220. As such, the appliance 250 may determine that an application 220 can be accelerated if such acceleration meets a predetermined threshold of improvement to performance or operations of the application 220. In yet another embodiment, the appliance 250 provides heuristic rules based on the current operation and performance of the network 204, client 205 or server 206. In one embodiment, the application 220 may be determined to be capable of being accelerated if the client 205 has certain performance and operational characteristics or capabilities, for example, a certain speed processor or a minimum amount of memory. In some embodiments, the application 220 may be determined to be capable of being accelerated based on a configured policy or rule, such as in the policy manager of the appliance 250. For example, an application 220 to be communicated between a remote user with a certain type of client 205 accessing a certain type of application 220 and/or server 206 may be accelerated. In other embodiments, the application 220 may be determined to be capable of acceleration based on an authentication and authorization of the user or the client 205. In yet another embodiment, the application 220 may be determined to not be desired to be accelerated. For example, the application 220 is of a type that is infrequently used.

At step 365, if the application 220 is determined not to be capable of being accelerated or otherwise it is desired not to apply acceleration techniques to the application 220 on the client 205, the appliance 250 forwards the intercepted client request to the server 206 at step 368 and does not transmit or provide the acceleration program 120 to the client 205. In one embodiment, the appliance 250 may perform or provide appliance-based acceleration of the appliance 220. In other embodiments, the appliance 250 does not perform acceleration of the application 220 on the appliance 250. In yet another embodiment, the appliance 250 may perform some acceleration techniques and not others for the application 220 if the appliance 250 determines the application 220 is not capable of or otherwise desired to be accelerated.

At step 365, if the application 220 is determined to be capable of being accelerated or otherwise it is desired to apply acceleration techniques to the application on the client 205, the appliance 250 determines if the acceleration program 120 has been provided to the client 205. In one embodiment, the appliance 250 determines if the acceleration program 120 has been installed on the client 205 or is executing on the client 205. In some embodiments, the appliance 250 sends a communication to the acceleration program 120 on a client 205 to determine if the acceleration program 120 is running on the client 205. In other embodiments, the appliance 250 checks a log file or history file to determine if the acceleration program 120 has been transmitted to the client 205. In another embodiment, the appliance 250 checks with a health monitoring program 216 of the appliance 250 or the client 205 to determine if the acceleration program 120 is executing on the client 205.

If the appliance 250 determines the acceleration program 120 has not been transmitted, installed and/or executed on the client 205, the appliance 250 will provide the acceleration program 120 in accordance with the steps of method 300 described in conjunction with FIG. 3A. For example, the appliance 250 transmits the acceleration program 120 to the client 205, which the client 205 upon receipt automatically installs and executes. In one embodiment, upon performance of the suitable steps of the embodiment of method 300, the appliance 250 may communicate at step 275 a message to the acceleration program to apply one or more of the accelerations techniques to the application 220. In other embodiments, if the acceleration program 120 is already installed and executing, then at step 375 the appliance 250 communicates a message to the acceleration program 120 to apply one or more of the accelerations techniques to the application 220.

In some embodiments, the acceleration program 120 performs any of the acceleration techniques available by the acceleration program 120 to the identified application 120. In other embodiments, the appliance 250 indicates to the acceleration program 120 which of the acceleration techniques to perform for the application 220. In one embodiment, the acceleration program 120 may apply the desired acceleration techniques for the application 120 on a per session basis. That is, the message from the appliance 250 to the acceleration program 120 only informs the acceleration program 120 to perform acceleration techniques for this instance or session of the application 220. In other embodiments, once the acceleration program 120 receives a message from the appliance 250 to apply acceleration techniques for the identified application 220, the acceleration program 120 applies the acceleration techniques for any instances or sessions of the application 220, or until the client 205 is rebooted or restarted, or the appliance 205 is rebooted or restarted.

In one embodiment, the message from the appliance 250 at step 375 is not application specific. For example, the message informs the acceleration program 120 to execute one or more of the acceleration techniques for any application of the client 205. In some embodiments, the message sent to the client 205 informs the acceleration program 120 to stop using any one or more of the acceleration techniques for the application 220, or for all applications 220a-220n. In another embodiment, the appliance 250 communicates a message to the acceleration program 120 to ignore certain applications 220. In yet another embodiment, the appliance 250 communicates a message to the acceleration program 120 to provide configuration data or information to the acceleration program 120, such as an update to an acceleration technique or application of a new acceleration technique.

At step 330, the acceleration program 120 performs any of the plurality of acceleration techniques of the acceleration program 120 for the application 220, such as any techniques provided by 1) multi-protocol compression 238, 2) transport control protocol pooling 224, 3) transport control protocol multiplexing 226, 4) transport control protocol buffering 228, and 5) caching via a cache manager 232. The acceleration program 120 may also perform any encryption and/or decryption of communications of the application 220 between the client 205 and the server 206. In one embodiment, the acceleration program 120 performs multi-protocol compression of application related data. In another embodiment, the acceleration program 120 performs transport control protocol pooling, and in a further embodiment, the acceleration program 120 performs multiplexing via the pooled transport layer connection. In one embodiment, the acceleration program 120 performs transport control protocol buffering. In some embodiments, the acceleration program 120 performs caching. In other embodiments, the acceleration program 120 performs caching and compression. In one embodiment, the acceleration program 120 performs caching with transport layer pooling, and in a further embodiment also with multiplexing. In another embodiment, the acceleration program 120 performs multi-protocol compression with TCP buffering, and in a further embodiment, with transport layer pooling and, in yet a further embodiment, also with multiplexing. In another embodiment, the acceleration program 120 performs caching with compression, and in a further embodiment, with TCP pooling, and in yet a further embodiment, with multiplexing.

As such, the appliance 250 of the present invention dynamically determines whether to the accelerate an application or whether the application can be accelerated, and communicates to the client-side acceleration program 120 of the present invention to perform on the client 205 any one or more of the acceleration techniques for the application 220. Furthermore, in some embodiments, a plurality of acceleration programs 120 may be dynamically delivered to the client 205 by the appliance and automatically installed and executed by the client 205. For example, an acceleration program may be provided in accordance with the techniques and methods of the present invention for each connection to a server 205, or each communication session with an application 220. As such, the client 205 may automatically install and execute a plurality of acceleration programs 120 to handle and perform acceleration for each server 206a-206n or each application 220a-220n.

In one aspect, the present invention is related to performing a plurality of the acceleration techniques by the acceleration program in an efficient integrated manner. The acceleration program 120 intercepts network packets at the transport layer of a transport control protocol connection and uses a kernel-level data structure to obtain information and data, such as payload data, of a network packet to apply the plurality of acceleration techniques at a single interface point or place of execution in the acceleration program 120. Referring now to FIG. 3D, an embodiment of a method 380 for performing a plurality of acceleration techniques in an integrated manner is depicted. In brief overview, at step 280, the acceleration program 120 intercepts at the transport layer a network packet of a communication between the client 205 and server 206 via a transport layer connection. At step 390, the acceleration program 120 accesses at the transport layer the network packet via a kernel-level data structure, for example, a data structure provided via an API to the network stack 210 of the client 205. At step 395, the acceleration program 120 performs a plurality of the acceleration techniques in an integrated manner using the kernel-level data structure at an interface point or point of execution in the acceleration program 120.

In further detail, at step 385, the acceleration program 120 intercepts by any suitable means and mechanism a network packet of a communication between the client 205 and the server 206 via a transport layer connection. In one embodiment, the acceleration program 120 intercepts a network packet of, or related to, a request by the client, or a response thereto, to establish a transport layer connection between the client 205 and the server 206. In another embodiment, the acceleration program 120 intercepts a network packet of, or related to, a request, or a response thereto, to access or use an application 220 via the transport layer connection between the client 205 and the server 206. In one embodiment, the acceleration program 120 intercepts the network packet at the transport protocol layer via a transport driver interface or otherwise a network driver interfaced at a transport protocol layer of the network stack 210. In another embodiment, the acceleration program 120 intercepts the network packet at the transport protocol layer, or any other protocol layer of the network stack 210 via a Network Driver Interface Specification (NDIS) driver, or a mini-port driver, or a mini-filter driver. In some embodiments, the acceleration program 120 intercepts the network packet at the transport layer via a hooking or filtering mechanism.

At step 390, the acceleration program 120 accesses, or otherwise obtains information and data of the network packet intercepted at the transport layer via a kernel-level data structure 225. By using the kernel-level data structure 225, the acceleration program 120 can obtain information and data on the payload(s) or the one or more protocols carried or transported by the network packet at the transport layer. In some embodiments, using a kernel-level data structure to represent the network packet at the layers of the network stack at and/or above the transport layer enables the acceleration program 120 to perform or operate the plurality of acceleration techniques at the transport layer and for protocol layers carried by the transport layer network packet. In one embodiment, using a single kernel-level data structure 225 prevents or avoids copying and memory allocation along with context switching from using multiple data structures at various protocol layers of the network stack 210. In one embodiment, the acceleration program 120 copies the kernel-level data structure 225 to a second data structure, which may comprise another kernel-level data structure or a user-level data structure.

At step 395, the acceleration program 120 performs, executes or operates the plurality of acceleration techniques at single interface point or location in the program 210 or in a set of executable instructions or one point of execution of the program 210. The acceleration program 120 performs any of the plurality of acceleration techniques of the acceleration program 120, such as any techniques provided by 1) multi-protocol compression 238, 2) transport control protocol pooling 224, 3) transport control protocol multiplexing 226, 4) transport control protocol buffering 228, and 5) caching via a cache manager 232. The acceleration program 120 may also perform any encryption and/or decryption of communications of the application 220 between the client 205 and the server 206 at the same point in execution of the acceleration techniques of the acceleration program 120.

In one embodiment, the acceleration program 120 performs in a set of executable instructions, such as function call or one place or location, any desired plurality of the acceleration techniques subsequent to each other. For example, the acceleration program 120 obtains the intercepted network packet via a kernel-level data structure and then executes instructions representing the logic, function, rules or operation of the acceleration techniques subsequent to each other. As such, information and data of the network packet can be extracted or obtained once via the kernel-level data structure 225 and used as input, parameters, arguments and conditions for any of instructions of the acceleration program 120 representing the acceleration techniques. Although the network packet carries higher level protocol data and information, the acceleration program 120 in some embodiments, processes the network packet and the higher level protocol data and information at one point and at one time during execution. Additionally, the acceleration program 120 may perform each of a plurality of acceleration techniques in any desired order in an integrated manner, such as compression data stored to the cache manager 232, or compressing/uncompressing data retrieved from the cache.

In one embodiment, the acceleration program 120 performs multi-protocol compression and caching subsequently to each other. In another embodiment, the acceleration program 120 performs subsequent to each other operations related transport control protocol pooling and multiplexing via the pooled transport layer connection. In one embodiment, the acceleration program 120 performs transport control protocol buffering subsequently to compression and caching, or to TCP pooling and/or multiplexing. In some embodiments, the acceleration program 120 performs caching. In one embodiment, the acceleration program 120 performs caching subsequently with transport layer pooling and multiplexing. In another embodiment, the acceleration program 120 performs multi-protocol compression subsequently with transport layer pooling and multiplexing. In another embodiment, the acceleration program 120 performs caching and/or compression subsequently with TCP buffering, and in a further embodiment, subsequently with TCP pooling and multiplexing.

Although the acceleration program is generally described as subsequently performing the acceleration techniques, subsequent execution may also include other logic, functions, and operations not related to acceleration but integrated and executed in between each acceleration technique. The acceleration program still obtains operational and performance efficiency with such integration as the executable instructions for the acceleration techniques and any other operations or function are executed at a single interface point or point of execution in the acceleration program. Furthermore, the acceleration techniques for protocol layers carried or above the transport protocol layer are processed at one time and/or at one location at the transport layer. As such, acceleration techniques for these higher level protocols do not need to be applied again as the network packet traverses and gets processed in these higher levels of the network stack 210, or at a later point in the network stack 210.

Figure 4A:
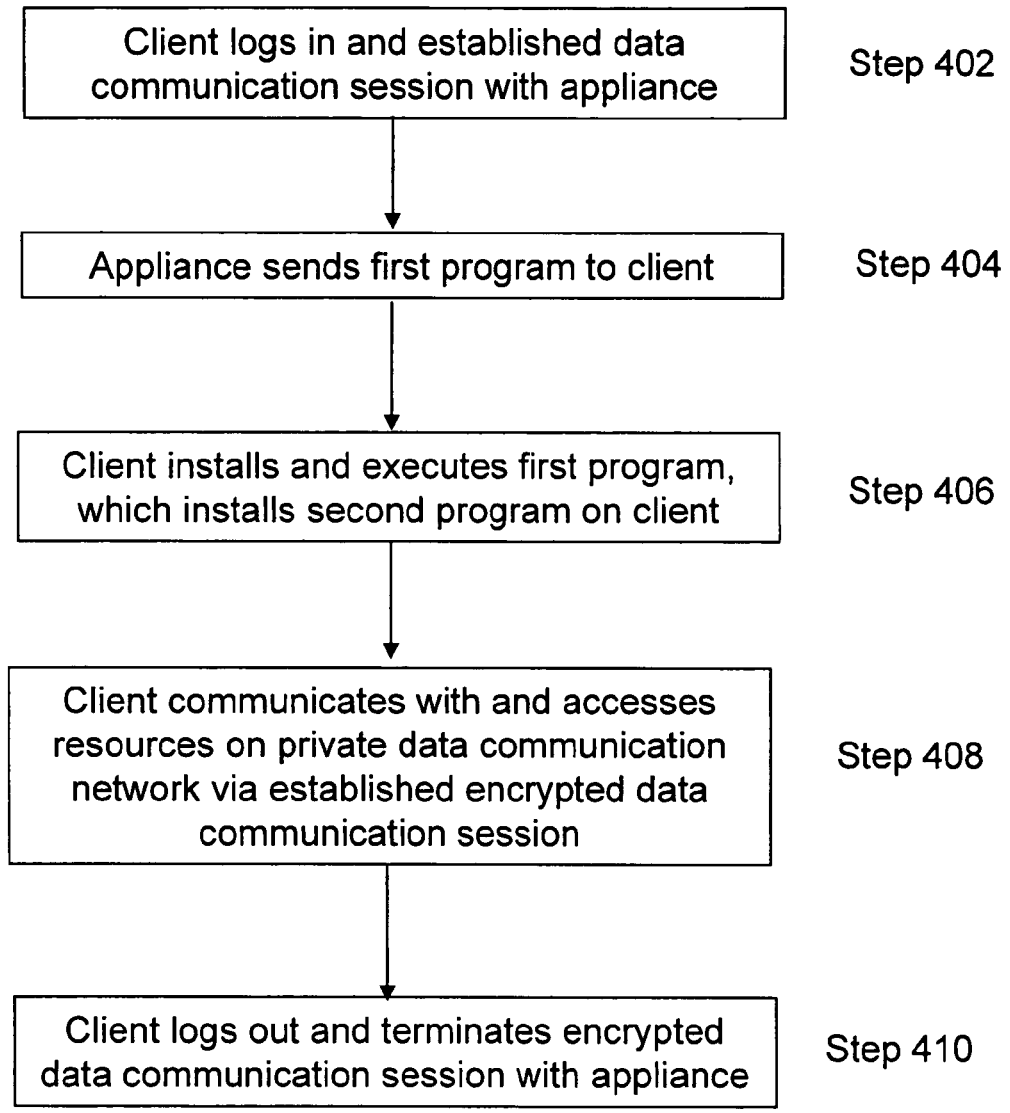
FIG. 4A is a step diagram of another embodiment of a method of the present invention to automatically install and execute the acceleration program on the client via a first program.

In other aspects, the present invention can be practiced using a first program 222 and the acceleration program 120 (or also referred to as the second program in this embodiment). In one embodiment, the first program 222 along with the second program 120 can be used to facilitate and establish a virtual private network connection with a server 206, such as via appliance 250, over which the client-side acceleration techniques of the present invention may be applied. In another embodiment, the first program 222 is used to install and execute the second program, or the acceleration program 120. Referring now to FIG. 4A, an embodiment of a method 400 for practicing this aspect of the present invention is depicted. In brief overview, at step 402, the client 205 logs in and establishes a communication session with the appliance 205. At step 404, the appliance 250 sends the first program 222 to the client 205. At step 406, the client 205 installs and executes the first program 222, which in turns installs and executes the acceleration program 120, i.e., the second program. At step 407, the client 205 communicates with and accesses resources on a private network 204 via an established encrypted data communication session. At step 410, the client 205 logs out from the appliance 250 and terminates the communication session with the appliance 250.

At step 402 of method 400, the client 205 performs a log in procedure and establishes an encrypted data communication session with appliance 250 via network 204. In one embodiment, the encrypted data communication session is used as a tunnel to bridge traffic from client 205 to any of servers 206a-206n which reside behind appliance 250 in private data communication network 204'. In an embodiment, client 205 uses a web browser, such as Microsoft Internet Explorer® or Netscape Navigator®, to log in and establish a data communication session with appliance 250 using Secure Sockets Layer (SSL) or other encryption methods, such as IPSec, and Transport Layer Security (TLS). In another embodiment, a protocol such as Hypertext Transfer Protocol over Secure Sockets Layer (HTTPS) may be used to initiate the encrypted data communication session.

At step 404, in response to log in and establishment of the encrypted data communication session, appliance 250 sends a first program to client 205 over network 204. The first program is designed and constructed, or otherwise configured, to act as a tunnel endpoint for communication over the encrypted data communication session. In one embodiment, the first program comprises a plug-in application that is automatically installed and executed by the browser of the client 204. For example, the first program may comprise an ActiveX control that is provided as a plug-in to be executed by a Microsoft Internet Explorer® Web browser. In another embodiment, the first program may comprise a Java applet that is provided as a plug-in to be executed by a Netscape Navigator® Web browser or another control or programming component that works across network environments.

At step 406, client 205 installs and executes the first program 222, wherein executing the first program comprises installing a second program on client 205. In one embodiment, the first program 22 may be automatically installed and executed, such as using any of the techniques discussed in conjunction with method 300 and FIG. 3A. In some embodiments, the first program 222 obtains, downloads or receives the second program, or the acceleration program 120, from the appliance 250. In another embodiment, the first program 222 comprises a installer or install manager for the second program, such as the acceleration program 120 to automatically install and execute the second program, such as by way of a silent installation or an installation transparent to a user of the client 205, application 220 of the client 205, the appliance 250 or the server 206.

In one embodiment, the second program is configured, in part, to intercept communications from applications 220 running on client 205 that are destined for resources on network 204 and to provide the intercepted communications to the first program 222 for sending to appliance 250 via the encrypted data communication session. The second program may also be configured to provide intranet network name resolution service and optionally split network traffic. By splitting the traffic, an embodiment of the present invention is able to determine what traffic is channeled to an SSL tunnel or encryption tunnel of the first program 222 and what traffic is permitted or allows to continue along for processing by the transport layer of the network stack 210 under normal, routine, or typical operations of the client 205. In an embodiment, the second program comprises a dynamic interceptor (for instance, a filter device driver) that is inserted as a "hook" into an operating system of client 205. For example, the second program may comprise a filter device driver that is attached to the transport layer stack of the client operating system, such as the transport layer stack of a Microsoft Windows® operating system.

At step 408, once the first and second programs have been installed, applications running on client 205 may communicate with and access resources, such as applications and data, on private data communication network 204 via the established encrypted data communication session. The manner in which this communication occurs will be discussed in more detail below with respect to FIG. 4B. Note that, in an one embodiment, the functions of the first program and second program as described above are performed by a single control or programming component that is automatically installed and executed by client 205, such as the acceleration program 120 of the present invention. In addition to providing a virtual private network connection and communications, the first program 222 and/or second program, such as the acceleration program 120, may perform any of the acceleration techniques described herein on communications of the client via the virtual private network connection, e.g. the encrypted tunnel or bridge to appliance 250.

At step 410, client 205 performs a log out procedure to disconnect from network 204, which terminates the encrypted data communication session with appliance 250. In one embodiment, at time of logging out, the first program 222 automatically cleans up the modifications made to the operating system of the client 205 to return the operating system to a state prior to the installation of the first program 222 and/or second program. In one embodiment, the first program 222 and/or second program also includes an uninstaller or uninstall instructions to remove the first and second programs from the operating system of the client 205 or from further operation on the client 205 in a non-intrusive manner to the continued operations of the client 205. In yet another embodiment, the first program 222 and/or the acceleration program 120 removes any files, such an temporary files or cookies, used by applications of the client 205 during any communication connections or sessions provided using the present invention.

Figure 4B:
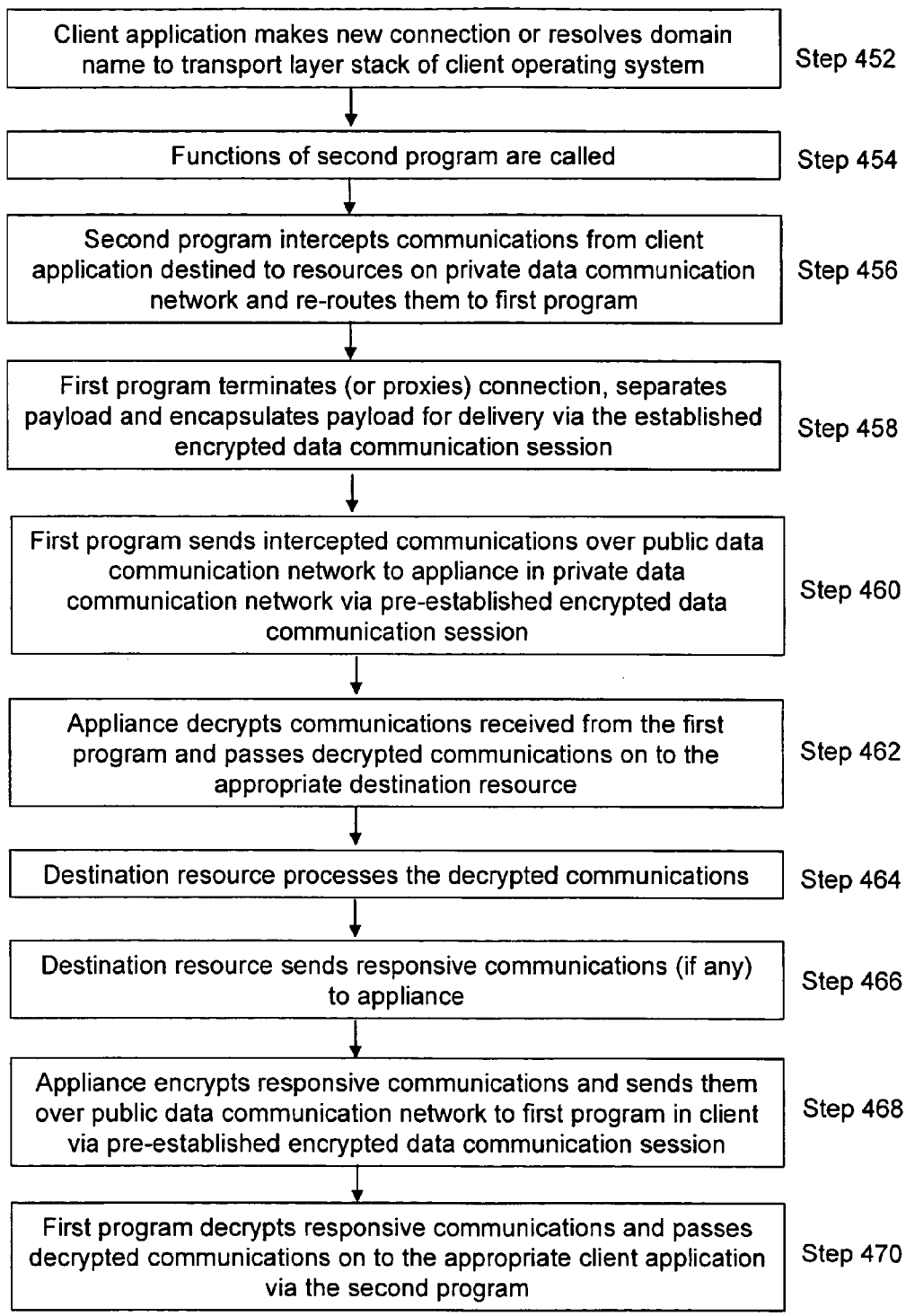
FIG. 4B is a step diagram of an embodiment of a method of the present invention for a first program and the acceleration program to provide a virtual private network connectivity and perform one or more acceleration techniques.

FIG. 4B depicts an embodiment of another method 450 of the present invention by which a client 205 communicates with and accesses resources on a private data communication network 204. For example, the method 450 represents a method by which step 408 of method 400 may be carried out. In brief overview, at step 452, the client 205 makes a new connection or resolves a domain name, such as a TCP/IP domain name resolution, via the first program and/or second program. At step 454, the second program is executed. At step 456, the second program intercepts communications from the client 205 destined to the private network 204' and re-routes or sends the communications to the first program 222. At step 458, the first program 222 terminates or proxies the connection, separates the payload and encapsulates the payload for delivery via the established encrypted communication session. At step 460, the first program 222 sends intercepted communications over public network 204 to appliance 250 in private network 204 via pre-established encrypted communication session. At step 462, the appliance 250 decrypts communications received from the first program and forwards the decrypted communications to the appropriate destination resource, such as server 206a-206m. At step 464, the destination resource processed the decrypted communications, and at step 464 the destination resource sends responsive communication, if any, to the appliance 250. At step 468, the appliance 250 encrypts responsive communications and sends the encrypted communications over public network 205 to first program 222 of client 205 via pre-established encrypted communication session. At step 470, the first program 222 decrypts responsive communications and forwards decrypted communications on to the appropriate client application via the second program.

At step 452, an application 220 of a client 205 makes a new connection or resolves a domain name via the transport protocol layer of the network stack 210 of the client 205. In one embodiment, the application 220 may request to establish a transport layer connection between the client 205 and a server 206, or between the client 205 and the appliance 250. In another embodiment, the application 220 or the client 205 may request access to an application 220 provided by the server 206. For example, the server 206 may provide for server-based computing or thin-client computing by transmitting a remote display protocol of ICA or RDP representing output of an application 220 executing on the server 206. In another embodiment, the client 205 may request access to resources of a server 206, such as files or directories, or email services. In some embodiments, the client 205 may be on a public network 204 and the server 206 on a private network 204'. In other embodiments, the client 205 and server 206 may be on different private networks.

At step 454, the second program executes one or more functions automatically or otherwise before any transport layer functions are initiated. In some embodiments, the second program is or otherwise comprises the acceleration program 120 of the present invention. In one embodiment, the second program intercepts or otherwise receives the client request of step 452. In some embodiments, the application 220 of the client 205 makes API calls to the network stack 210 which are intercepted by the second program. Prior to any API calls being processed by the transport layer of the network stack 210, the second program is hooked into or otherwise interfaced to the network stack 210 to execute logic, rules, functions or operations prior to the communication being transmitted or processed for transmission via a transport layer connection.

At step 456, the second program intercepts communications from the client 205, such as by any application 220a-220n on client 205 that are destined for resources on network 204' and re-routes them to the first program 222, which in an embodiment comprises an ActiveX control plug-in, a Java applet or other control or programming component that works across network environments. The second program may access, read or otherwise obtain destination information from the network packet or packets providing the intercepted communications to determine the communication is destined for network 204', such as a private network behind appliance 250. For example, the second program may extract or interpret the destination IP address and/or port from the network packet. Upon determination an intercepted communication is destined for network 204', the second program communicates the intercepted communication to the first program 222 via any suitable interface means and mechanism, such as via any inter-process communication interface or an API call. In one embodiment, the intercepted communication is sent to the first program 222 as is, or in other embodiments, the intercepted communication is pre-processed by the second program prior to sending to the first program 222. For example, the second program may remove the payload from the intercepted communication and forward the payload to the first program 222.

At step 458, each intercepted communication is terminated or proxied by the first program 222, and the first program 222 prepares the intercepted communication for transmission via the established encrypted data communication session. In one embodiment, the first program 222 separates out the payload and encapsulates the payload for delivery via the established encrypted data communication session. In another embodiment, the first program 222 encapsulates the intercepted communicated as received from the second program. In some embodiment, the payload is a TCP payload and is encapsulated into a new TCP connection between the client 205 and the server 206, such as via appliance 250.

At step 460, the first program 222 sends the intercepted communications over network 204 to appliance 250 in network 204' via the pre-established encrypted data communication session. In some embodiments, the first program 222 encrypts the intercepted communications and sends the encrypted intercepted communications to appliance 250. In one embodiment, encryption is carried out in accordance with SSL protocols. In another embodiment, encryption is TLS based. Any type and form of encryption and/or decryption may be used by either first program 222 or the acceleration program 120.

At step 462, appliance 250 acts as a proxy terminating the connection sent by the first program 222. The appliance 250 decrypts the communications received from the first program 222, and forwards the decrypted communications onto the appropriate destination resource on network 204 via a second connection that the appliance 250 has established with the destination resource on network 204. In one embodiment, decryption is carried out in accordance with SSL protocols or other applicable encryption and decryption protocols. In some embodiments, the appliance 250 performs one or more acceleration techniques on the communication forwarded to the destination resource, such as one or more of the following techniques provided by 1) multi-protocol compression 238', 2) transport control protocol pooling 224', 3) transport control protocol multiplexing 226', 4) transport control protocol buffering 228', and 5) caching via a cache manager 232'.

At step 464, the destination resource processes the decrypted communications. In one embodiment, the decrypted communications is a request to establish a connection or communication session. In another embodiment, the decrypted communications is a request to start or access an application 220 on behalf of the client 205. In other embodiments, the decrypted communications is a request for a web page, such as a HTTP request to receive a web page from a web server 206.

At step 466, if the decrypted communications include a request for which there is a response, then the destination resource sends out responsive communications to appliance 250. In some embodiments, the response includes an acknowledgement of establishing a connection or communication session as requested by the client 205. In other embodiments, the response includes an error message. In one embodiment, the response includes an authentication request or a challenge-response mechanism. In some embodiments, the response includes an acceleration program 120 to be used by the client 205. In another embodiment, the response includes HTML, such as a web page to be displayed by the client 205. In other embodiments, the response includes an object, such as a dynamically generated object.

At step 468, appliance 250 sends the responsive communications over network 204 to the first program 220 on client 205 via the pre-established encrypted data communication session. In one embodiment, the appliance 250 encrypts the responsive communications and sends the encrypted responsive communications to the first program 222. In some embodiments, encryption is carried out in accordance with SSL protocols or other applicable encryption and decryption protocols. Furthermore, the appliance 250 may perform any of the acceleration techniques of the present invention on communications to the client 205, such as multi-protocol compression 238', caching 232' or TCP buffering 228'.

At step 470, the first program 222 decrypts the responsive communications and forwards the communication to the appropriate application 222 via the second program. The first program 222 may use any suitable interface means and mechanism to communicate to the second program, such as via any type and form of inter-process communication mechanism or an API call. The second program provides the responsive communication via the network stack 210 of the client 205 to the application 220. As such, the application 220 transparently receives the responsive communication without any changes or modification to the application 220.

In accordance with another embodiment of the present invention, client 205 performs additional processing of the intercepted communications before sending the communications over the network 204 at step 458. Because an embodiment of the present invention provides a VPN solution that acts as a proxy terminating connections at the client before encrypting such data, the additional processing can be performed more effectively. Such processing can include Domain Name Service (DNS) name resolution of the intercepted communications in order to enable client applications to use whatever IP addresses they choose as well as dynamically change those addresses at run time. Such additional processing permits embodiments of the present invention to be effectively integrated with other technologies such as global service load balancing to achieve greater availability and greater efficiency among distributed gateways or servers. The additional connection processing can also enable the keeping of detailed logs and statistics regarding the intercepted communications.

In another embodiment of the present invention, appliance 250 terminates communications received from the first program on client 205 and further processes one or more requests included therein rather than forwarding the communications to a destination on network 204 as shown at step 462. This further processing can include back-end encryption wherein communications are re-encrypted by appliance 250 before delivery to the appropriate destination on network 204, thereby providing end-to-end network security. The destination will thereafter decrypt the traffic and respond appropriately. Further, such processing can permit appliance 250 to serve responses out of a cache rather than requiring additional work by a destination server, perform local network load balancing, global service load balancing and/or compression on the communications to enhance the efficiency and responsiveness of network 204.

In accordance with the above-described methods, a VPN based on an encrypted data communication session is established between client 205 and network 204. For example, in an embodiment, a secure VPN is established via HTTPS. Thereafter, all communications from client 205 to network 204 are routed via the first program to appliance 250, and vice-versa, through this encrypted data communication session. It should be noted that although the encrypted data communication session may be established using HTTPS, the communications that are passed through the encrypted data communication session need not be HTTPS packet data or even HTTP packet data. For example, the communications may also comprise Transmission Control Protocol/User Datagram Protocol (TCP/UDP) or Internet Control Message Protocol (ICMP) packet data, although these examples are not intended to be limiting. Furthermore, although the method described in reference to FIG. 4B describes a request-response type communication between an application on client 205 and a resource on network 204, encrypted communications in accordance with the present invention need not be request-response based. Rather, the communications can be of any type. Thus, any client application that can establish a connection or communication session, such as a UDP session, can send and receive encrypted communications in accordance with an embodiment of the present invention.

In another aspect, the present invention is related to the acceleration program 120 dynamically bypassing from the client any intermediary device to connect or communicate with a server 206. For example, a client 205 may connection with a server via one or more intermediaries, such as the appliance 250 of the present invention. For one reason or another, an intermediary may no longer be available for use by the client 205 to communicate with the server 206, for example, the appliance 250 may be down for maintenance or may be in the process of rebooting or restarting. The acceleration program 120 of the present invention determines the intermediary is not available and automatically establishes a different connection or communication session path with the server 206. This may occur transparently to the user or application of the client 205 such that the connection and/or communication session does not appear to have changed or otherwise has been disrupted.

Figure 5:
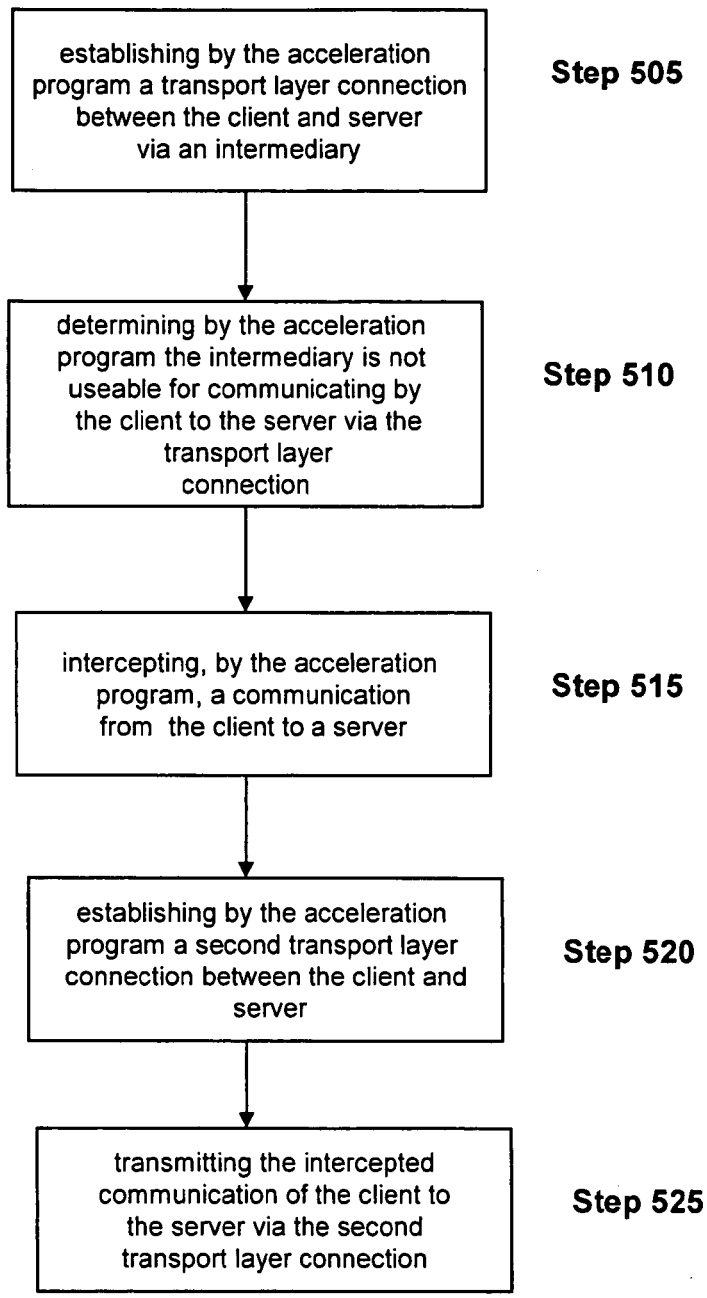
FIG. 5 is a step diagram of an embodiment of a method of the present invention for redirecting a client's communication to a server to bypass an intermediary determined not useable to transmit the communication to the server.

Referring now to FIG. 5, an embodiment of a method 500 of the present invention for automatically bypassing an intermediary is depicted. In brief overview, at step 505, the acceleration program 120 establishes a transport layer connection between the client 205 and server 206 via an intermediary, such as appliance 250. At step 510, the acceleration program 120 determines the intermediary is not useable for communicating by the client 205 to the server 206 via the established transport layer connection. At step 515, the acceleration program 120 intercepts on the client 205 a communication from the client 205 to the serve 206. At step 520, the acceleration program 120 establishes a second transport layer connection between the client 205 and the server 206, and as a result, bypasses the intermediary determines as not useable for the client's communications to the server 206. At step 525, the acceleration program 120 transmits the intercepted communication of the client 205 to the server 206 via the second transport layer connection.

In further detail, at step 505, the acceleration program 120 establishes a transport layer connection between the client 205 and the server 206 via an intermediary. In one embodiment, the intermediary comprises an appliance 205. In other embodiments, the intermediary comprises one of the following: a cache, a server, a gateway, a firewall, a bridge, a router, a switch, a hub, a proxy, or any software application or program acting as or providing the functionality and operations of any of these types and forms of intermediaries. In one embodiment, the intermediary may operate on the server 206. In some embodiments, the transport layer connection is established via a plurality of intermediaries of the same type and form or of a different types and forms. In another embodiment, the transport layer connection comprises of the connection of a pool of transport layer connection either established as the client 205 or at the appliance 250 in accordance with the operations of the present invention described herein.

At step 510, the acceleration program 120 determines the intermediary is not available or otherwise is not useable for communicating by the client 205 to the server 206 via the established transport layer connection. The acceleration program 120 may determine the status or availability of the intermediary by any suitable means and/or mechanism. In one embodiment, the acceleration program 120 determines the intermediary is not available by receiving an error message or failure reply associated with a transmission to the intermediary. For example, the acceleration program 120 may receive a failed transport layer communication response when transmitting a communication from the client 205 via the established transport layer connection. In another embodiment, the acceleration program 120 may transmit a ping command to the intermediary on a predetermined frequency to monitor the status and availability of the intermediary. If the acceleration program 120 does not receive a reply from the intermediary or in some embodiments, receives a delayed reply or a reply with a longer than desired latency, the acceleration program 120 may determine the intermediary is not available or useable by the client 205. In other embodiments, a server 206, appliance 250 or the intermediary may send a message to the client 205 or acceleration program 120 providing information identifying the intermediary is not available or otherwise is not useable by the client 205. In some embodiments, the established transport layer connection is disrupted or interrupted, or in other embodiments, is closed.

At step 515, the acceleration program 120 intercepts a communication from the client 205 to the server 206 destined to travel via the intermediary through the established transport layer connection. The acceleration program 120 may intercept the communication at any point and at any protocol layer in the network stack 210. In one embodiment, the acceleration program 120 intercepts the communication at the transport protocol layer prior to transmission on the established transport layer connection. For example, in some embodiments, the acceleration program 120 comprises a network driver having a transport driver interface or otherwise interfaced to the transport protocol layer. In other embodiments, the present invention is practiced with a first program 222 and the acceleration program 120 as a second program as discussed in conjunction with FIGS. 4A-4B, in which either the first program 222 or the acceleration program 120 intercepts the communication.

At step 520, the acceleration program 120 establishes a second transport layer connection to the server 205 for the client 205 in order to bypass the intermediary determined to be unavailable or not useable by the client at step 510. In one embodiment, the acceleration program 120 establishes a second transport layer connection directly to the server 206, for example, when the client 205 and server are on the same network 205 or on different networks routable between the client 205 and the server 206. In another embodiment, the acceleration program 120 establishes the second transport layer connection with a second intermediary, such as a second appliance 250'. In some embodiments, the acceleration program 120 requests the appliance 250 to establish another transport layer connection with the server 250. In one embodiment, the appliance 250 uses a second transport layer connection of a pool of transport layer connections to the server 206. In another embodiment, the acceleration program 120 request the server 206 to establish the second transport layer connection. In some embodiments, the acceleration program 120 uses a second transport layer connection from a pool of transport layer connections established by the acceleration program 120 with the server 206 in accordance with the operations of the present invention described herein.

In one embodiment, the acceleration program 120 establishes the second transport layer connection at step 520 transparently to a user or application 220 of the client 205, or in some embodiments, transparently to any protocol layer above or below the transport layer. In some aspects, the second transport layer connection is established automatically for the client 205 upon determination at step 510 that the intermediary is not available or should not be used by the client 205. In other embodiments, the second transport layer connection is established automatically upon failure of transmission of the intercepted communication to the server 206, e.g., the first attempt to transmit the communication. In some embodiments, the second transport layer connection is established automatically upon failure of one or more retried transmissions of the communication, or upon exhausting a predetermined number of retries. In another embodiment, the second transport layer connection is established upon determination the intermediary is delaying the rate of transmit or receipt of network packets, causing latency or otherwise affecting the use of the transport layer connection in an undesired manner. In one embodiment, the acceleration program 120 performs load-balancing and establishes a second transport layer connection bypassing the intermediary to offload any processing or operations of the intermediary to the client 205 and/or second intermediary.

At step 525, the acceleration program 120 transmits the intercepted communication of the client 205 to the server 206 via the second transport layer connection. In one embodiment, the acceleration program 120 transmits the intercepted communication directly to the server 106. In other embodiments, the acceleration program 120 transmits the intercepted communication via a second intermediary, such as a second appliance 250. By using the second transport layer connection, the acceleration program 120 bypasses the intermediary and continues the operations of an application 220 of the client 205 with the server 206. In one embodiment, an application 220 of the client 205 continues with operations and communications with the server 220 as if the application 220 was continuing to use the previously or first established transport layer connection. As such, the acceleration program 120 prevents, avoids or circumvents any communication interruption, disruption, latencies, delays or other operational or performance issues that may occur if the intermediary was not bypassed by the acceleration program 120. In another aspect, this technique of the present invention automatically provides the client 205 continuous access to a server 206 or remotely-accessed application even if there is an issue with or disruption in access from an intermediate device.

Moreover, the redirection and bypassing techniques of the present invention described above can be used to perform load-balancing and traffic management on the client 205 to access one or more servers 206a-206n providing applications 220a-220n, or other content and functionality to the client 205. For example, in one embodiment, an intermediary or appliance used by the client to access a server may be overloading with increasing transport layer connections, and decreasing rate of responses, performance or other operations. Upon determination of decreasing performance of the intermediary or appliance, the acceleration program 120 can redirect the client to another intermediary or appliance, or server to bypass any performance bottlenecks in the client's end-to-end connectivity to the server.

Figure 6:
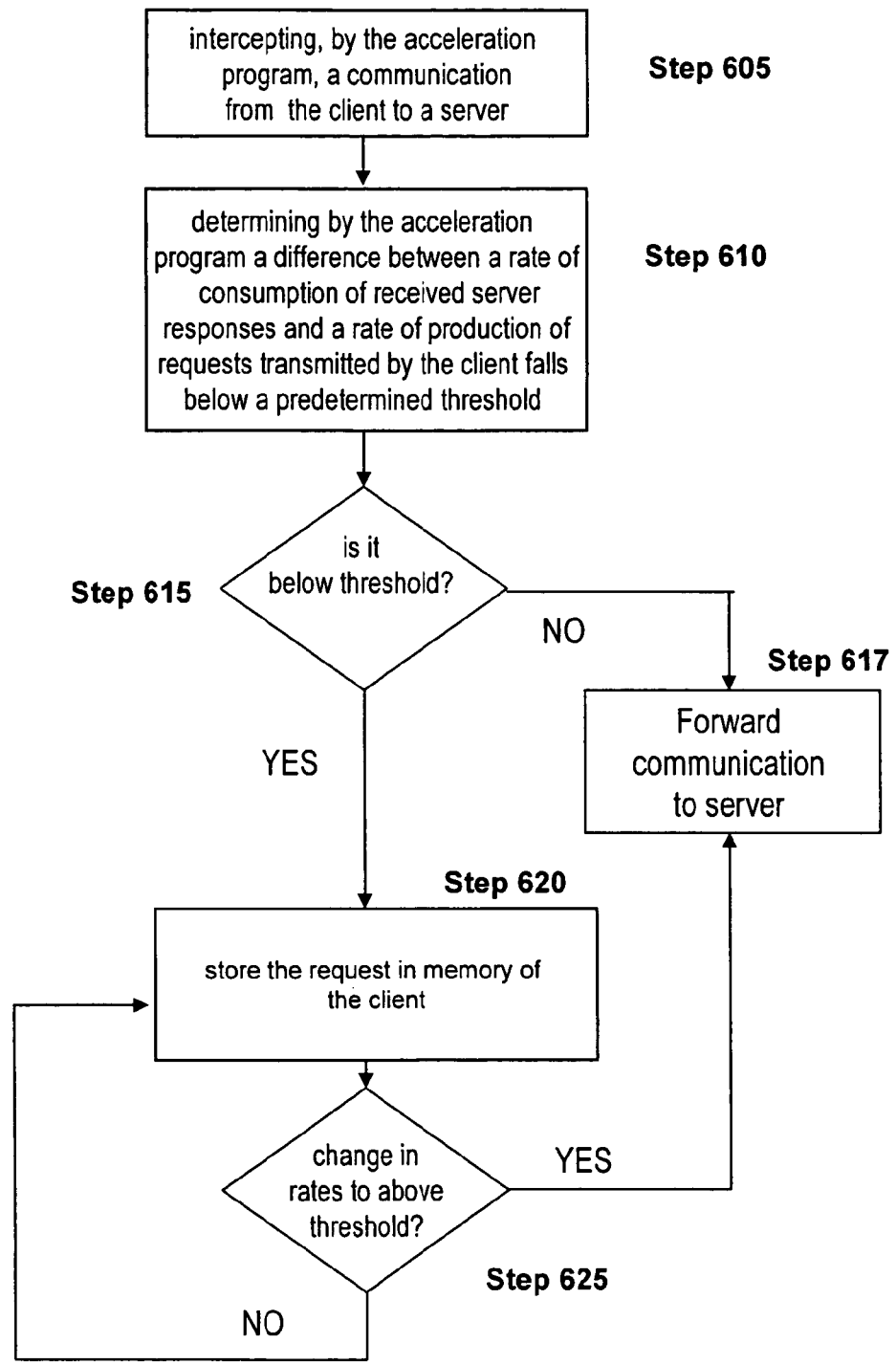
FIG. 6 is a step diagram of an embodiment of a method of the present invention for performing a client-side acceleration technique of transport control protocol buffering.
Figure 7A:
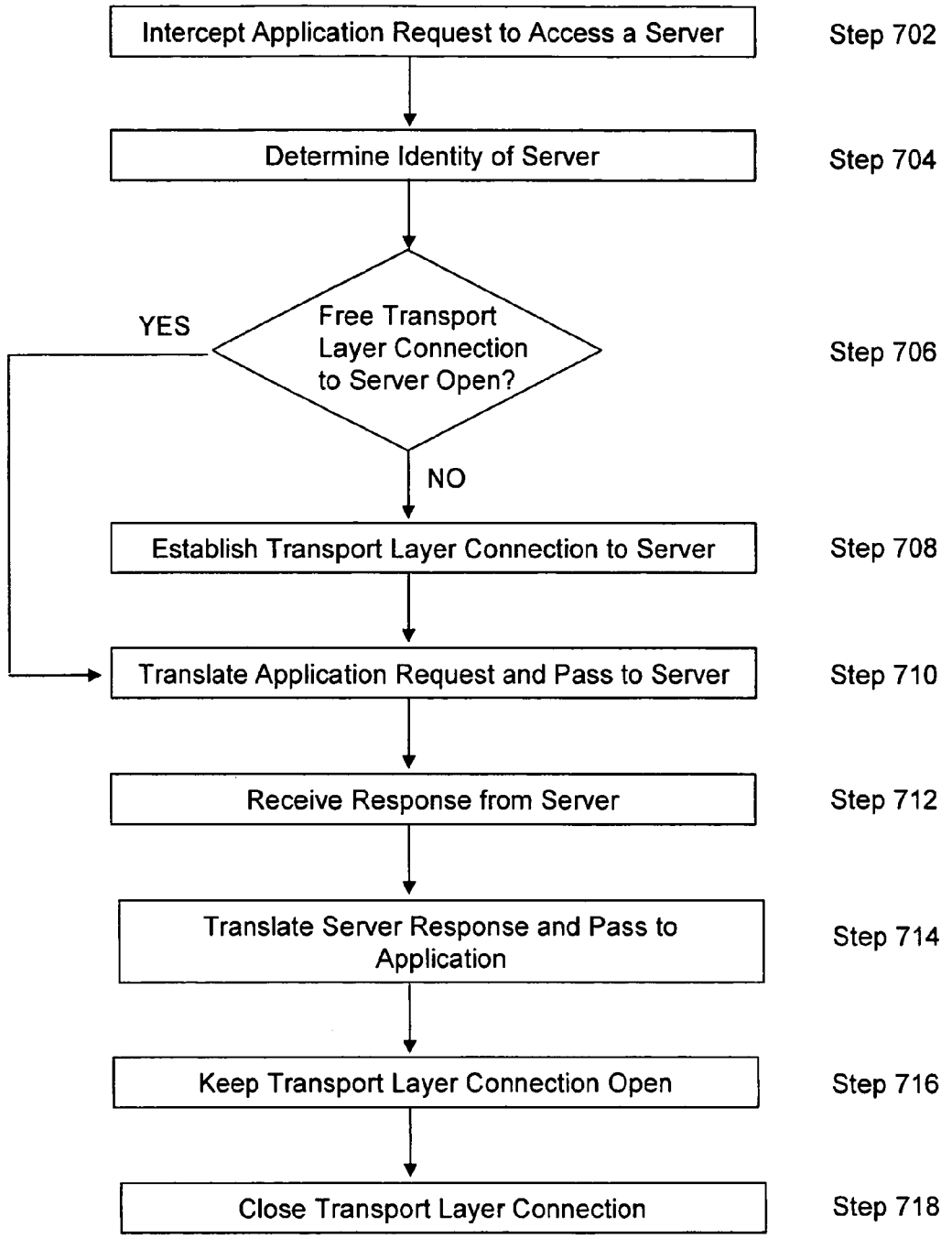
FIG. 7A is a step diagram of an embodiment of a method of the present invention for performing a client-side acceleration technique of transport control protocol connection pooling.
Figure 7B:
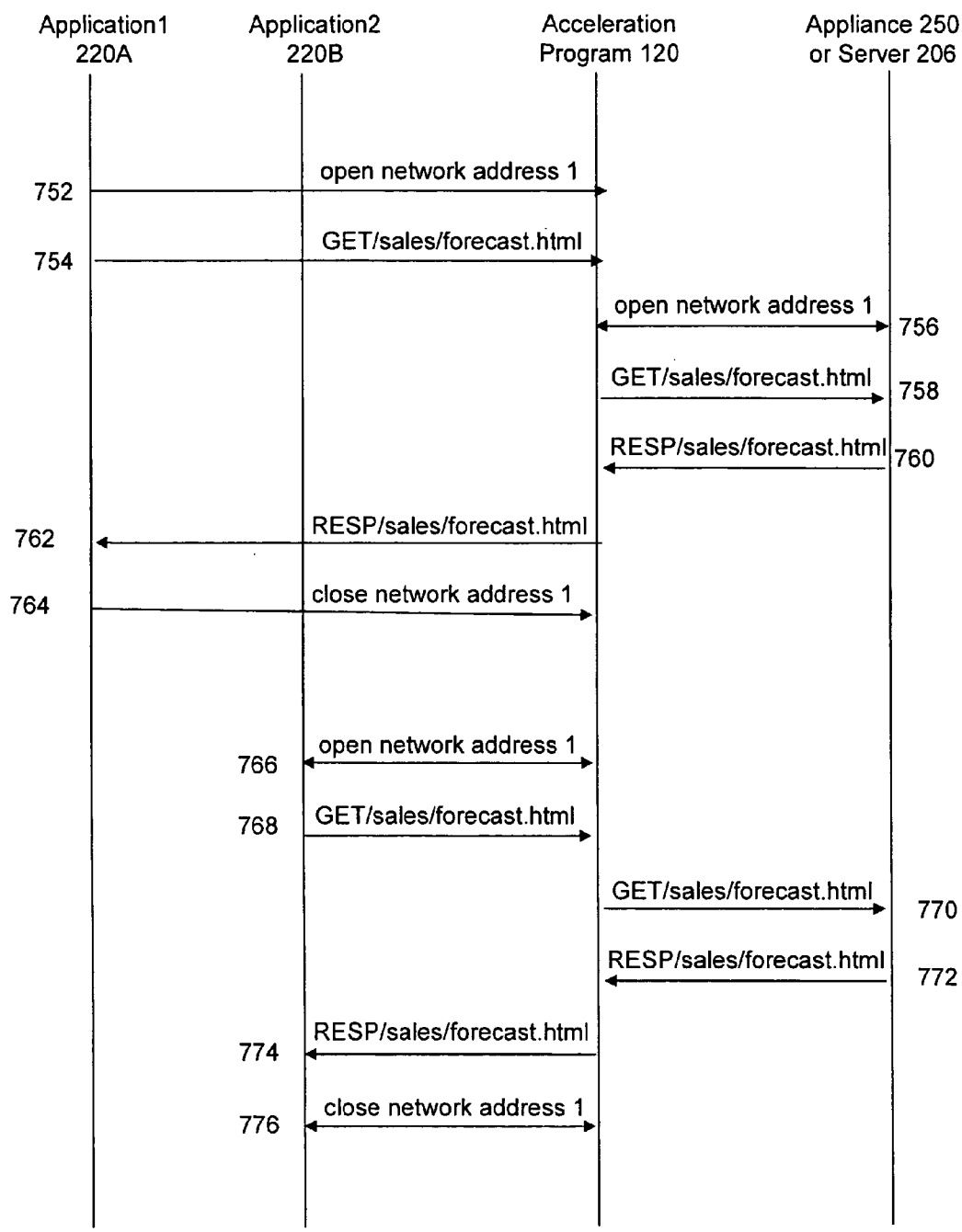
FIG. 7B is a diagrammatic view of an example set of HTTP transactions performed by a plurality of applications via a pool of one or more transport layer connections provided by an embodiment of the present invention.
Figure 8:
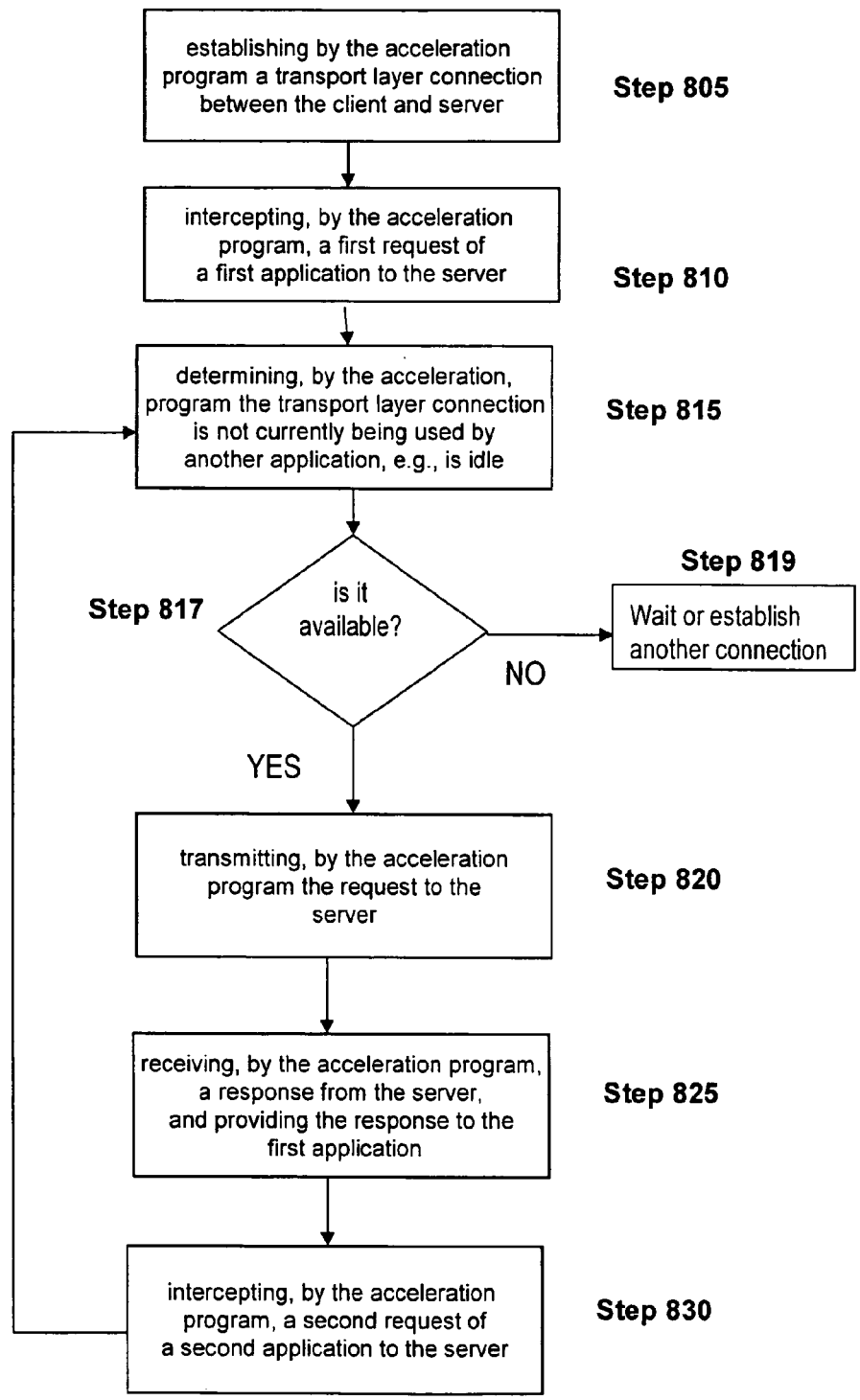
FIG. 8 is a step diagram of an embodiment of a method of the present invention for performing a client-side acceleration technique of transport control protocol multiplexing.

In other aspects, the present invention is related to client-side acceleration techniques related to or performed at the transport protocol layer of the network stack of the client. The acceleration program 120 may comprises executable instructions to perform any one or more of 1) transport control protocol (TCP) buffering 228, 2) TCP connection pooling 224, and 3) TCP multiplexing 226. In some embodiments, as the acceleration program 120 transparently processes communications intercepted at the transport protocol layer of the client's network stack, the acceleration program 120 can control and manage the TCP connections of the client, and the use and transmission over the connections by applications 220a-220n of the client 205. FIG. 6 depicts an embodiment of method 600 of practicing the TCP buffering techniques of the present invention, while FIGS. 7A-7B depicts an embodiment of the TCP connection pooling technique of the present invention and FIGS. 8, 9, and 10 the TCP multiplexing technique.

In brief overview of an embodiment of method 600 depicted in FIG. 6, at step 605, the acceleration program 120 intercepts a communication from the client 205 to the server 206, such as a request to access the server 206 by the client 205. At step 610, the acceleration program 120 determines whether a difference between a rate of consumption of received server responses and a rate of production of requests transmitted by the client falls below a predetermined threshold. If at step 615, the difference in product and consumption rates does not fall below the predetermined threshold, the acceleration program 120 forwards the communication to the server 260 at step 617. If at step 615, the difference in rates is below the predetermined threshold, then at step 620, the acceleration program 120 stores the communication in memory of the client 205. At step 625, the acceleration program 120 determines if the difference in rates has changed to above the predetermined threshold, and if so forwards the stored communication to the server 206. Otherwise, the acceleration program 120 maintains the communication in memory of the client 205 until a point in time the difference in rates change at step 625 to above the predetermined threshold. For example, if the client 205 is transmitting requests to the server 206 at a greater rate than by which the client 205 can consume the generated responses, the acceleration program 120 of the present invention holds further transmission until a future point in time at which the difference in the rates haves changed.

In further detail, at step 605, the acceleration program intercepts a communication from the client 205 to the server 206. The acceleration program 120 may intercept the communication at any point and at any protocol layer in the network stack 210. In one embodiment, the acceleration program 120 intercepts the communication at the transport protocol layer prior to transmission on the established transport layer connection. For example, in some embodiments, the acceleration program 120 comprises a network driver having a transport driver interface or otherwise interfaced to the transport protocol layer. In other embodiments, the present invention is practiced with a first program 222 and the acceleration program 120 as a second program as discussed in conjunction with FIGS. 4A-4B, in which either the first program 222 or the acceleration program 120 intercepts the communication. In one embodiment, the communication comprises a request by the client 205 to use or otherwise access a resource of the server 206, such as an application 220.

At step 610, the acceleration program 120 determines whether a difference between a rate of consumption and a rate of production of the client 205 falls below a predetermined threshold. In one embodiment, the acceleration program 120 counts and tracks the number of requests transmitted by the client 205 to the server 206, and in another embodiment, the acceleration program 120 counts and tracks number of responses received by the client 205 from the server 206. In some embodiments, the client 205 tracks responses transmitted and requests received on a per application 220 basis. The responses and requests may be tracked at any protocol layer of the network stack 210. In one embodiment, the number of requests transmitted by the client 205 or application 220 is counted and tracked from the point of submission to the transport layer or to a transport layer connection between the client 205 and server 206. Likewise, in another embodiment, the number of responses received by the client 205 or application 220 from the server 206 is counted and tracked from the point of receipt at to the transport layer or from the transport layer connection between the client 205 and server 206, and/or at the point the response is provided to a protocol layer, such as an application layer, above the transport layer of the network stack 210.

In some embodiments, the acceleration program 120 accesses, inspects or otherwise obtains information and data about the send and receive TCP buffers of the transport layer connection established by the acceleration program 120 between the client 205 and server 206. For example, the acceleration program 120 may determine the default and maximum size of any TCP/IP buffer and the currently used portions of the buffer to determine a difference in rates between sending and receiving of network packets from the client 205 to the server 206. In other embodiments, the acceleration program 120 uses any type and form of congestion algorithm to determine if there is congestion causes by a difference in consumption and product of network packets from the client 205 to the server 206. In another embodiment, the acceleration program 120 interfaces with or obtains information or data from a congestion algorithm uses by the transport layer connection, such as by a network driver or TCP service provider. For example, in one embodiment, the acceleration program 120 determines information and data regarding the congestion window used by the connection.

The predetermined threshold can be configured, specified, defined or identified by any suitable means and mechanism of the acceleration program 120. In one embodiment, the threshold may be specified as a percentage, relative, absolute or otherwise, between the production rate and consumption rate of the client 205 and/or application 220. The rates for consumption and/or product may be identified by a number of consumed receipts and produced transmissions respectively, over any time period at any granularity. In some embodiments, the threshold may be specified as a quantity difference between the rate of production and consumption of the client 205 and/or application 220, and in some embodiments, a quantity difference over a time period. For example, the threshold may be specified as the point in time the client 205 has produced 100 requests more than the client 205 has consumed. In another example, the threshold may be specified as the point in time when the client 205 is producing 10 requests per time period to the server 206 more than the requests consumed by the client 205 during the same time period.

At step 615, if the difference in product and consumption rate of the client 205 and/or application 220 is not below the predetermined threshold, the acceleration program 120 forwards the communication to the server 260 at step 617. In some embodiments, the acceleration program performs any of the acceleration techniques of the present invention for the communication. For example, the communication may be forwarded to the server via a pooled multiplexed transport layer connection, and additionally, may be compressed. In other embodiments, the client 205 may forward the communication to an appliance 250 providing a connection for the client 205 to the server 206.

At step 615, if the difference in product and consumption rate of the client 205 and/or application 220 is below the predetermined threshold, the acceleration program 120, at step 620, stores the communication in memory of the client 205. In some embodiments, the memory may be memory of the kernel-mode 202 of the client 205, while, in other embodiments, the memory may be in user-mode 203 of the client 205. In one embodiment, the acceleration program 120 may store the communication in cache via the cache manager 232. In other embodiments, the acceleration program 120 may use an object, data structure or other data element accessible by the acceleration program 120 to buffer, hold or otherwise store the intercepted communication. In one embodiment, the intercepted communication may be stored in a compressed manner in memory. In another embodiment, the acceleration program 120 sends the intercepted communication to a first program 222 to store or hold in memory for transmission at a later point in time.

At step 625, the acceleration program 120 determines when to transmit the stored communication to the server 206. In one embodiment, the acceleration program 120 performs steps 610 and 615 to determine if the difference in production and consumption rates of the client 205 are above the threshold upon which the acceleration program 120 forwards the stored communication to the server 206 at step 617. In some embodiments, the acceleration program 120 compares the difference in production and consumption rates on a regular or predetermined frequency or on a polling or event basis, and when the difference rises above the predetermined threshold, the acceleration program 120 forwards the communication to the server 206. In other embodiments, the acceleration program 120 sets or configures a timer to determine how long to store the intercepted communication. Upon expiration of the timer the acceleration program 120 transmits the stored communication to the server 206. In another embodiment, the acceleration program 120 checks the number of server responses consumed by the client 205 since storing the intercepted communication. If the number of consumed responses is greater than a predetermined number, the acceleration program 120 releases the intercepted communication from the memory buffer or storage and submits the communication for transmission to the server 206.

If at step 625, the acceleration program 120 determines the rates of production or consumption have not changed in a suitable manner, the acceleration program 120 holds or maintains the intercepted communication in memory until a suitable point of time is reached. In one embodiment, the acceleration program 120 forwards the communication to the server at step 617 even if the production and/or consumption rates do not change. For example, after a period of time waiting for the production and/or consumption rate to change and the rates do not change, the acceleration program 120 forward the communication to the server 206.

Although the TCP buffering technique of the present invention is generally discussed in relation to an intercepted communication or request, the embodiments of the method 600 of the present invention may be practiced subsequently, nearly simultaneously or concurrently for multiple intercepted communications of the client 205 to the server 205. Additionally, in another embodiment, the method 600 of the present invention may be practiced on the client regarding communications from the client to multiple servers 206a-206n. For example, a first instance of method 600 may be practiced between the client 205 and a first server 206a, and a second instance of method 600 may be practiced between the client 205 and a second server 206b. Furthermore, in some embodiments, the method 600 may be practiced for a first application 200a and also for a second application 200b, using the respective production and consumption rates of each application. In other embodiments, the method 600 may be practiced for a first application 200a but not a second application 200n.

According to another aspect of the present invention, the client-side acceleration program 120 reduces the processing load of servers 206a-206n and/or appliance 250 caused by repeatedly opening and closing connections of the client clients by opening one or more connections with each server and maintaining these connections to allow repeated data accesses by applications of the client 205 to the server 206. This technique is generally referred to herein as "connection pooling." In brief overview of method 700, at step 702, the acceleration program 120 intercepts an application's request to access a server, and at step 704, determines the identity of the server associated with the request. At step 706, the acceleration program 120 determines if the acceleration program 120 has an established transport layer connection to the server 206 free for use by the application 220. If there is not a transport layer connection to the server 206 free for use by the application 220, the acceleration program 220 establishes, at step 708, a transport layer connection to the server 206 for use by the client 205. At step 706, if there is a transport layer connection available for use by the application 220, at step 710, the acceleration program 120 translates the application's request for transmission or communication via the available transport layer connection.

In further overview, at step 712, the acceleration program 120 receives the response to the request from the server 206, and at step 714 translates the response into a response to the application 220. At step 716, the acceleration program 120 may maintain or keep the transport layer connection open for use by any of the applications 220a-220n of the client 205. By maintaining on the client 205 open transport layer connections with the servers 206a-206n and by opening and closing connections with the applications as needed, the acceleration program 120 frees the servers of TCP connection loading problems associated with serving the client 205 over the network 204, such as the Internet. At step 718, the acceleration program 120 at some point closes the transport layer connection if the connection is determined no longer used by one or more application 220 of the client 205 to access the server 206.

In further detail, at step 702, the acceleration program 120 intercepts a request by any application 220a-220n of the client 205 to access a server 206. In some embodiments, the request is intercepted at the transport protocol layer before establishing or transmitting the request via a transport layer connection. In other embodiments, the request is intercepted at any protocol layer above the transport layer or a transport layer connection. In one embodiment, the request of the application 220 is a request to open or establish a transport layer connection with the server 206. In some embodiments, in response to the request, the acceleration program 120 establishes a first transport layer connection of a pool of transport layer connections for use by applications 220a-220n of the client 205. In another embodiment, the application request is a request to access the server via an established transport layer connection of the client 205.

At step 704, the acceleration program 120 determines the identity of the server 206 from the request by any suitable means and mechanism. In some embodiments, the domain name or internet protocol address of the server 206 is identified or otherwise referenced by the contents of the request, for example a text string of the request may identify the domain name of a server 206. In one embodiment, the identity of the server 206 is determined by the header information of a TCP packet, such as the destination internet protocol address and port number. In another embodiment, the server 206 is associated with the application 220, and the acceleration program 120 looks up or queries the association in a database or other structured information storage.

At step 706, the acceleration program 120 determines if there is a transport layer connection available for use or is otherwise free to use by the application 220. In one embodiment, the acceleration program 120 may have not yet established a transport layer connection with the server 206, and as such, there is not a transport layer connection available for the application 220 to use. In another embodiment, the acceleration program 120 may have a previously established transport layer connection with the server 206 but determines that another application 220 is currently actively using the connection. As will be discussed in further detail below, the acceleration program 120 determines if an established transport layer connection is available for use by another application or can be shared by applications 220s-220n based on the length of a message being received from the server 206 for the application 220, such as a response to a request, and/or if the communications between the server 206 and application 220 are currently idle.

At step 708, if the acceleration program 120 determines a transport layer connection is not available for use by the application 220, the acceleration program 120 establishes a transport layer connection with the server 206. In some embodiments, the transport layer connection established at step 708 is the first transport layer connection with the server 206, and in other embodiments, the transport layer connection is a second transport layer connection of a plurality of transport layer connections to the server 206. In yet another embodiment, the acceleration program 120 waits for an already established transport layer connection to become available or free to communicate the application's request to the server 206. For example, the acceleration program 120 may determine a first application 220a may be shortly completing a transaction with the server 206 via an established connection.

At step 710, the acceleration program 120 translates the application's request to be transmitted via the transport layer connection to the server 106. In some embodiments, the acceleration program 120 uses one port number for the transport layer connection communication for all applications 220a-220n of the client 205 sharing the connection. In some cases, the acceleration program 120 tracks the requests and outstanding responses for the requests on an application by application basis. As such, the acceleration program 120 recognizes which application 220 is transmitting and receiving network packets via the transport layer connection to the server 206 at any given point in time. In one embodiment, only one application 220 at a time is sending and receiving on the transport layer connection and thus the acceleration program 220 understands which application 220 is using the connection. In some embodiments, the acceleration program 120 associates a process id of the application 220 with the request. In other embodiments, the acceleration program 120 provides and associates a port number with the application 220, and modifies the port number in the TCP network packet to be transmitted to application's assigned port number. In another embodiment, the port number is provided by the application 220 and the acceleration program 120 changes or otherwise provides the port number accordingly in the TCP network packet.

At step 712, the acceleration program 120 receives a response to the application's request from the server 206. In one embodiment, the server 206 does not respond to the request. In another embodiment, the server 206 responds with an error or failure message. In some embodiments, the server 206 responds with multiple responses. In other embodiments, the server 206 responds with a response comprising multiple network packets or multiple TCP segments. In another embodiment, the server 206 responds with one or more network packets identifying the source port number associated with or assigned to the application 220. In one embodiment, the server 206 responds with one or more network packets identifying a source port number of the transport layer connection and used for multiple applications of the client 205.

At step 714, the acceleration program 120 translates or otherwise processes the response from the server 206 in a manner responsive to the application 220. In one embodiment, the acceleration program 120 replaces the source port number of the received network packet or packets with the port number of the application 220. In another embodiment, the acceleration program 120 determines via a tracking mechanism the application 220 currently using the transport layer connection and passes the response to the application 220 via the network stack 210. In one embodiment, the response is not altered and passed for processing via the protocol layers of the network stack 210 above the transport layer of the connection. In some embodiments, the acceleration program 120 waits for multiple portions, such as TCP segments, of the response to be received before processing and forwarding the response to the application 220. In one embodiment, the acceleration program 120 passes the response to a first program 222, which interfaces with and provides the response to the application 220.

At step 716, the acceleration program 120 maintains or keeps the transport layer connection open in a pool of one or more transport layer connections from the client 205 to the server 206. In one embodiment, the acceleration program 120 or a transport layer driver of the network stack 210 includes a keep-alive mechanism that periodically probes the other end of a connection when the connection is otherwise idle, for example where when there is no data to send. The keep-alive mechanism may send this message in order to receive a response to confirm the connection is still active although the connection may be idle. The keep-alive message and corresponding response. may include any type and form of format, command, directive or communication. As such, in some embodiments, the acceleration program 120 transmits or causes to transmit via a transport layer driver a keep-alive message to the transport layer connection. In some embodiments, the acceleration program 120 sets a frequency for the keep-alive messages, and in other embodiments, changes the frequency of the keep-alive messages based on the behavior or activity of the applications 220a-220n using the connection.

In some embodiments, the acceleration program 120 intercepts any RST and/or FIN commands, i.e., TCP/IP commands to reset and/or terminate the TCP connection, received over the transport layer connection. In one embodiment, the acceleration program 120 ignores, takes no action on, or otherwise drops, deletes or flushes the intercepted RST and/or FIN command. In another embodiment, the acceleration program 120 intercepts and receives a RST and/or FIN commands but sends a message to the other end of the connection to keep or maintain the connection open. In other embodiments, the acceleration program 120 establishes a new transport layer connection in response to a closing of an established transport layer connection due to processing of a RST and/or FIN command.

In other embodiments, the acceleration program 120 inserts an instruction, command or directive in an intercepted communication of the client 205 to direct the server 206 to keep the connection open or to otherwise not close the connection unless the client 205 sends a command to do so. For example, in one embodiment, the acceleration program 120 intercepts a communication of a GET request of the HTTP protocol, such as protocol version 1.0, and inserts a keep-alive header, e.g., "Connection: Keep-Alive", into the communication to the server 206. In other embodiments, a GET request or other HTTP command may include the keep-alive header. In these embodiments, the acceleration program 120 may intercept the communication and check for the keep-alive header and then forward the communication to the server 206. In some embodiments, version 1.1 or greater of HTTP is used by which the keep-alive mechanism is implicit such that the server 206 keeps the connection open until the client 205 requests to the close the connection. In other embodiments, the acceleration program 120 keeps the transport layer connection open to the server 206 until the client 205 is rebooted or restarted, the network 204 becomes unavailable or the client 205 is disconnected from the network 204, or the server 206 is rebooted or restarted.

At step 718, the acceleration program 120 may close any one or more of the transport layer connections between a client 205 and a server 206 at any desired point in time. In some embodiments, the acceleration program 120 closes a transport layer connection upon the termination of the one or more applications 220a-220n on the client 205 using the connection. In other embodiments, the acceleration program 120 closes a transport layer connection upon expiration of a time out period for any application 220a-220n to use the connection. For example, the acceleration program 120 may configure, set or provide a timer to expire upon a predetermined time period and if the connection is or remains idle during the time period, the acceleration program 120 closes the connection. In some embodiments, the server 206 may be rebooted, restarted, or the connection disrupted or interrupted and the acceleration program 120 closes the connection. In some embodiments, the acceleration program 120 transmits or causes to be transmitted a RST and/or FIN command to close connection upon completion of sending requests to and receiving all the data of responses from the server 206. In other embodiments, the transport layer connection or pool of transport layer connections are closed upon restart or reboot of the client 205, disconnection to the network 204 or unavailability of the network 204, or restart or reboot of the server 206.

In some embodiments, a first transport layer connection to the server 206 is kept open while a second transport layer connection to the server is closed as the acceleration program 120 determines only the first transport layer connection is needed for sharing a connection to the server 206 by one or more applications 220a-220n of the client 205. In other embodiments, the acceleration program 120 maintains a pool of one transport layer connection to any server 206a-206n and establishes a second or a plurality of connections to a given server 206 based on increased requests, communications or transport layer connection usage of the applications 220a-220n on the client 205

Although an embodiment of method 700 is generally discussed in relation to a pool of one or more transport layer connections from the client 205 to a server 206, the acceleration program 120 may establish subsequently, nearly simultaneously, or concurrently a pool of transport layer connections between the client and each of a plurality of servers 206a-206n. As such, a first application 220a and a second application 220b may be using a first pool of one or more transport layer connections to server 206a, and a third application 220c and a fourth application 220d using a second pool of one or more transport layer connection to server 206b. Furthermore, each of the steps of an embodiment of the method 700 can be performed in different instances and at different frequencies. In some embodiments, multiples instances of the acceleration program 120 may be used to handle each pool of one or more transport layer connections to each server 206a-206n.

FIG. 7B is a diagrammatic view of a message step illustrating the transport layer connection pooling techniques of the present invention according to one example embodiment. In brief overview, FIG. 7B depicts a flow diagram of an acceleration program 120 providing a transport layer connection for use by two applications 220a and 220b of a client 205, to a server 206 in one embodiment, or to an appliance 205, in another embodiment. The acceleration program 120 on client 204 opens a first transport layer connection between client 205 and the server 206, or appliance 205, using network address 1 provided by application 220 as depicted by step 752. Step 752 is shown as a two-way step because the TCP/IP protocol employs a multi-stage handshake to open connections.

Once the transport layer connection is established, the acceleration program 120 intercepts a GET request from application 220a specifying a path name of /sales/forecast.html, as shown by step 754. Because no free transport layer connection is open between acceleration program 120 and server 206, or appliance 205, acceleration program 120 opens a transport layer connection. In one embodiment, acceleration program 120 maps the request of the application 220a to a second network address of network address 2 which specifies server 260, as shown by step 756. For example, the acceleration program 120 performs network address translation to modify the destination IP address and/or destination port to a server 206a requested by the application 220a or to another server 206b that can also handle or respond to the request. In another embodiment, the acceleration program 120 sends the request to the server 206, or appliance 250, as received or as generated by the application 220s.

Acceleration program 120 also passes the GET request to that server 206, or appliance 250, as shown by step 758. In one embodiment, the appliance 250 forwards the request to the server 206, and in a further embodiment, the appliance 250 forwards the request via a pooled or pooled and multiplexed transport layer connections between the appliance 250 and the server 206. In some embodiments, the server 206 responds with the requested web page, as shown by step 760. Acceleration program 120 forwards the web page to application 220a, as shown by step 762. In one embodiment, the transport layer connection between the acceleration program 120 and the server 206, or appliance 250, is closed, as shown by step 764. In other embodiments, the acceleration program 120 intercepts the close request, and ignores the request leaving the transport layer connection open. According to the TCP/IP protocol, closing a network connection can involve a multi-stage process. Therefore, the flow line of step 764 is shown as bidirectional. In other embodiments and in accordance with the techniques of the pooling aspect of the present invention, the transport layer connection established for and used by the first application 220 is kept open or otherwise maintained to accommodate further data steps from the same application 220a or a different application, such as the second application 220b.

At step 766, the acceleration program 120 intercepts a request from the second application 220a to the server 206, or appliance 250. If there is a free transport layer connection open and/or useable by the second application 220b, such as the transport layer connection established at step 756 for the first application 220a, the acceleration program 120 uses this previously established transport layer connection. As such, a second transport layer connection does not need to be opened at step 766. Otherwise, the acceleration program 120 establishes a second transport layer connection to the server 206, or appliance 250. At step 768, the acceleration program intercepts a request from the second application 220b, for example requesting the Web page /sales/forecast.html, and transmits the request to the server 206, or appliance 250, at step 770. Because a free connection is already open between the acceleration program 120 and server 120, it is unnecessary for the acceleration program 120 to burden the server 120 with the processing load of opening a further connection. At step 772, the acceleration program 120 intercepts or receives a response from the server 206, such as via appliance 250 from the transport layer connection, and forwards the response to second application 220b. At step 776, the acceleration program 120 intercepts a close request from the second application 220b, and in some embodiments, closes the connection, while in other embodiments, ignores the request, and keeps the connection to accommodate further data requests from the first application 220a, the second application 220b, or yet another application 220c-220n of the client 205.

There are a number of scenarios that result in the acceleration program 120 closing the connection with server 206, or application 250, at step 776. For example, the client 205 or acceleration program 120 may initiate a FIN (finish) command upon determination that the client 205 has retrieved all the requested data for applications 220a and 220b, or upon termination, shutting down or exiting applications 220a and 220b. In some embodiments, the client 205 or acceleration program 120 may also initiate a RST (reset) command under similar conditions. In addition to closing the connection between the acceleration program 120 and the server 206, or the appliance 250, the RST command results in a number of housekeeping operations being performed to keep the server side connection in good order. In particular, the TCP protocol guarantees that the RST command will have the right SEQ (sequence) number so that the server will accept the segment. However, the RST command is not guaranteed to have the right ACK (acknowledge) number. To take care of this scenario, the acceleration program 120 keeps track of the bytes of data sent by the server 206, or appliance 250, and the bytes acknowledged by the client 205. If the client 205 has not yet acknowledged all the data by the server 206, the acceleration program 120 calculates the unacknowledged bytes, and sends an ACK to the server 205.

Furthermore, although not shown in FIG. 7B, the server 206, or appliance 250, can also close a connection between itself and the client 205. The server 206, or appliance 250, would send a FIN command to the client 205. In response, in some embodiments, the acceleration program 120 closes the connection, and a further embodiment, re-establishes another connection with the server 206, or appliance 250.

Moreover, although an embodiment of method 700 of FIG. 7A and the example flow diagram of FIG. 7B are generally discussed as pooling one or more transport layer connections for use by a plurality of applications, the pooling technique of the present invention can be applied to a single application 220 that requests or initiates a plurality of transport layer connections and requests via these connections. For example, in an embodiment of HTTP protocol, a transport layer connection may be established for each HTTP request from an application. Using the techniques of the present invention, a pool of one or more transport layer connections can be used by the application 220 without opening and closing transport layer connections for each request.

In another aspect, the present invention is related to techniques for multiplexing application requests via the same or shared transport layer connection, such as a transport layer connection established via the pooling techniques described in conjunction with FIGS. 8A-8B. In some embodiments, the present invention determines the availability of an established transport layer connection and multiplexes requests from a plurality of application via the connection by checking whether the content of a response from the server 206 to an application's requests has been completely received. As will be discussed in further detail below, the present invention uses in one embodiment, the content-length parameter of a response, and in another embodiment, a chunked transfer encoding header of a response to check if all the data of a response has been received. In one aspect, the present invention checks whether all the data from a response has been received to determine if a pooled connection is currently free for use by an application, and/or whether to establish another transport layer connection to the pool of connections to the server, such at steps 706 and 708 of method 700 depicted in FIG. 7A. In another embodiment, the technique of checking the content length for a response is used as a technique for multiplexing requests from a plurality of applications via the same transport layer connection.

Referring now to FIG. 8A, an embodiment of a method 800 for multiplexing requests via a single transport layer connection from the client 205 to the server 206 is depicted. In brief overview, at step 805, the acceleration program 120 establishes a transport layer connection between the client 205 and server 206. At step 810, the acceleration program 120 intercepts a first request of a first application 220a to the server 206. At step 815, the acceleration program 120 determines whether the transport layer connection is currently being used by another application or is otherwise idle. At step 817, if the transport layer connection is available to use by the application 220a then at step 820, the acceleration program 120 transmits the request to the server. Otherwise, at step 817, if the transport layer connection is not available to use by the application 220a, then the acceleration program 120 at step 819 either waits for a time period and returns to step 815, or establishes a second transport layer connection for use by the application 220. At step 825, the acceleration program 120 receives a response to the application's request from the server. At step 830, the acceleration program 120 intercepts a second request, by a second application 220b, and proceeds at step 815 to determine if the transport layer connection is available for use by the second application 220b. In some embodiments, the acceleration program 120 intercepts the request of the second application 220b at step 830 prior to receiving the response of the first request at step 825, or prior to receiving all of the data of the response. As discussed further herein, in some embodiments, the acceleration program 120 uses content length checking technique to determine when the transport layer connection is idle or an application has received all the data to a response to a request.

In further detail, at step 805, the acceleration program 120 establishes a transport layer connection between the client 205 and server 206. In some embodiments, the acceleration program 120 establishes the transport layer connection with or via the appliance 250, or an intermediary. In one embodiment, the acceleration program 120 establishes the transport layer connection as a pool of transport layer connection to the server 206. As such, in some embodiments, the transport layer connection may comprise a second or a third transport layer connection to the server 206. In other embodiments, the acceleration program 120 may establish the transport layer connection via a first program 222 as previously discussed herein. In some embodiments, the acceleration program 120 established the transport layer connection in response to a request by a first application 220a of the client 205.

At step 810, the acceleration program 120 intercepts a first request by a first application 220a to access the server 206. In some embodiments, the request is intercepted at the transport protocol layer before establishing or transmitting the request via the transport layer connection. In other embodiments, the request is intercepted at any protocol layer above the transport layer or above the transport layer connection. In some embodiments, the request is intercepted by a first program 222. In one embodiment, the request of the application 220a is a request to open or establish a transport layer connection with the server 206. In another embodiment, the application request is a request to access the server via the established transport layer connection or via the appliance 250.

At step 815, the acceleration program 120 determines whether the transport layer connection is idle or available for use by the first application 220a, or to communicate the first request of the first application 220a. In some embodiments, the acceleration program 120 determines from a pool of one or more transport layer connections, which transport layer connection in the pool is idle or free to use by the first application 220a. In one embodiment, the acceleration program 120 determines the transport layer connection is idle because the acceleration program 120 established the transport layer connection in response to the request, or immediately prior to the request. In some embodiments, the acceleration program 120 may have not received any requests from any application 220 and recognizes this request as the first request to be intercepted and processed by the acceleration program 120. In another embodiment, the acceleration program 120 tracks the number of outstanding responses for any requests transmitted on the transport layer connection, and if there are no outstanding responses, the acceleration program 120 recognizes the transport layer connection is available for use by the first application 220a. In yet another embodiment, the acceleration program 120 recognizes the transport layer connection is currently idle. For example, the acceleration program 120 may be initiating keep-alive requests to the server to keep the connection open. In some embodiments, the transport layer connection is idle as the last transaction has been completed but the server 206 and/or client 205 has not yet transmitted a RST and/or FIN command.

Figure 9:
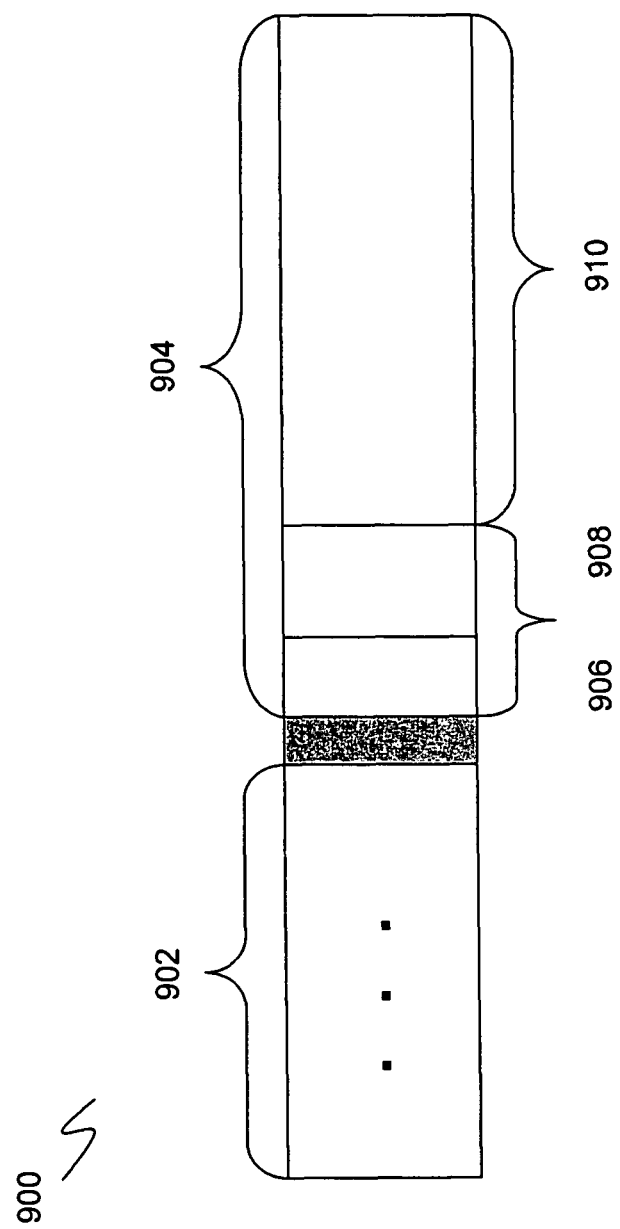
FIG. 9 is a diagrammatic view of an embodiment of a content length identifier of a transport layer packet.

In some embodiments, the acceleration program 120 may check the content length of a response to determine if the response from the server 206 to the first request of the first application 202a is complete or otherwise, the acceleration program 120 has received all the data to the response. As mentioned above, these techniques in some embodiments are also used to determine to establish another connection for the pooling technique of the present invention. In regards to this technique of the present invention, FIGS. 9 and 10 will be used to describe checking the content-length parameter of a response in one embodiment, or in another embodiment, a chunked transfer encoding header of a response to determine whether all the data of a response has been received. FIG. 9 depicts a TCP portion of a TCP packet referred to as a TCP segment 900. The TCP segment 900 includes a TCP header 902, and a body 904. The body 904 comprises among other data and information, a HTTP header and message in an embodiment wherein the TCP packet carries an application layer protocol of HTTP. In some embodiments, a content length parameter 906 is located, found or referenced by or in the HTTP header. In one embodiment, the acceleration program 120 of the present invention uses the content length parameter 906 to determine if all the data for a response is received.

Figure 10:
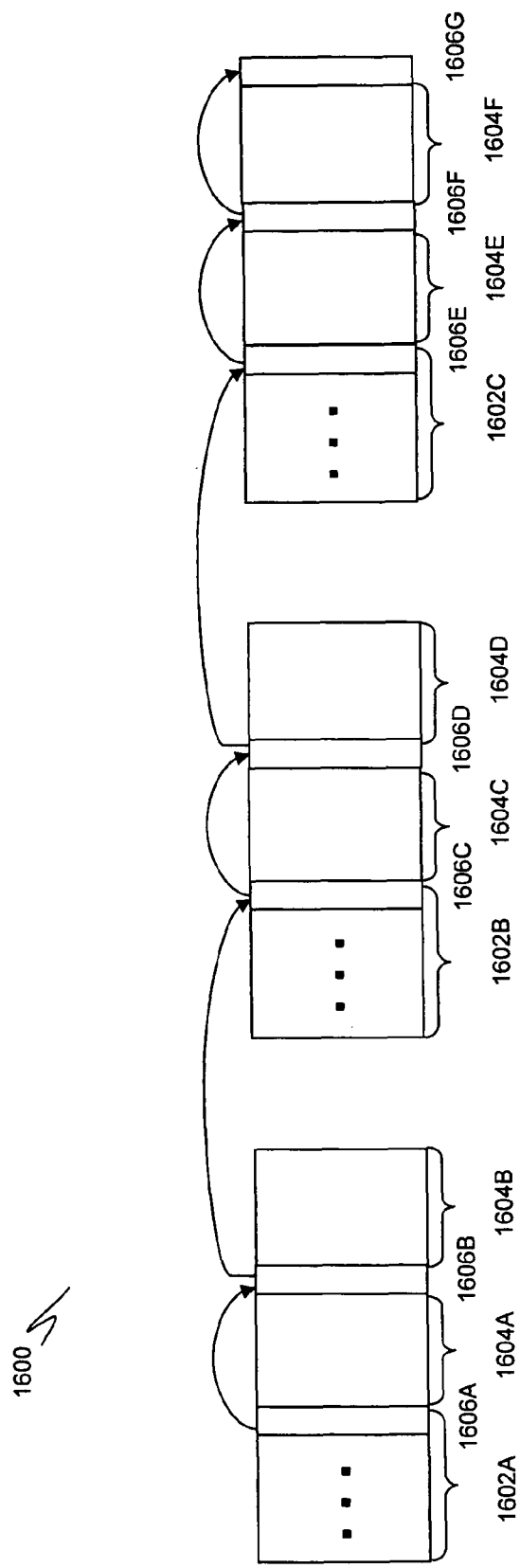
FIG. 10 is a diagrammatic view of another embodiment of a content length identifier of a message transmitted via multiple chunks.

FIG. 10 depicts another embodiment of a TCP segment of a TCP packet. In some embodiments of using the HTTP protocol over the transport layer connection, a chunked transfer encoding header may be present and indicating that chunked transfer encoding has been applied to the TCP segment or packet. As such, in this embodiment, the length of the message is defined by the chunked encoding. The chunked encoding modifies the body of the message in order to transfer the message as a series of chunks, each chunk with its own length indicator in a chunk-size field. The TCP segment 1600 includes a TCP header (now shown) and a body. The body comprises, among other information, a HTTP header 1602A-1602C and the message. The HTTP header 1602A-1602C comprises seven chunk-size fields 1606A-1601C, and six chunk message data 1604A-1604F.

The chunk-size field 1606A-1606G are linked together, or otherwise referenced or associated, as illustrated in FIG. 10. The chunk-size field 1606A indicates the length of the message in the chunk message data 1604A, the chunk-size field 1606C indicates the length of the message in the chunk message data 1604C, and so forth. The last chunk-size field 1606G comprises the length value zero indicating that there are no more chunks or any more of the message to follow. In another embodiment, the acceleration program 120 of the present invention determines via the chunk-size fields whether the client 205 has received all the data to a response.

Although FIGS. 9 and 10 generally describes a technique for checking whether all the data for a response to a request has been received, these techniques are applicable to a server 206 or appliance 250 sending an asynchronous message or communication to the client 205. Furthermore, although these techniques are generally described in conjunction with FIGS. 9 and 10 for an HTTP protocol, these techniques can be used for any protocol at any protocol layer that provided an indication of the length of data to be transmitted or received by the client 205. As such, in some embodiment, the acceleration program 120 accesses, extracts, inspects, analyzes or otherwise processes any portion of the network packet, including at any protocol layer, to determine if all the data has yet been received in association with a request, response or communication between the client and the server or appliance. In yet another embodiment, the acceleration program 120 tracks the numbers of bytes transmitted, received and acknowledged between the client 205 and server 206 to determine if any bytes are outstanding between the client 205 and server 206 for an application 220.

By using the content length techniques described above, the acceleration program 120 of the present invention can reuse the same transport layer connection to the server 206 previously used or in the process of use by any other application 220a-220n of the client 205.

At step 817, the acceleration program 120 determines if the transport layer connection is available to transmit the first request, and if so at step 820 transits the request to the server 206. Otherwise, at step 819, the acceleration program 120 may wait until all the data is received for an outstanding request of an application. For example, the acceleration program 120 may set a timer, for example, to a short time period, and proceed to step 815. In some embodiments, the acceleration program 120 checks if the all the data has been received responsive to a packet processing timer of the network stack 210 of the client 205. In another embodiments, at step 819, the acceleration program 120 establishes another transport layer connection to transmit the first request of the first application 220a.

At step 820, the acceleration program 120 may track which application 220 currently has an outstanding request or response on the connection, or is currently using the connection. For example, only one application 220 at a time may transmit a request and receive a response on the connection. As such, the acceleration program 120 understands which application 220 is using the connection. In some embodiments, the acceleration program 120 uses one port number for the transport layer connection communication for all applications 220a-220n of the client 205 sharing the connection. In some cases, the acceleration program 120 tracks the requests and outstanding responses for the requests on an application by application basis. In some embodiments, the acceleration program 120 associates a process id of the application 220 with the request. In yet another embodiment, the acceleration program 120 transmits the request of the first application 220a with a request of the second application 220b in the same network packet or packets, TCP segment or segments. In other embodiments, the acceleration program 120 transmits a plurality of requests of applications 220a-220n via the same transport layer connection as part of a series of TCP segments of one or more TCP segment windows.

In other embodiments, the acceleration program 120 uses a port numbering mechanism and/or scheme to track and recognize which response or message received is for which application 220a-220n. In other embodiments, the acceleration program 120 provides and associates a port number with the application 220, and modifies the port number in the TCP network packet to be transmitted to the application's assigned port number. In another embodiment, the port number is provided by the application 220 and the acceleration program 120 changes or otherwise provides the port number accordingly in the TCP network packet. As such, in some embodiments, the acceleration program 120 may interweave requests from a plurality of applications 220a-220n of the client 205 such that applications 220a-220n may use the transport layer connection at the same time.

At step 825, the acceleration program 120 receives a response to the first request of the first application 220a from the server 206, such as via appliance 205, and provides the response to the first application 220a. In some embodiments, the acceleration program 120 provides the response to the first application 220a via the network stack 210, such as allowing or initiating the processing of the response by the protocol layers above the transport layer of the connection. In another embodiment, the first program 222 provides the response to the first application 220a. In other embodiments, the acceleration program 120 may provide the response to the first application 220a via an inter-process communication mechanism or an interface, such as an API. In some embodiments, the acceleration program 120 only receives a portion of the response, such as a first chunk in a multi-chunk message as described in FIG. 10.

At step 830, the acceleration program 120 intercepts a request of a second application 220b to access the server 206. In some embodiments, the acceleration program 120 intercepts the request of the second application 220b prior to step 825. In other embodiments, the acceleration program 120 intercepts the request of the second application 220b during receipt of the response at step 825. In another embodiment, the acceleration program 120 intercepts the request of the second application 220b prior to the client 205 or acceleration program 120 receiving all the data for a response of the first request of the first application 220a. Upon interception of the request of the second application 220b, the acceleration program 120 proceeds to step 815 in an embodiment of the present invention to determine whether to multiplex the second request via the transport layer connection or whether to establish another transport layer connection, such as another connection in a pool of connections. In other embodiments, the acceleration program 120 transmits the request of the second application 220b via the same connection as the first application 220a while the first application 220a has an outstanding response or has not received all the data from the response of the first request. In another embodiment, the acceleration program 120 transmits the request of the second application 220b after the first application 220a has received the response and prior to any generated RST and/or FIN commands are generated in connection with the first application 220a.

Although the acceleration program 120 has generally been discussed in relation to the client-side implementation and execution of acceleration techniques, the acceleration program 120 interfaces and works in conjunction with the appliance 250, which also implements and executes appliance-side acceleration techniques. In one embodiment, the client-side acceleration program 120 and the appliance 250 may work in conjunction with each other to perform a plurality of the acceleration techniques of the present invention on communications between the clients 205a-205n and the servers 206a-206n. In some embodiments, the client-side acceleration program 120 and the appliance 250 both provide TCP pooling and multiplexing, such as to provide a cascading or end-to-end pooling and multiplexing mechanism between clients 205a-205n and servers 206a-206n. For example, the acceleration program 120 may provide a first pooled transport layer connection to the appliance 250, which in turns provides a second pooled transport layer connection to the server 206a-206n. In another example, the acceleration program 120 may multiplex an application request via a first pooled transport layer connection on the client 205a-205n, which in turns is multiplexed by the appliance 250 via the second pooled transport layer connection to the server 206a-206n. In some embodiments, the acceleration program 120 provides a throttling mechanism for transmitting requests from the client 205a-205n while the appliance 205 provides a throttling mechanism for transmitting responses from the servers 206a-206n to the clients 205a-205n. In another embodiment, the acceleration program 120 performs client-side caching for the client 205 while the appliance 250 provides caching of objects, such as dynamically generated objects, for the client 205a-205n along with other clients 205a-205n.

In some embodiments, in addition to or in conjunction with performing acceleration techniques on the client 205 and/or appliance, the acceleration program 120 and the appliance may provide a virtual private network connection and communications between the client 205 and a network 204 access via the appliance 250. In another embodiment, the acceleration program 120 may compress data communicated from an application 220, and the appliance 250 may decompress the compressed data upon receipt thereof. Conversely, appliance 250 may compress data communicated from an application 220 on the server 206 on a private data communication network 204' and the acceleration program 120 may decompress the compress data upon receipt thereof. Also, the acceleration program 120 and appliance 250 may act as endpoints in an encrypted data communication or tunneling session, in which the acceleration program 120 encrypts data communicated from an application 220, and appliance 250 decrypts the encrypted data upon receipt thereof. In a similar manner, appliance 250 encrypts data communicated from an application 220 on private data communication network and the acceleration program 120 may decrypt the data upon receipt thereof.

In view of the structure, function and operations of the client-side acceleration deployment and execution techniques described herein, the present invention provides a plurality of acceleration techniques on the client deployed efficiently and also executed in an efficient and transparent manner on the client. In some embodiments, the present invention avoids the installation of an appliance-based or server-based accelerator between the client and a public data communication network. Furthermore, because the acceleration program is dynamically provided to client 205, and automatically installed and executed on the client 205, upon a network, acceleration can be achieved on any client machine. Also, because the acceleration program is stored and dynamically downloaded from the appliance 250 or a server, upgrades and/or maintenance to the acceleration program 120 can be done once, and deployed dynamically and automatically to clients as they access the network. Additionally, the present invention works in conjunction with an appliance-side accelerator to perform end-to-end acceleration from client to appliance to server.

While various embodiments of the present invention have been described above, it should be understood that they have been presented by way of example only, and not limitation. Thus, it will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method to accelerate access by a client to a resource via a network, the method comprising:
   (a) receiving, by a client responsive to a request to access a resource via a network, an acceleration program to accelerate the access;
   (b) silently installing, automatically by the client upon receipt, the acceleration program on the client;
   (c) executing, automatically by the client upon installation, the acceleration program at a protocol layer of a network stack of the client; and
   (d) performing, by the acceleration program at a single location in the network stack, a plurality of acceleration techniques on a network packet intercepted by the agent.

2. The method of claim 1, wherein step (a) further comprises receiving, by the client, the acceleration program upon establishment of a communication session with a device intermediary to the client and one or more servers.

3. The method of claim 1, wherein step (b) further comprises installing the acceleration program without interaction by a user of the client.

4. The method of claim 1, wherein step (b) further comprises installing a network driver of the acceleration program.

5. The method of claim 1, wherein step (b) further comprises installing the acceleration program at a network layer of the network stack.

6. The method of claim 1, wherein step (b) further comprises installing the acceleration program at a transport layer of the network stack.

7. The method of claim 1, wherein step (c) further comprises executing the acceleration program at a network layer of the network stack.

8. The method of claim 1, wherein step (c) further comprises executing the acceleration program at a transport layer of the network stack.

9. The method of claim 1, wherein step (d) further comprises performing, by the acceleration program, the plurality of acceleration techniques during a single execution of processing the network packet.

10. The method of claim 1, wherein step (d) further comprises performing, by the acceleration program, the plurality of acceleration techniques at a single interface point at which the network packet is intercepted.

11. A method for a device intermediary to a client and one or more servers to provide an acceleration program to a client for accelerating the client's access to the one or more servers, the method comprising:
    (a) receiving, by a device intermediary to a client and one or more servers, a request from the client to access the server via a network;
    (b) determining, by the device, to accelerate the client's access;
    (c) obtaining, by the device responsive to the determination, an acceleration program, the acceleration program constructed to execute a plurality of acceleration techniques at a single location in a protocol layer of a network stack of the client; and
    (d) transmitting, by the device responsive to the request, the acceleration program to the client for silent installation.

12. The method of claim 11, wherein step (a) further comprises receiving, by the device, the request from the client to establish a session with the server.

13. The method of claim 11, wherein step (a) further comprises receiving, by the device, the request from the client to access an application.

14. The method of claim 11, wherein step (b) further comprises determining, by the device, to accelerate the client's access based on performance of the client.

15. The method of claim 11, wherein step (b) further comprises determining, by the device, to accelerate the client's access based on a type of protocol used for accessing the server.

16. The method of claim 11, wherein step (b) further comprises determining, by the device, to accelerate the client's access based on a type of application to be accessed via the server.

17. The method of claim 11, wherein step (c) further comprises obtaining, by the device, the acceleration program further constructed to be automatically installed by the client upon receipt and automatically executed upon installation.

18. The method of claim 11, wherein step (c) further comprises obtaining, by the device, the acceleration program via one of storage or memory of the device.

19. The method of claim 11, wherein step (c) further comprises obtaining, by the device, the acceleration program from a second device via a network.

20. The method of claim 11, wherein step (d) further comprises transmitting, by the device, the acceleration program, via a transport layer connection established with a second program on the client.

* * * * *